(12) United States Patent
Dunn et al.

(10) Patent No.: US 7,914,945 B2
(45) Date of Patent: Mar. 29, 2011

(54) FUEL CELL POWER AND MANAGEMENT SYSTEM, AND TECHNIQUE FOR CONTROLLING AND/OR OPERATING SAME

(75) Inventors: Glenn M. Dunn, Fair Oaks, CA (US); Paul Getchel, Placerville, CA (US); Duncan D. MacGregor, Shingle Springs, CA (US); Sinclair D. MacGregor, Shingle Springs, CA (US); Kenneth E. Pearson, Shingle Springs, CA (US)

(73) Assignee: Jadoo Power Systems, Inc., Folsom, CA (US)

( * ) Notice: Subject to any disclaimer, the term of this patent is extended or adjusted under 35 U.S.C. 154(b) by 1286 days.

(21) Appl. No.: 11/151,067

(22) Filed: Jun. 13, 2005

(65) Prior Publication Data

US 2005/0233184 A1 Oct. 20, 2005

Related U.S. Application Data

(62) Division of application No. 11/036,240, filed on Jan. 14, 2005, now abandoned.

(60) Provisional application No. 60/538,646, filed on Jan. 22, 2004.

(51) Int. Cl.
*H01M 8/04* (2006.01)

(52) U.S. Cl. ..................................... 429/515

(58) Field of Classification Search ............... 429/12, 429/23, 25, 22, 515
See application file for complete search history.

(56) References Cited

U.S. PATENT DOCUMENTS

| | | | |
|---|---|---|---|
| 3,800,534 A | 4/1974 | Kacek | |
| 3,814,148 A | 6/1974 | Wostl | |
| 4,218,107 A | 8/1980 | Wilson | |
| 4,332,331 A | 6/1982 | Fawley | |
| 4,463,063 A | 7/1984 | Adlhart | |
| 4,550,968 A | 11/1985 | Corrigan | |
| 4,554,500 A | 11/1985 | Sokira | |

(Continued)

FOREIGN PATENT DOCUMENTS

EP 1086847 3/2001

(Continued)

OTHER PUBLICATIONS

International Search Report and Written Opinion issued May 16, 2006 in PCT/US2005/001322.

(Continued)

*Primary Examiner* — Ula C. Ruddock
*Assistant Examiner* — Thomas H. Parsons
(74) *Attorney, Agent, or Firm* — Albrecht Tousi & Farnum PLLC; Ralph P. Albrecht; Cameron H. Tousi

(57) ABSTRACT

There are many inventions described and illustrated herein. In one aspect, the present invention is directed to a portable fuel cell power and management system (for example, hydrogen and/or methanol based systems), components and/or elements thereof, as well as techniques for controlling and/or operating such systems. The fuel cell power management system (and method of controlling and/or operating same) actively monitors, manages and/or controls one or more operating parameter(s) of the fuel cell system. For example, the system monitors, manages and/or controls the consumption and/or the rate of consumption of fuel by the system, and in response thereto, may provide and/or alert the user to amount of fuel remaining, consumed, the rate of consumption and/or the time (or estimation thereof remaining until all of the fuel is spent. In this way, the user may schedule or plan accordingly.

28 Claims, 45 Drawing Sheets

U.S. PATENT DOCUMENTS

| | | |
|---|---|---|
| 4,554,621 A | 11/1985 | Corrigan |
| 4,810,204 A | 3/1989 | Wilson |
| 4,822,296 A | 4/1989 | Wilson |
| 4,849,682 A | 7/1989 | Bauer et al. |
| 4,965,738 A | 10/1990 | Bauer et al. |
| 4,984,135 A | 1/1991 | Crouch |
| 5,057,383 A | 10/1991 | Sokira |
| 5,208,675 A | 5/1993 | Wilson et al. |
| 5,229,222 A | 7/1993 | Tsutsumi et al. |
| 5,314,762 A | 5/1994 | Hamada et al. |
| 5,366,820 A | 11/1994 | Tsutsumi et al. |
| 5,384,616 A | 1/1995 | Wilson et al. |
| 5,403,093 A | 4/1995 | Flynn, Jr. et al. |
| 5,557,188 A | 9/1996 | Piercey |
| 5,683,828 A | 11/1997 | Spear et al. |
| 5,747,189 A | 5/1998 | Perkins |
| 5,790,410 A | 8/1998 | Warn et al. |
| 5,804,329 A | 9/1998 | Amendola |
| 5,858,567 A | 1/1999 | Spear, Jr. et al. |
| 5,863,671 A | 1/1999 | Spear, Jr. et al. |
| 5,932,365 A | 8/1999 | Lin et al. |
| 5,962,155 A | 10/1999 | Kuranaka et al. |
| 5,976,725 A | 11/1999 | Gamo et al. |
| 6,051,331 A | 4/2000 | Spear, Jr. et al. |
| 6,057,051 A | 5/2000 | Uchida et al. |
| 6,072,299 A | 6/2000 | Kurle et al. |
| 6,093,500 A | 7/2000 | Margiott et al. |
| 6,097,175 A | 8/2000 | Yoon |
| 6,106,968 A | 8/2000 | Johnson et al. |
| 6,110,611 A | 8/2000 | Stuhler et al. |
| 6,137,417 A | 10/2000 | McDermott |
| 6,156,450 A | 12/2000 | Bailey |
| 6,198,253 B1 | 3/2001 | Kurle et al. |
| 6,236,326 B1 | 5/2001 | Murphy |
| 6,238,814 B1 | 5/2001 | Horiguchi et al. |
| 6,242,120 B1 | 6/2001 | Herron |
| 6,247,962 B1 | 6/2001 | DeSorbo |
| 6,250,078 B1 | 6/2001 | Amendola et al. |
| 6,268,077 B1 | 7/2001 | Kelley et al. |
| 6,299,998 B1 | 10/2001 | Morris et al. |
| 6,312,846 B1 | 11/2001 | Marsh |
| 6,387,559 B1 | 5/2002 | Koripella et al. |
| 6,447,945 B1 | 9/2002 | Streckert et al. |
| 6,459,231 B1 | 10/2002 | Kagatani |
| 6,468,694 B1 | 10/2002 | Amendola |
| 6,483,274 B2 | 11/2002 | Lee |
| 6,497,973 B1 | 12/2002 | Amendola |
| 6,506,511 B1 | 1/2003 | Lakeman et al. |
| 6,534,033 B1 | 3/2003 | Amendola et al. |
| 6,534,679 B2 | 3/2003 | Eyal et al. |
| 6,665,549 B1 | 12/2003 | Reed |
| 6,683,025 B2 | 1/2004 | Amendola et al. |
| 6,753,108 B1 | 6/2004 | Hampden-Smith et al. |
| 6,779,932 B2 | 8/2004 | DeSorbo et al. |
| 6,815,110 B2 | 11/2004 | Marsh |
| 6,901,302 B2 | 5/2005 | Kami |
| 6,904,533 B2 | 6/2005 | Kuo et al. |
| 7,011,768 B2 | 3/2006 | Jensen et al. |
| 7,082,354 B2 | 7/2006 | Watanabe et al. |
| 7,156,131 B2 | 1/2007 | Adams et al. |
| 7,169,489 B2 | 1/2007 | Redmond |
| 7,329,348 B2 * | 2/2008 | Curello et al. .......... 210/251 |
| 7,399,325 B1 | 7/2008 | Redmond |
| 2001/0025289 A1 | 9/2001 | Jenkins et al. |
| 2001/0050611 A1 | 12/2001 | Achterholt |
| 2002/0022162 A1 | 2/2002 | Kagitani |
| 2002/0022168 A1 | 2/2002 | Faris et al. |
| 2002/0022170 A1 | 2/2002 | Franklin et al. |
| 2002/0031692 A1 | 3/2002 | Fuglevand et al. |
| 2002/0045075 A1 | 4/2002 | Pinto et al. |
| 2002/0045082 A1 | 4/2002 | Marsh |
| 2002/0076598 A1 | 6/2002 | Bostaph et al. |
| 2002/0083643 A1 | 7/2002 | Amendola et al. |
| 2002/0155339 A1 | 10/2002 | Rudolfovich et al. |
| 2002/0177042 A1 | 11/2002 | Amendola |
| 2003/0009942 A1 | 1/2003 | Amendola et al. |
| 2003/0012999 A1 | 1/2003 | Yoshioka et al. |
| 2003/0037487 A1 | 2/2003 | Amendola et al. |
| 2003/0083848 A1 | 5/2003 | Kami |
| 2003/0148154 A1 | 8/2003 | Kawasumi et al. |
| 2003/0167105 A1 | 9/2003 | Colborn |
| 2003/0175566 A1 | 9/2003 | Fisher et al. |
| 2003/0180583 A1 | 9/2003 | Ichikawa et al. |
| 2003/0219641 A1 | 11/2003 | Petillo |
| 2003/0234010 A1 | 12/2003 | Redmond |
| 2004/0005488 A1 | 1/2004 | Faris et al. |
| 2004/0009379 A1 | 1/2004 | Amendola et al. |
| 2004/0009381 A1 | 1/2004 | Sakai et al. |
| 2004/0009392 A1 | 1/2004 | Petillo et al. |
| 2004/0016769 A1 | 1/2004 | Redmond |
| 2004/0023087 A1 | 2/2004 | Redmond |
| 2004/0033194 A1 | 2/2004 | Amendola et al. |
| 2004/0047801 A1 | 3/2004 | Petillo et al. |
| 2004/0065171 A1 | 4/2004 | Hearley et al. |
| 2004/0081884 A1 | 4/2004 | Bean et al. |
| 2004/0094134 A1 | 5/2004 | Redmond et al. |
| 2004/0137290 A1 | 7/2004 | Woods et al. |
| 2004/0151962 A1 | 8/2004 | Adams |
| 2004/0170875 A1 | 9/2004 | Ozeki et al. |
| 2004/0174072 A1 | 9/2004 | Bourilkov et al. |
| 2004/0175598 A1 | 9/2004 | Bliven et al. |
| 2004/0175599 A1 | 9/2004 | Ricks et al. |
| 2004/0181154 A1 | 9/2004 | Peterson et al. |
| 2004/0219398 A1 | 11/2004 | Calhoon |
| 2004/0229094 A1 | 11/2004 | Bae et al. |
| 2004/0253500 A1 | 12/2004 | Bourilkov et al. |
| 2004/0265671 A1 | 12/2004 | Chipchase et al. |
| 2005/0001819 A1 | 1/2005 | DePue et al. |
| 2005/0003251 A1 | 1/2005 | Uesaka et al. |
| 2005/0008903 A1 | 1/2005 | Bourilkov et al. |
| 2005/0013771 A1 | 1/2005 | Amendola |
| 2005/0014041 A1 | 1/2005 | Becerra et al. |
| 2005/0016840 A1 | 1/2005 | Petillo |
| 2005/0022883 A1 | 2/2005 | Adams et al. |
| 2005/0106424 A1 | 5/2005 | Elhamid et al. |
| 2005/0110453 A1 | 5/2005 | Lecky |
| 2005/0162122 A1 | 7/2005 | Dunn et al. |
| 2006/0024543 A1 | 2/2006 | Kaye et al. |

FOREIGN PATENT DOCUMENTS

| | | |
|---|---|---|
| EP | 1306918 | 5/2003 |
| JP | 60225367 A | 11/1985 |
| JP | 2002252013 | 9/2002 |
| JP | 2003303609 | 10/2003 |
| WO | WO-00/38260 | 6/2000 |
| WO | WO-03/032425 | 4/2003 |

OTHER PUBLICATIONS

Office Action of Aug. 12, 2009, issued in U.S. Appl. No. 11/520,352.

Notice of Nonacceptance of Amendments (English translation) issued on Apr. 10, 2009, in related CN 200580002935.2.

Office Actions: U.S. Appl. No. 11/151,067, filed Oct. 2005, Dunn et al.

Office Actions: U.S. Appl. No. 11/201,472, filed Dec. 2005, Dunn et al.

Office Actions: U.S. Appl. No. 11/520,352, filed Feb. 2007, Dunn et al.

Office Actions: U.S. Appl. No. 11/520,189, filed Feb. 2007, Dunn et al.

Office Actions: U.S. Appl. No. 11/520,392, filed Jan. 2007, Dunn et al.

* cited by examiner

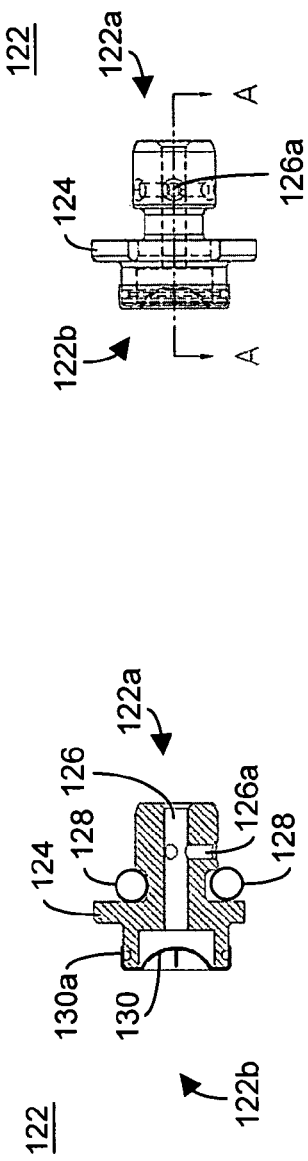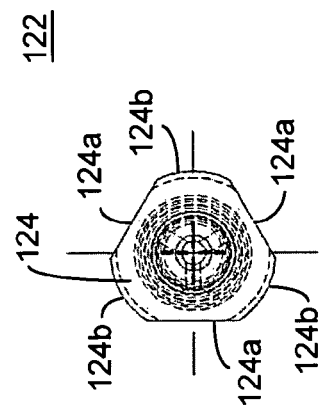

FIGURE 5B
FIGURE 5C
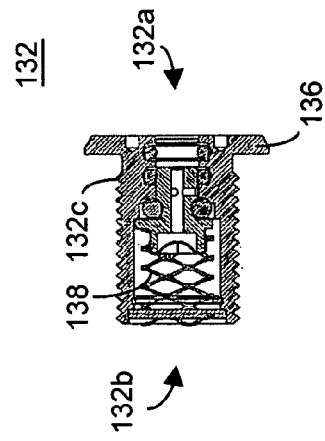
FIGURE 5D
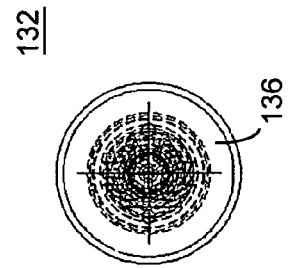
FIGURE 5E

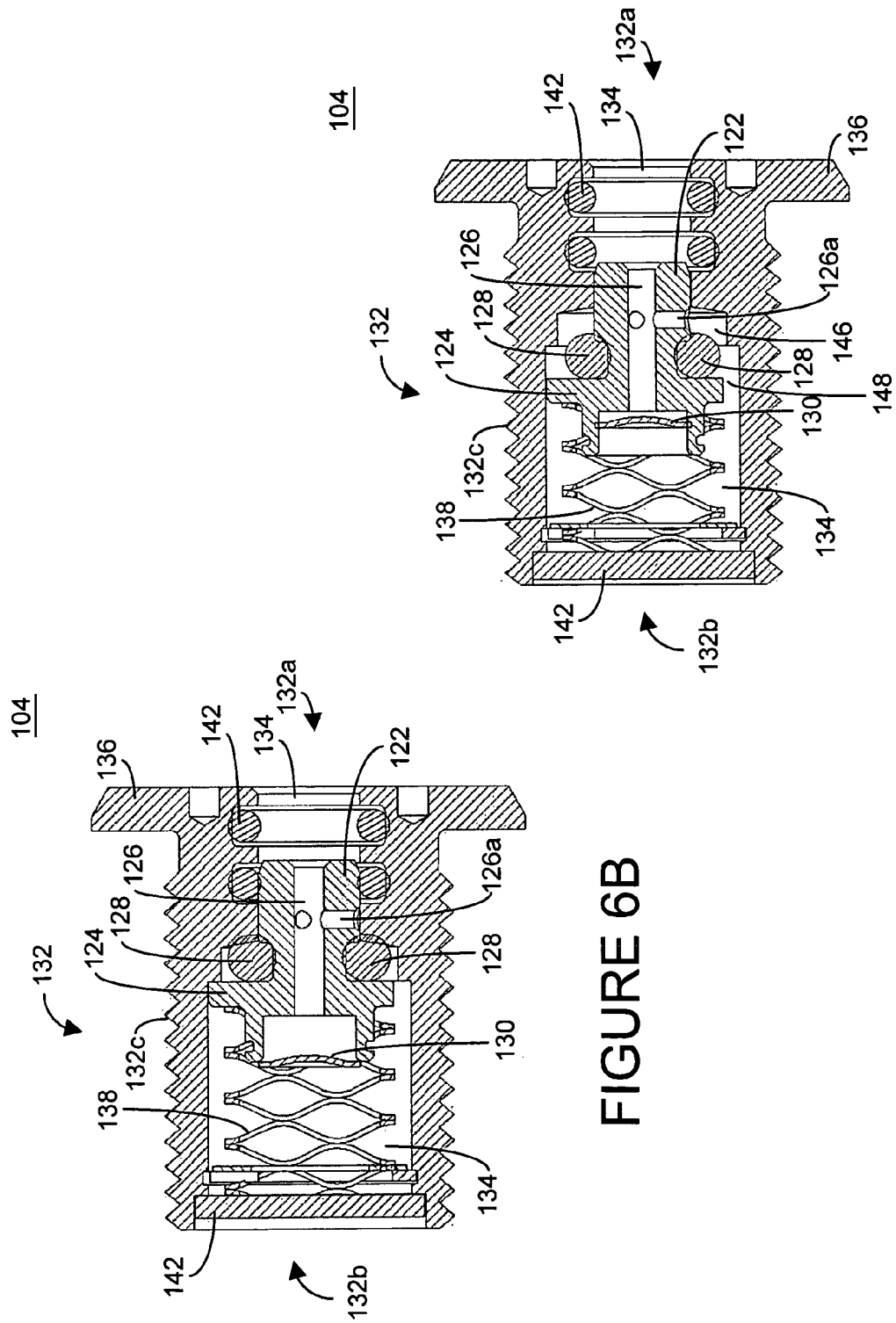

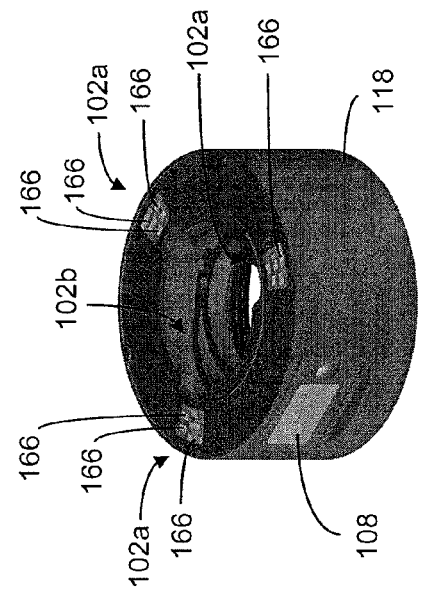
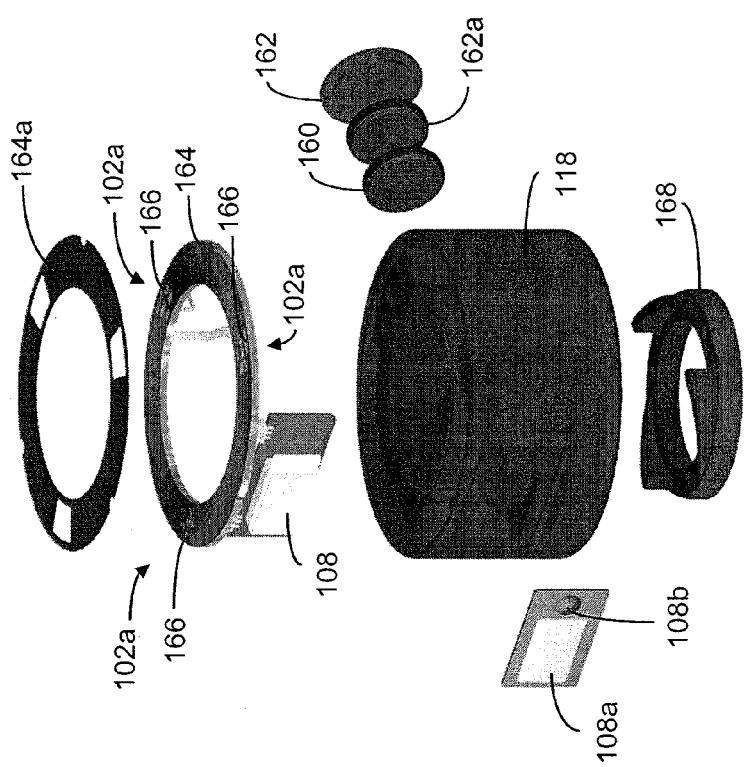
FIGURE 9B
FIGURE 9A

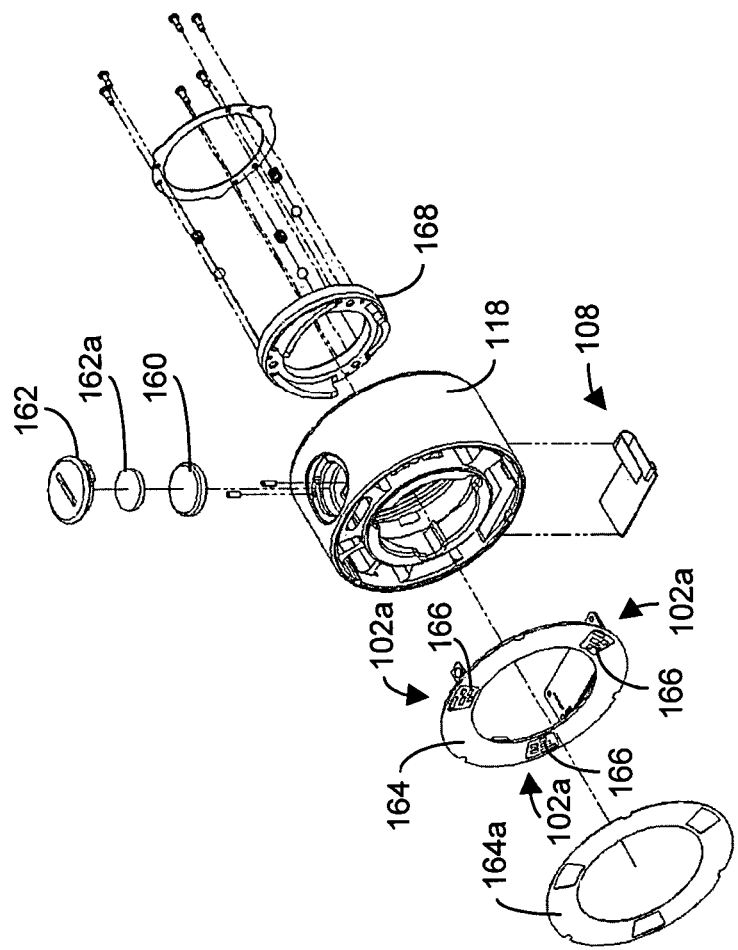
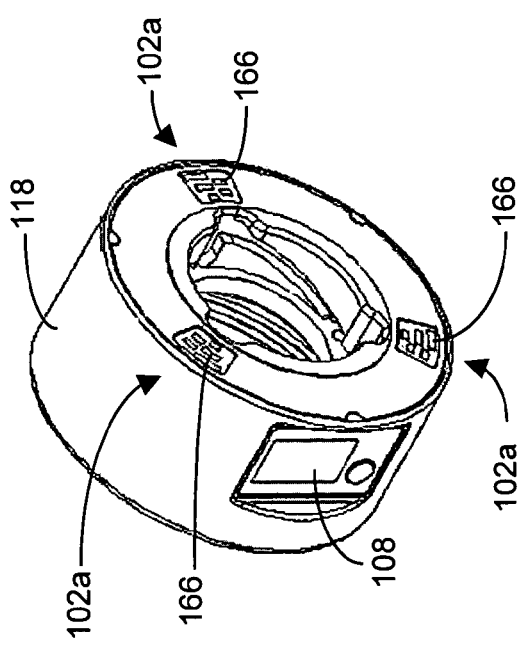
FIGURE 10A
FIGURE 10B

FUEL CELL POWER AND MANAGEMENT SYSTEM, AND TECHNIQUE FOR CONTROLLING AND/OR OPERATING SAME

CROSS-REFERENCE TO RELATED APPLICATIONS

This application is a divisional of application Ser. No. 11/036,240, filed Jan. 14, 2005 now abandoned. This application, and application Ser. No. 11/036,240, claims priority to U.S. Provisional Application Ser. No. 60/538,646, entitled "Integrated Fuel Management System for Fuel Cells", filed Jan. 22, 2004 (hereinafter "the Provisional Application"). The contents of the Provisional Application are incorporated by reference herein in their entirety.

BACKGROUND OF THE INVENTION

This invention relates to fuel cell power and management systems, and techniques for controlling and/or operating such systems; and more particularly, in one aspect, to fuel cell power and management systems, for example, hydrogen and/or methanol based systems, as well as components, elements and/or subsystems therefore.

Generally, small portable electrical and electronic devices often employ batteries as a power source. However, conventional batteries have limited energy storage capacity and must either be discarded or recharged after they have depleted their limited energy storage capacity. If thrown away, conventional batteries present environmental hazards because of the toxic material used in manufacturing the batteries. If recharged, the recharging process of conventional batteries is time consuming and as the age of these batteries increases it becomes more and more difficult to determine the state of charge of the battery. In this regard, the life becomes unpredictable and unreliable, and so the user often discards the batteries before the useful life is complete, thus incurring additional cost by the user having to carry extra batteries. Applications like professional video cameras, laptop computers, and cell phones often require longer runtimes than conventional batteries can provide.

In addition to battery based systems, fuel cell systems may be employed to provide a portable source of electrical power. In one embodiment, fuel cell systems employ, for example, hydrogen, hydrogen rich gas, hydrogen containing compound or a substance from which hydrogen can be extracted on demand (i.e., a hydride storage cartridge). Such fuel cell systems typically include an anode end for splitting hydrogen atoms into electrons and protons, a current bearing portion providing a pathway for the electrons, a medium such as a proton exchange membrane providing a pathway for the protons, and a cathode end for rejoining the electrons and protons into water molecules in the presence of oxygen. Conventional fuel cells often generate electricity over a longer time period than conventional batteries, provided that the fuel (for example, hydrogen) in the storage container is periodically refreshed. (See, for example, U.S. Pat. Nos. 5,683,828; 5,858,567; 5,863,671; and 6,051,331).

SUMMARY OF THE INVENTION

There are many inventions described and illustrated herein as well as many aspects and embodiments of those inventions. In a first principal aspect, the present invention is a hydrogen-based fuel cell management system comprising a hydrogen-based fuel cartridge to store hydrogen-based fuel and a power unit, coupled to the hydrogen-based fuel cartridge, to generate electrical power from the hydrogen-based fuel. The hydrogen-based fuel cartridge, in this aspect of the invention, includes a fuel vessel adapted to store hydrogen-based fuel, memory to store data which is representative of at least one operating parameter of the hydrogen-based fuel cartridge, and control circuitry (for example, a microprocessor or microcontroller). The power unit includes a hydrogen-based fuel cell, adapted to receive the hydrogen-based fuel and generate electrical power therefrom.

The at least one operating parameter may be the amount of hydrogen-based fuel that is remaining in the fuel vessel. In one embodiment, the control circuitry may monitor the amount of hydrogen-based fuel that is remaining in the fuel vessel using an amount of time the hydrogen-based fuel cartridge provides hydrogen-based fuel to power unit. In another embodiment, the control circuitry monitors the amount of hydrogen-based fuel that is remaining using data which is representative of the pressure and temperature of the fuel in the fuel vessel.

The at least one operating parameter may be the rate of consumption of the hydrogen-based fuel by the power unit. In one embodiment, the control circuitry monitors the rate of consumption of the hydrogen-based fuel by the power unit using one or more sensors that provides data which is representative of the rate of flow of the fuel, the pressure of the fuel in the vessel and the temperature of the fuel in the vessel.

In one embodiment, the memory further stores data which is representative of one or more unique characteristics of hydrogen-based fuel cartridge. The one or more unique characteristics of hydrogen-based fuel cartridge may include at least one of a serial number of the fuel cartridge, date of manufacture of the fuel cartridge, date of assembly of the fuel cartridge, type of fuel contained in fuel vessel, fuel capacity of the fuel cartridge, and number of refill operations the fuel cartridge has undergone.

Notably, the memory may also store data which is representative of general characteristics of hydrogen-based fuel cartridge.

In one embodiment, the hydrogen-based fuel cartridge may also include a display to visually display information which is representative of the at least one operating parameter.

The control circuitry of the fuel cartridge may intermittently, continuously or periodically determines the at least one operating parameter of the hydrogen-based fuel cartridge and intermittently, continuously or periodically store data which is representative of the at least one operating parameter of the hydrogen-based fuel cartridge in the memory. In one embodiment, the memory and the control circuitry are disposed on the same integrated circuit device.

The power unit may also include control circuitry to determine the at least one operating parameter of the hydrogen-based fuel cartridge (for example, the amount of hydrogen-based fuel that has been consumed from the fuel vessel). In this embodiment, the control circuitry of the power unit may intermittently, continuously or periodically determines the at least one operating parameter of the hydrogen-based fuel cartridge and intermittently, continuously or periodically store data which is representative of the at least one operating parameter of the hydrogen-based fuel cartridge in the memory of the fuel cartridge.

Where the at least one operating parameter is the amount of hydrogen-based fuel that is remaining in the fuel vessel, in one embodiment, the control circuitry of the power unit may determine the amount of hydrogen-based fuel that is remaining in the fuel vessel using an amount of time the hydrogen-based fuel cartridge provides hydrogen-based fuel to power unit. In another embodiment, the control circuitry of the power unit determines the amount of hydrogen-based fuel that is remaining using data which is representative of the pressure and temperature of the fuel in the fuel vessel.

The hydrogen-based fuel cartridge of this aspect of the invention may also include communication circuitry to provide data which is representative of the at least one operating parameter of the hydrogen-based fuel cartridge to external circuitry. The communication circuitry may employ wireless communications techniques.

In another principal aspect, the present invention is a hydrogen-based fuel cell management system comprising a hydrogen-based fuel cartridge to store hydrogen-based fuel, a power unit, coupled to the hydrogen-based fuel cartridge, to generate electrical power from the hydrogen-based fuel, and a refill unit, adapted to connect with the hydrogen-based fuel cartridge, to provide fuel to the hydrogen-based fuel cartridge for storage in the fuel vessel. The hydrogen-based fuel cartridge, in this aspect of the invention, includes a fuel vessel adapted to store hydrogen-based fuel, memory to store data which is representative of at least one operating parameter of the hydrogen-based fuel cartridge, and control circuitry (for example, a microprocessor or microcontroller). The power unit includes a hydrogen-based fuel cell, adapted to receive the hydrogen-based fuel and generate electrical power therefrom.

The at least one operating parameter may be the amount of hydrogen-based fuel that is remaining in the fuel vessel. In one embodiment, the power unit includes control circuitry to determine the amount of hydrogen-based fuel that is remaining in the fuel vessel using an amount of time the hydrogen-based fuel cartridge provides hydrogen-based fuel to power unit. The control circuitry of the power unit may monitor the amount of hydrogen-based fuel that is remaining in the fuel vessel using an amount of time the hydrogen-based fuel cartridge provides hydrogen-based fuel to power unit. In another embodiment, the control circuitry of the power unit may monitor the amount of hydrogen-based fuel that is remaining using data which is representative of the pressure and temperature of the fuel in the fuel vessel. The at least one operating parameter may be the rate of consumption of the hydrogen-based fuel by the power unit.

The memory may store data which is representative of one or more unique characteristics of hydrogen-based fuel cartridge and/or general characteristics of hydrogen-based fuel cartridge. The one or more unique characteristics of hydrogen-based fuel cartridge may include at least one of a serial number of the fuel cartridge, date of manufacture of the fuel cartridge, date of assembly of the fuel cartridge, type of fuel contained in fuel vessel, fuel capacity of the fuel cartridge, and number of refill operations the fuel cartridge has undergone.

In one embodiment, the hydrogen-based fuel cartridge may include a display to visually display information which is representative of the at least one operating parameter.

The power unit may include control circuitry to determine the at least one operating parameter of the hydrogen-based fuel cartridge. Indeed, the control circuitry of the power unit may intermittently, continuously or periodically determine the at least one operating parameter of the hydrogen-based fuel cartridge and intermittently, continuously or periodically store data which is representative of the at least one operating parameter in the memory of the fuel cartridge.

The refill unit may include control circuitry to determine the at least one operating parameter of the hydrogen-based fuel cartridge. In this regard, the control circuitry of the refill unit may intermittently, continuously or periodically determine the at least one operating parameter of the hydrogen-based fuel cartridge and intermittently, continuously or periodically store data which is representative of the at least one operating parameter in the memory of the fuel cartridge. Where the at least one operating parameter is the amount of hydrogen-based fuel that is remaining in the fuel vessel, the control circuitry of the refill unit may determine the amount of hydrogen-based fuel that is remaining in the fuel vessel using an amount of time the hydrogen-based fuel cartridge receives hydrogen-based fuel from refill unit. In addition or in lieu thereof, the control circuitry of the refill unit may determine the amount of hydrogen-based fuel that is remaining using data which is representative of the pressure and temperature of the fuel in the fuel vessel. Notably, the at least one operating parameter may be, among other things, the amount of hydrogen-based fuel that has been consumed from the fuel vessel.

In another principal aspect, the present invention is a hydrogen-based fuel cell management system comprising a hydrogen-based fuel cartridge to store hydrogen-based fuel, a power unit, coupled to the hydrogen-based fuel cartridge, to generate electrical power from the hydrogen-based fuel. In this aspect, the hydrogen-based fuel cartridge includes a fuel vessel adapted to store hydrogen-based fuel, a cartridge interface including a mechanical interface, a cartridge valve assembly, control circuitry, and memory to store data which is representative of a plurality of operating parameters of the hydrogen-based fuel cartridge. The power unit of this aspect of the invention includes a power unit interface, including a mechanical interface to mechanically connect to the mechanical interface of the cartridge interface, and a power unit valve assembly to engage the cartridge valve assembly and to enable hydrogen-based fuel to flow from the hydrogen-based fuel cartridge to the power unit. The power unit also includes a hydrogen-based fuel cell, coupled to the power unit valve assembly to receive the hydrogen-based fuel from the fuel cartridge and to generate electrical power therefrom.

In one embodiment, at least one of the plurality of operating parameters is the amount of hydrogen-based fuel that is remaining in the fuel vessel. In another embodiment, at least one of the plurality of operating parameters is the rate of consumption of hydrogen-based fuel by the power unit.

The memory may store data which is representative of one or more unique characteristics of hydrogen-based fuel cartridge and/or data which is representative of general characteristics of hydrogen-based fuel cartridge. The one or more unique characteristics of hydrogen-based fuel cartridge includes at least one of a serial number of the fuel cartridge, date of manufacture of the fuel cartridge, date of assembly of the fuel cartridge, type of fuel contained in fuel vessel, fuel capacity of the fuel cartridge, and number of refill operations the fuel cartridge has undergone.

In one embodiment, the hydrogen-based fuel cartridge further includes a display to visually display information which is representative of one or more of the plurality of operating parameters of the hydrogen-based fuel cartridge.

In one embodiment, the power unit includes control circuitry to intermittently, continuously or periodically determine one or more of the plurality of operating parameters of the hydrogen-based fuel cartridge. The control circuitry of the power unit may intermittently, continuously or periodically store the data which is representative of one or more of the plurality of operating parameters in the memory of the fuel cartridge.

Again, there are many inventions described and illustrated herein, as well as many aspects and embodiments of those inventions. This Summary of the Invention is not exhaustive of the scope of the present invention. Moreover, this Summary of the Invention is not intended to be limiting of the invention and should not be interpreted in that manner. While certain embodiments, features, attributes and advantages of the inventions have been described in this Summary of the Invention, it should be understood that many others, as well as different and/or similar embodiments, features, attributes and/or advantages of the present inventions, which are apparent from the description, illustrations and claims, which follow.

BRIEF DESCRIPTION OF THE DRAWINGS

In the course of the detailed description to follow, reference will be made to the attached drawings. These drawings show different aspects of the present invention and, where appropriate, reference numerals illustrating like structures, components, materials and/or elements in different figures are labeled similarly. It is understood that various combinations of the structures, components, materials and/or elements, other than those specifically shown, are contemplated and are within the scope of the present invention.

FIG. 4C illustrates a side view of the exemplary poppet assembly of FIG. 4B;

FIG. 4D illustrates a cross-section view of the exemplary poppet assembly of FIG. 4C sectioned along lines A-A;

FIG. 4E illustrates an end view (from the distal end) of the exemplary poppet assembly of FIG. 4B;

FIG. 5B illustrates a perspective assembled view of the exemplary cartridge valve assembly of FIG. 5A;

FIG. 5C illustrates a side view of the exemplary cartridge valve assembly of FIG. 5B;

FIG. 5D illustrates a cross-section view of the exemplary cartridge valve assembly of FIG. 5C sectioned along lines A-A, wherein the cartridge valve assembly is in the closed state;

FIG. 5E illustrates an end view (from the distal end) of the exemplary cartridge valve assembly of FIG. 5B;

FIG. 6B illustrates a cross-sectional view of certain components of the exemplary cartridge valve assembly of FIG. 6A when the valve is in a closed state;

FIG. 6C illustrates a cross-sectional view of certain components of the exemplary cartridge valve assembly of FIG. 6A when the valve is in an open state;

FIGS. 9A and 10A illustrate exploded perspective views of the cartridge collar assembly, according to one embodiment, in conjunction with portions of the cartridge interface, cartridge electronics and cartridge display;

FIGS. 9B and 10B illustrate perspective views of the cartridge collar assembly, according to one embodiment, in conjunction with portions of the cartridge interface and cartridge display;

DETAILED DESCRIPTION

Figure 1A:
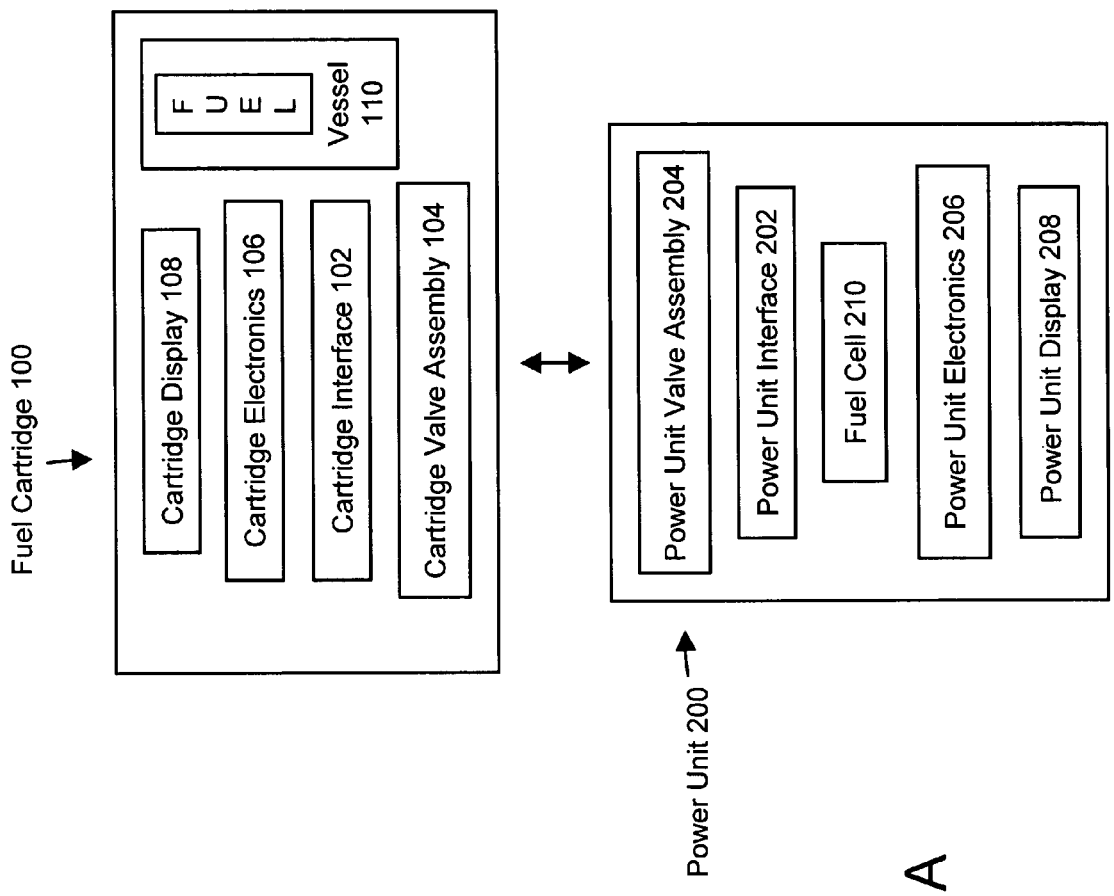
FIG. 1A is a block diagram representation of a portable fuel cell power and management system, including a fuel cartridge and power unit, according to a first aspect of the present invention.

There are many inventions described and illustrated herein. In one aspect, the present invention is directed to a portable fuel cell power and management system (for example, hydrogen and/or methanol based systems), components and/or elements thereof, as well as techniques for controlling and/or operating such systems. The fuel cell power management system (and method of controlling and/or operating same) actively monitors, manages and/or controls one or more operating parameter(s) of the fuel cell system. For example, the system monitors, manages and/or controls the consumption and/or the rate of consumption of fuel by the system, and in response thereto, may provide and/or alert the user to amount of fuel remaining, consumed, the rate of consumption and/or the time (or estimation thereof remaining until all of the fuel is spent. In this way, the user may schedule or plan accordingly.

In one embodiment, the present invention includes a fuel cartridge and a power unit. The fuel cartridge contains the fuel to be employed by the power unit to generate electricity therefrom. The fuel cartridge connects to the power unit to provide the fuel to a fuel cell in or on the power unit. In one embodiment, the fuel is hydrogen or methanol. However, the present invention may be implemented in conjunction with any fuel and fuel cell system, whether now known or later developed; as such; all portable fuel cell type systems (whether rechargeable or not) are intended to fall within the scope of the present invention. Notably, while this application is often couched in the context of a hydrogen or methanol fuel, it is to be understood that the invention is applicable to other fuels and associated management systems.

As mentioned above, the fuel cell power management system (and method of monitoring, managing and/or controlling and/or operating same) of the present invention actively monitors, manages and/or controls one or more operating parameter(s) of the fuel cell system. These operating parameters may be, for example, fuel consumption and/or rate thereof, temperature (of, for example, the fuel cartridge), pressure (of, for example, the fuel in the fuel cartridge), electrical power consumption (including, for example, voltage and current generation by the power unit and/or output thereby, and/or current consumption), and/or any malfunctions or faults (for example, a fuel leak, mechanical, electrical and/or electronic interface fault) of the system, or components, elements and/or subsystems thereof.

Notably, the fuel cartridge and/or power unit may actively monitor, manages and/or controls one or more operating parameter(s) of the fuel cell system. In this regard, the fuel cartridge and/or power unit may be enabled and/or configured to monitor, manages and/or controls one or more operating parameters of the fuel cell system. The monitoring, managing and/or control process assigned to the fuel cartridge and/or power unit may be fixed, preset, predetermined, programmed and/or configurable (in situ or otherwise). In one embodiment, a user or external device (via wireless and/or wired communications) may enable, disable, program and/or configure the monitoring, management and/or control operation(s) of the operating parameter(s) of the fuel cartridge and/or power unit of the fuel cell system.

In another embodiment, the present invention also includes a refill unit to replenish and/or store fuel in the fuel cartridge. In this regard, the fuel cartridge may be connected to the refill unit to, periodically, intermittently and/or as needed, replenish and/or store fuel in a storage vessel of the fuel cartridge. The refill unit may, in addition to the fuel cartridge or in lieu thereof, may monitor, manage and/or control one or more operating parameter(s) of the refill process. Indeed, in addition to the fuel cartridge and/or power unit (or in lieu thereof), the refill unit may be employed by the user or external device to enable, disable, program and/or configure the monitoring, manage and/or control of the operating parameter(s) of the other subsystems (for example, the power unit or fuel cartridge) of the fuel cell system. As such, in this embodiment, the fuel cell power and management system is portable and rechargeable and the fuel cartridge, power unit and/or refill unit may actively monitor, manage and/or control one or more operating parameter(s) of the fuel cell system.

With reference to FIG. 1A, in one embodiment, fuel cell power and management system 10 of the present invention includes fuel cartridge 100 and power unit 200. The fuel cartridge 100 includes cartridge interface 102 and cartridge valve assembly 104 that facilitates communication of fuel between fuel cartridge 100 and power unit 200. The cartridge interface 102 includes a mechanical interface that "mates" with the interface of power unit 200. The cartridge valve assembly 104, in conjunction with the mechanical interface of cartridge interface 102, facilitates a controlled exchange of fuel from fuel cartridge 100 to power unit 200.

In one embodiment, fuel cartridge 100 also includes cartridge electronics 106 and cartridge display 108. The cartridge electronics 106 includes circuitry to monitor, manage, control and/or store one or more operating parameter(s) of, for example, fuel cartridge 100. The cartridge display 108, for example, an LCD or LED display, may be appropriately disposed on or in fuel cartridge 100 to facilitate exchange of information, for example, the status of the one or more operating parameter(s), from cartridge electronics 106 to a user or operator. In this way, a user or operator may visually examine such information. Notably, fuel cartridge 100 may include (in addition to or in lieu of cartridge display 108) an audible indicator (not illustrated) to audibly provide such information to the user or operator.

The power unit 200 includes power unit interface 202 and power unit valve assembly 204 to securely engage or connect with fuel cartridge 100 and receive fuel from fuel cartridge 100. The power unit interface 202 includes a mechanical interface that "mates" with the mechanical interface of fuel cartridge 100. The power unit valve assembly 204 facilitates a safe and controlled exchange of fuel from fuel cartridge 100 to power unit 200.

In one embodiment, a hose or tubing may be inserted between fuel cartridge 100 and power unit 200 to facilitate fuel flow from fuel cartridge 100 to power unit 200. The hose or tubing may include the appropriate connection interfaces or be adapted to connect to the appropriate connection interfaces to thereby provide suitable fluid (and/or electrical) communication between fuel cartridge 100 and power unit 200.

In one embodiment, power unit 200 also includes power unit electronics 206 and power unit display 208. The power unit electronics 206 includes circuitry to monitor, manage, control and/or store one or more operating parameter(s) of, for example, fuel cartridge 100 and/or power unit 200.

The power unit display 208, for example, an LCD or LED display, may be appropriately disposed on or in (for example, in a recessed manner) power unit 200 to permit a user or operator to obtain information, for example, the status of the one or more operating parameter(s) of fuel cartridge 100 and/or power unit 200, from power unit electronics 206 and/or fuel cartridge electronics 106. In this regard, the information may be calculated, determined and/or measured by power unit electronics 206 and/or provided to power unit display 208 by fuel cartridge electronics 106 via the electrical interfaces of cartridge interface 102 and power unit interface 202.

Notably, like power unit display 208, cartridge display 108 may provide the status of the one or more operating parameter(s) of fuel cartridge 100 and/or power unit 200. In this regard, the information to be displayed may be calculated, determined and/or measured by fuel cartridge electronics 106, as mentioned above, and/or provided to cartridge display 108 by power unit electronics 206 via the electrical interfaces of power unit interface 202 and cartridge interface 102. In this way, a user or operator may visually examine one or more operating parameter(s) of fuel cartridge 100 and/or power unit 200) using cartridge display 108 in addition to or in lieu of power unit display 208.

As with fuel cartridge 100, power unit 200 may also include (in addition to or in lieu of power unit display 208) an audible indicator (not illustrated) to audibly provide one or more operating parameter(s) of fuel cartridge 100 and/or power unit 200) to the user or operator.

The power unit 200 also includes fuel cell 210 to convert the fuel provided by fuel cartridge 100 to electrical power. The fuel cell 210 provides electrical power to an external device, for example, a camera or computer, via an electrical interface of power unit electronics 206. Notably, in the context of a hydrogen based fuel cell, fuel cell 210 generally includes an anode end for splitting hydrogen atoms into electrons and protons, a current bearing portion providing a pathway for the electrons, a medium such as a proton exchange membrane providing a pathway for the protons, and a cathode end for rejoining the electrons and protons into water molecules in the presence of oxygen. The fuel cell 210 will be discussed in considerably more detail below.

Fuel Vessel 110: With reference to FIGS. 2, 3A, 3B, and 3C in one embodiment, fuel cartridge 100 includes fuel vessel 110 for storing fuel, for example, hydrogen or methanol, at an elevated pressure. The vessel 110 is preferably designed to be a cylinder having a thickness that is sufficient to withstand typical pressures at which the particular fuel is stored. For example, in the context of hydrogen, cartridge 100 may typically store hydrogen at a pressure up to 5,500 pounds per square inch (PSI). The nominal operating pressure of fuel vessel 110 containing hydrogen is about 250 PSI with the maximum operating pressure of about 600 PSI, with a nominal test pressure of about 2,200 PSI and a nominal burst pressure of 5,100 PSI.

Figure 3B:
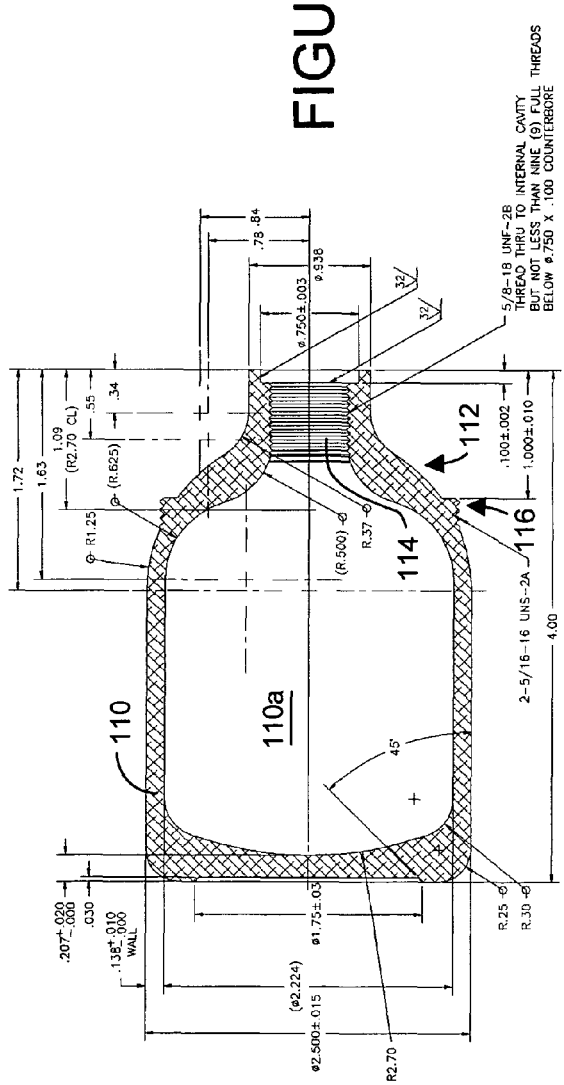
FIGS. 3A and 3B are perspective and cross-sectional views, respectively, of a fuel vessel of a fuel cartridge according to one aspect of one embodiment of the present invention, including exemplary dimensions of certain aspects pertaining to the fuel vessel (see, FIG. 3B)
Figure 3A:
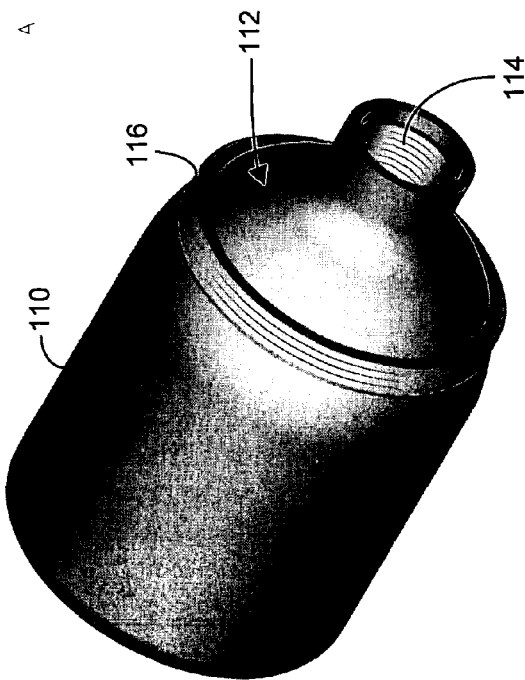
Figure 3C:
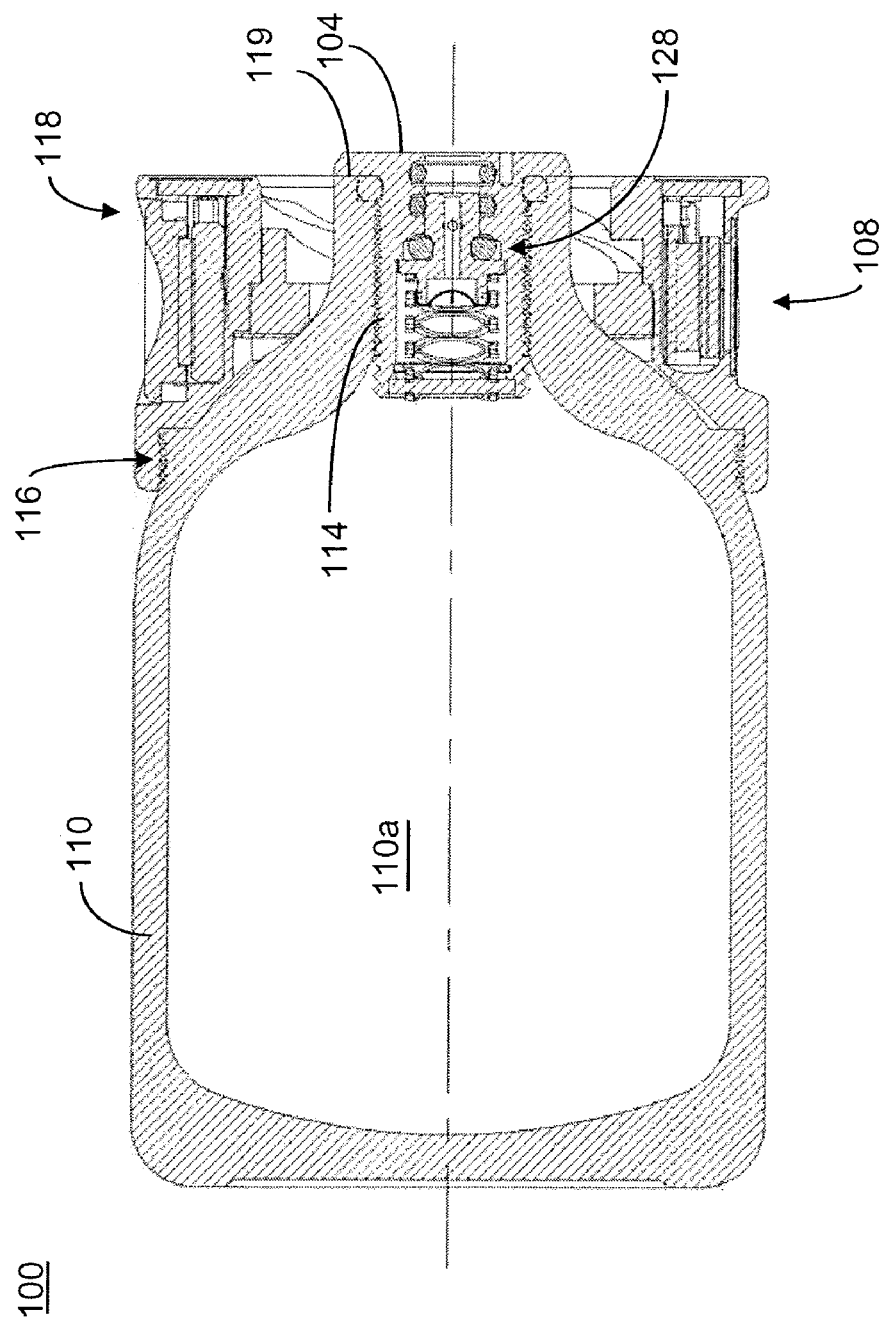
FIG. 3C is a cross-sectional view of a fuel vessel of a fuel cartridge according to one aspect of one embodiment of the present invention, in conjunction with the cartridge valve assembly and cartridge collar assembly.
Figure 4A:
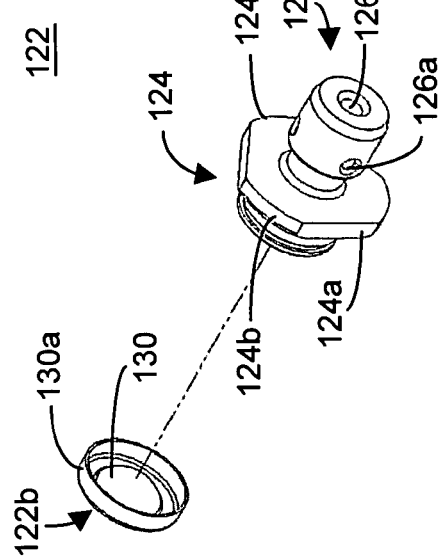
FIG. 4A illustrates a perspective exploded view of a poppet assembly, wherein the burst disc and retainer are separated from the remaining elements of the poppet assembly, according to one aspect of one embodiment of the present invention.
Figure 4B:
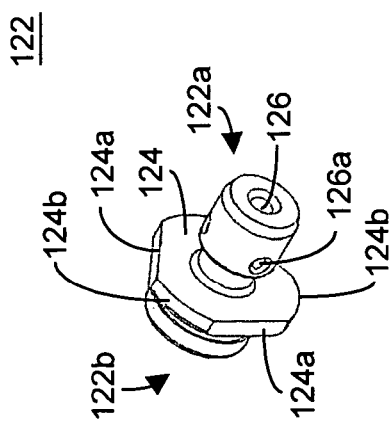
FIG. 4B illustrates a perspective assembled view of the exemplary poppet assembly of FIG. 4A.
Figure 5A:
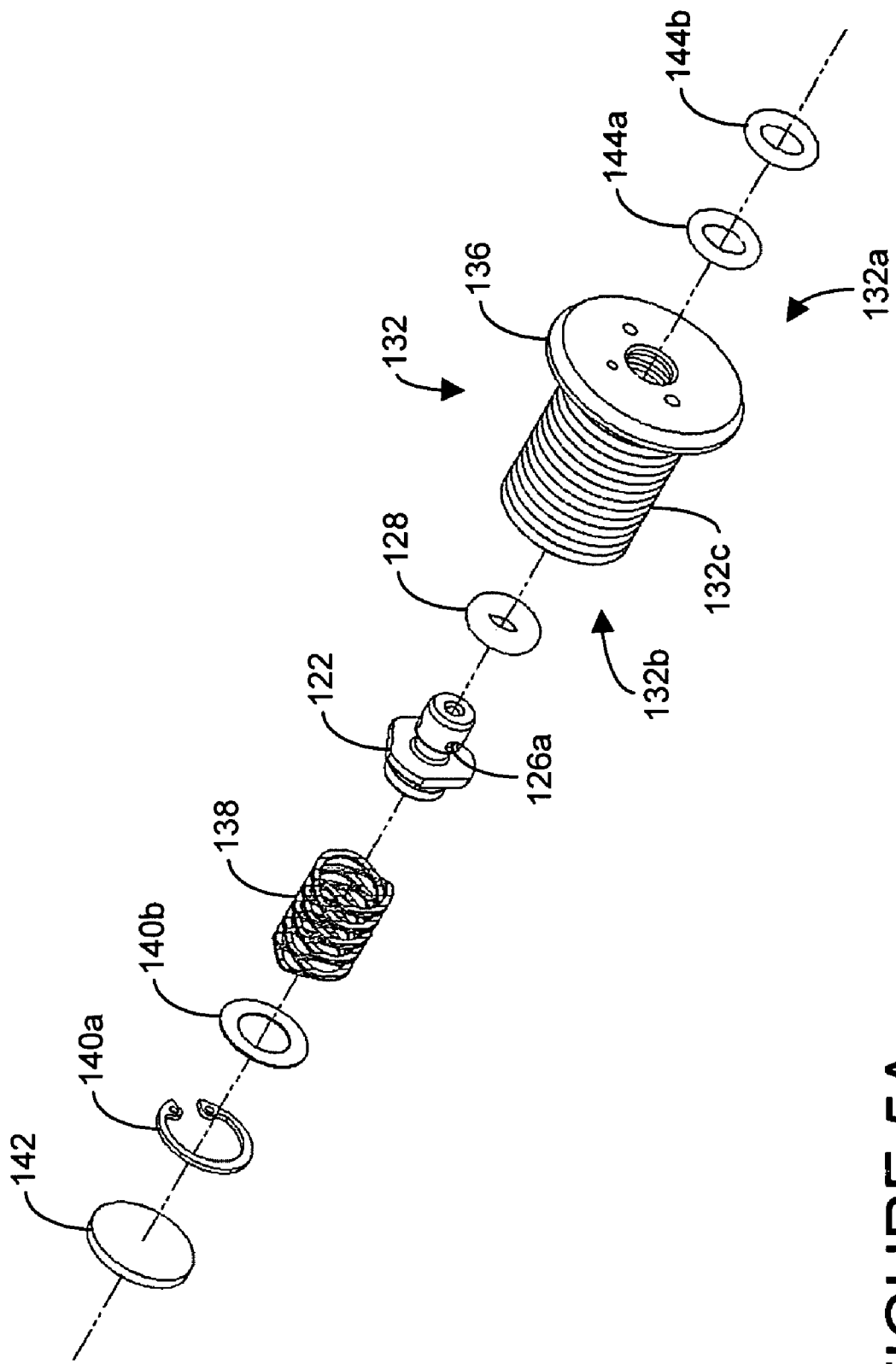
FIG. 5A illustrates a perspective exploded view of a cartridge valve assembly, according to one aspect of one embodiment of the present invention.

With continued reference to FIGS. 3A, 3B and 3C, in one embodiment, the material of fuel vessel 110 is aluminum such as 6061 aluminum. The vessel 110 is of a conventional shape including a necked-down area 112 that has internal threads 114 that act as a securing element for cartridge valve assembly 104.

The fuel vessel 110 also includes a collar-attaching mechanism 116, illustrated as threads. The collar-attaching mechanism 116 facilitates connecting cartridge collar assembly 118 to fuel vessel 110 via reciprocal threads of cartridge collar assembly 118 and the threads of collar-attaching mechanism 116. (See, FIG. 3C). As discussed in detail below, cartridge collar assembly 118 is a mechanism to attach cartridge electronics 106 and cartridge display 108 to fuel vessel 110.

In the case of a hydrogen based fuel cell system, within chamber 110a of fuel vessel 110 will be particles of hydride material, not shown, that absorbs hydrogen to aid in the storage of hydrogen and/or enhance the capacity of storage of hydrogen in vessel 110.

Cartridge Valve Assembly 104: The cartridge valve assembly 104 that allows a controlled exchange of fuel, in the form of a fluid, from fuel cartridge 100 to power unit 200. The cartridge valve assembly 104 may be securely fixed to fuel vessel 110 via threads that mate with internal threads 114 of fuel vessel 110. (See, for example, FIG. 3C). In operation, cartridge valve assembly 104 includes at least two states, including a first or activated state, whereby fuel may flow either out of or into chamber 110a of fuel cartridge 100. In a second or inactive state, cartridge valve assembly 104 prevents or prohibits fuel flow and, as such the fuel is contained within chamber 110a. The cartridge valve assembly 104 includes sealing ring 128 which is designed to prevent fluid leakage from chamber 110a of fuel cartridge 100. (See, for example, FIG. 3C).

Notably, fuel flows out of fuel cartridge 100 when, for example, fuel cartridge 100 is employed as a fuel source for power unit 200. In the event that fuel cartridge 100 is rechargeable, fuel may flow into fuel cartridge 100 when, for example, fuel cartridge 100 is being filled or refilled (for example, periodically, intermittently, or as needed).

With reference to FIGS. 3C and 4A-4D, in one embodiment, cartridge valve assembly 104 includes poppet assembly 122. The poppet assembly 122 includes a distal end 122a and a proximal end 122b. In operation, the position of flange 124, relative to cartridge valve assembly 104, permits the flow of gas (i.e., flow around flange 124). In this embodiment, flange 124 is multisided, including at least one flat side 124a around the edge of flange 124. Notably, the number of sides may be any number but is generally greater than two. In the illustrative embodiment, flange 124 includes three flat sides along with three curved sides 124b. Notably, other designs are suitable and will be apparent to one of skill in the art, in view of this description. For example, notched, scalloped and/or drilled hole designs may be implemented.

The poppet assembly 122 further includes an internal fluid passage 126. In this illustrative embodiment, internal fluid passage 126 extends the length of poppet assembly 122. Other designs of internal fluid passage 126 are suitable and will be apparent to one of skill in the art, in view of this description. Indeed, other embodiments of internal fluid passage 126 are discussed below.

The poppet assembly 122 may also include sealing ring 128 to enhance or provide a sufficient seal when poppet assembly 122 is disposed in combination with the other elements of cartridge valve assembly 104.

A fluid conduit 126a extends from internal fluid passage 126 to the external surface at distal end 122a of poppet assembly 122. A burst disc 130 is located at proximal end 122b of poppet assembly 122 and is retained in place by retainer 130a which may be specifically designed or suitable for burst disc 130. Notably, burst disk 130 and retainer 130a may be separate components or may be manufactured as a unitary component. The retainer 130a fits onto proximal end 122b of poppet assembly 122 by means of threads that reciprocate with the internal threads on retainer 130a or other means apparent to one of skill in the art in view of this description. (See, FIG. 4A). A "circle" of solder may be disposed on burst disk 130 and retainer 130a is fitted onto the threads at proximal end 122b of poppet assembly 122 and thereafter heated to further secure burst disk 130 and retainer 130a to proximal end 122b of poppet assembly 122. The burst disk 130 may also be secured by crimping in place the retainer 130a to the proximal end 122b of poppet assembly 122.

Notably, burst disk 130 may also function as a pressure relief device. In this regard, burst disk 130 may be designed to open at a preset pressure and close when the pressure drops below a predetermined pressure. In one embodiment, burst disc 130 may be rated at a certain pounds per square inch rating which is less than the rating for fuel vessel 110 (illustrated in FIGS. 3A-3C). Generally, burst disc 130 may be rated from 500-3,000 lbs. per square inch.

With reference to FIGS. 5A-5E, cartridge valve assembly 104 further includes valve assembly housing 132 having distal end 132a and a proximal end 132b. An assembly housing cavity 134 extends the length of elongate valve assembly housing 132. The valve assembly housing 132 includes a radially extending flange 136 located at distal end 132a of housing 132. The external surface 132c of valve assembly housing 132 includes threads for securing cartridge valve assembly 104 to fuel vessel (via internal threads 114 as illustrated in FIG. 3C). An internal shoulder in valve assembly housing 132 restricts internal cavity 134 to facilitate secure "seating" and/or placement of sealing ring 128 of poppet assembly 122.

The cartridge valve assembly 104 further includes spring 138 that fits against poppet assembly 122 and pushes against flange 124. A fastener 140a, illustrated in this example as a snap ring, fits against washer 140b and spring 138 to retain the washer-spring poppet assembly and sealing ring 128 within housing cavity 134 of valve assembly housing 132. Once the snap ring is in place, multi-sided flange 124 fits against the shoulder of valve assembly housing 132 with sealing ring 128 positioned to seal the internal section of cartridge valve assembly 104.

A particle filter 142 maybe positioned at proximal end 132b (when assembled) of valve assembly housing 132 designed to maintain and/or retain any particulate matter that is in cavity 110a of fuel vessel 110. The particle filter 142 allows fuel in the form of a fluid (for example, hydrogen or methanol), to flow through while retaining any solids inside vessel 110 (for example, hydride).

Figure 7A:
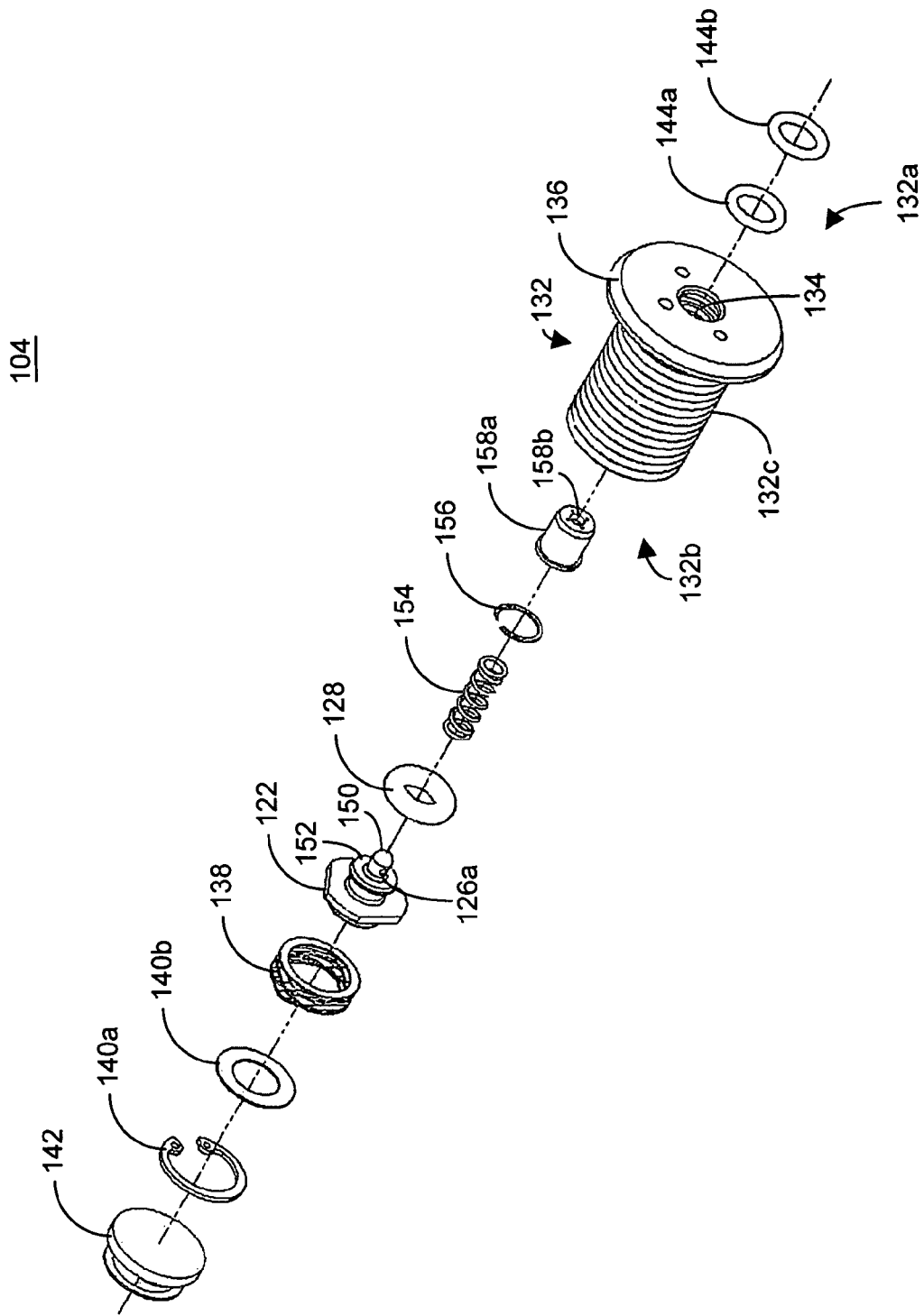
FIG. 7A illustrates a perspective exploded view of a cartridge valve assembly, according to another embodiment of an aspect of the present invention.

Notably, one or more sealing rings 144 (144a and 144b in FIG. 7A) may be positioned inside distal end 132a of housing cavity 134 to enhance the integrity of cartridge valve assembly 104 when combined with the other components of fuel cartridge 100. In this way, the seal of the fuel or fluid path between fuel cartridge 100 and power unit 200 (or refill station 300 if applicable), when engaged or connected, is enhanced.

Figure 6A:
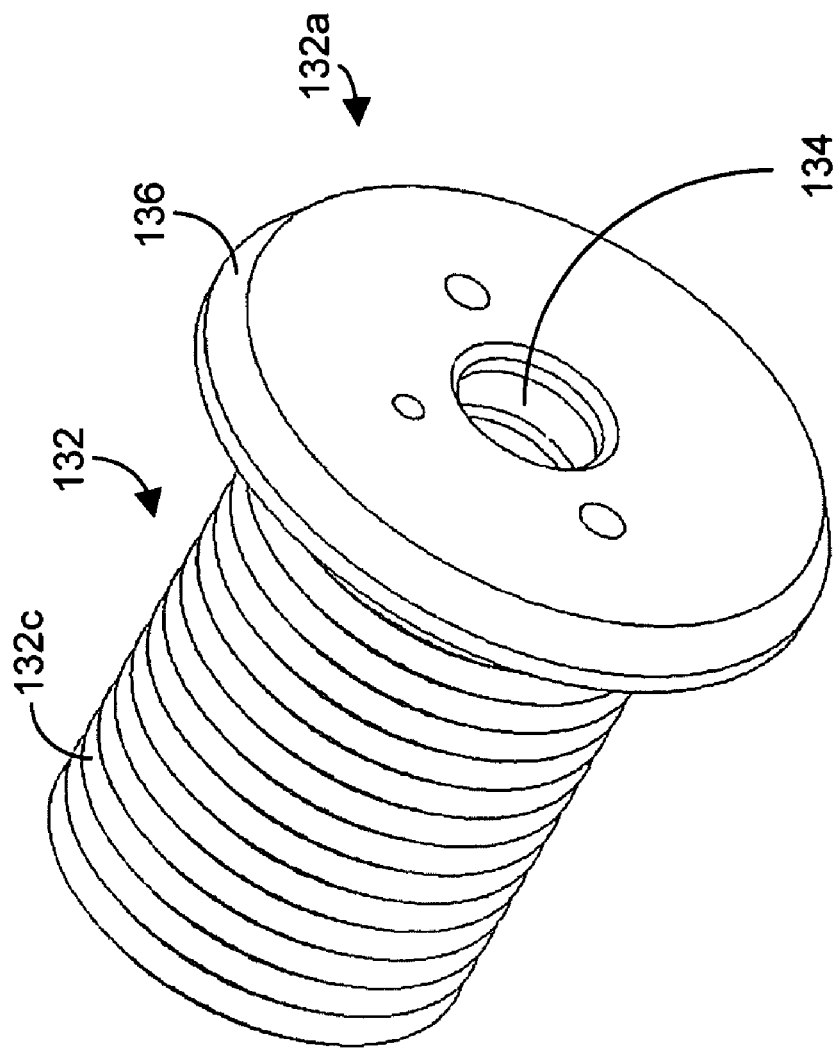
FIG. 6A illustrates a perspective view of the exemplary cartridge valve assembly of FIG. 5B, according to one aspect of one embodiment of the present invention.

With reference to FIG. 6B, in operation, cartridge valve assembly 104 is in the closed state when flange 124 of poppet assembly 122 and sealing ring 128 are pushed against the internal shoulder of housing cavity 134 by spring 138. In this condition, fuel (i.e., fluid) contained in chamber 110a of fuel cartridge vessel 110 is prevented from flowing into chamber 110a or out of chamber 110a. The proximal end 132b fits inside vessel 110. The particle filter 142 located, positioned and designed to allow fluid flow but prevent and/or minimize any particulate matter from escaping vessel 110.

With reference to FIG. 6C, cartridge valve assembly 104 is in an open state (whereby fluid may flow into or out of chamber 110a) when flange 124 of poppet assembly 122 and sealing ring 128 (i.e. at distal end 122a of poppet assembly 122) are forced or pushed away from the internal shoulder of housing cavity 134. In this way, a void 146 forms between flange 124/sealing ring 128 and the internal shoulder of housing cavity 134 thereby allowing fluid or fuel (for example, hydrogen) to flow under pressure (into or out of chamber 110a) between particle filter 142, internal cavity 134 of housing 132, spring 138, around gap 148 into void 146 and through fluid conduit 126a to internal fluid passage 126.

Notably, in operation, distal end 122a of poppet assembly 122 is pushed by pins (not illustrated) of power unit 200 or refill unit 300 that protrude into cartridge valve assembly 104 on a front surface of flange 136. This action or operation will be described and illustrated in detail below.

The cartridge valve assembly may be implemented using many different designs. Such alternative designs are intended to fall within the scope of this invention. Indeed, all types of cartridge vale assemblies are intended to fall within the scope of this invention.

Figure 7B:
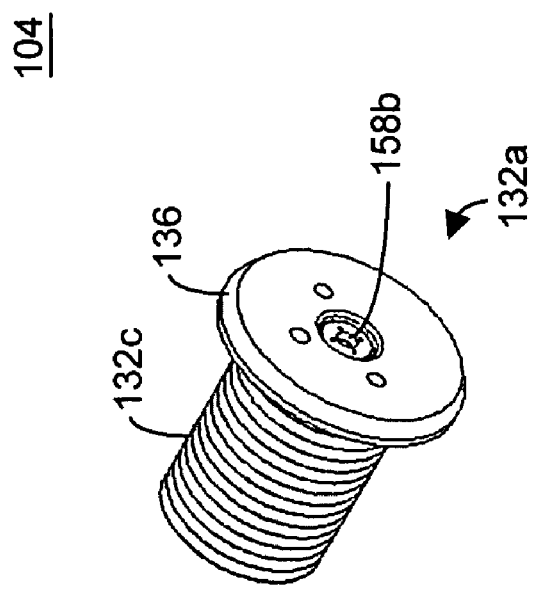
FIG. 7B illustrates a perspective assembled view of the exemplary cartridge valve assembly of FIG. 7A.
Figure 7C:
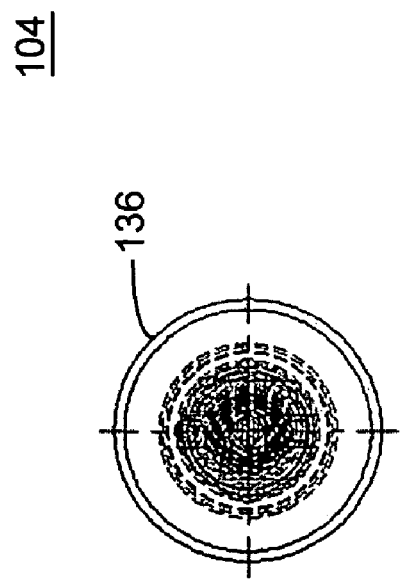
FIG. 7C illustrates an end view (from the distal end) of the exemplary cartridge valve assembly of FIG. 7B.
Figure 7D:
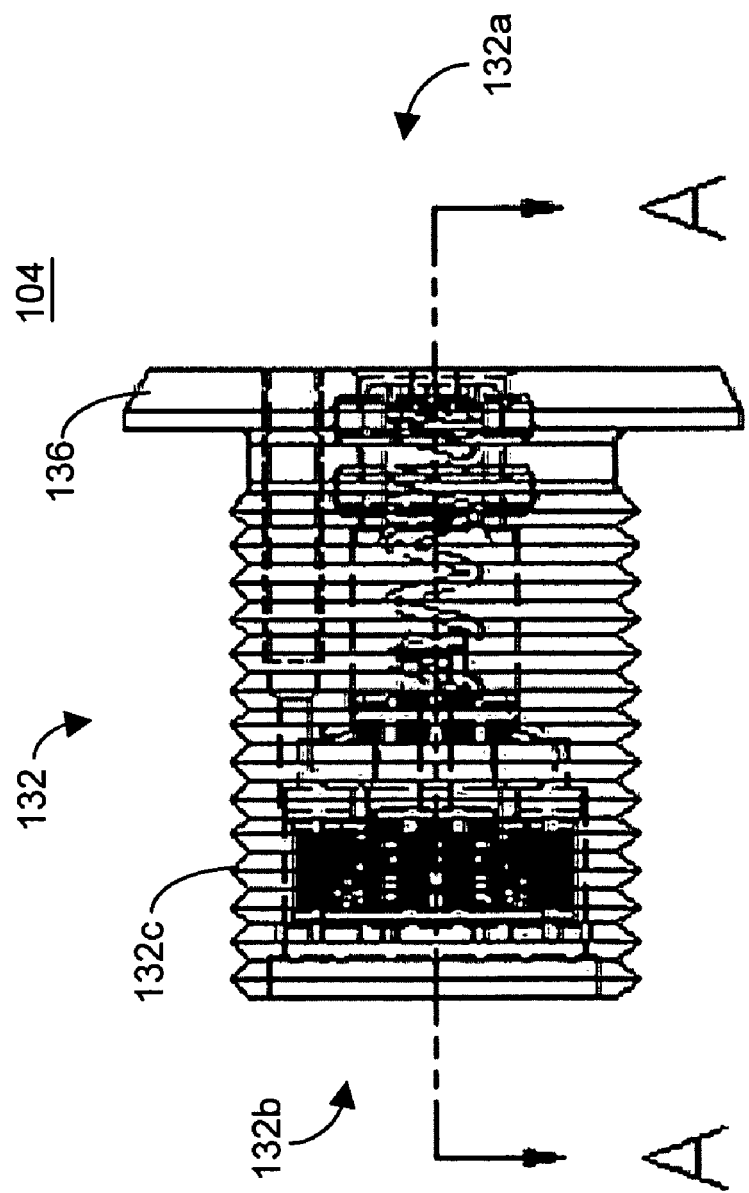
FIG. 7D illustrates a side view of the exemplary cartridge valve assembly of FIG. 7B.

Notably, many modifications may be made to the exemplary cartridge valve assembly of FIGS. 4A-4E, 5A-5E and 6A-6C. Such modifications are intended to fall within the scope of the present invention. For example, with reference to FIGS. 7A-7C, in one alternative design, cartridge valve assembly 104 includes poppet assembly 122 having an internal fluid passage that is closed by cap 150 so that the passage does not extend the entire length of poppet assembly 122, but the passage still communicates with fluid conduit 126a. In addition a flange or shoulder 152 is located at distal end 122a of poppet assembly 122.

The cartridge valve assembly 104 of this embodiment also includes spring 154 that fits over tip 150 of poppet assembly 122. The spring 154 is designed to be a "weaker" spring than spring 138 and, as such, spring 154 tends to compress before and at a greater rate than spring 138. When assembled, cap 158a fits over spring 154 and snap ring 156 fits around spring 154.

Figure 7E:
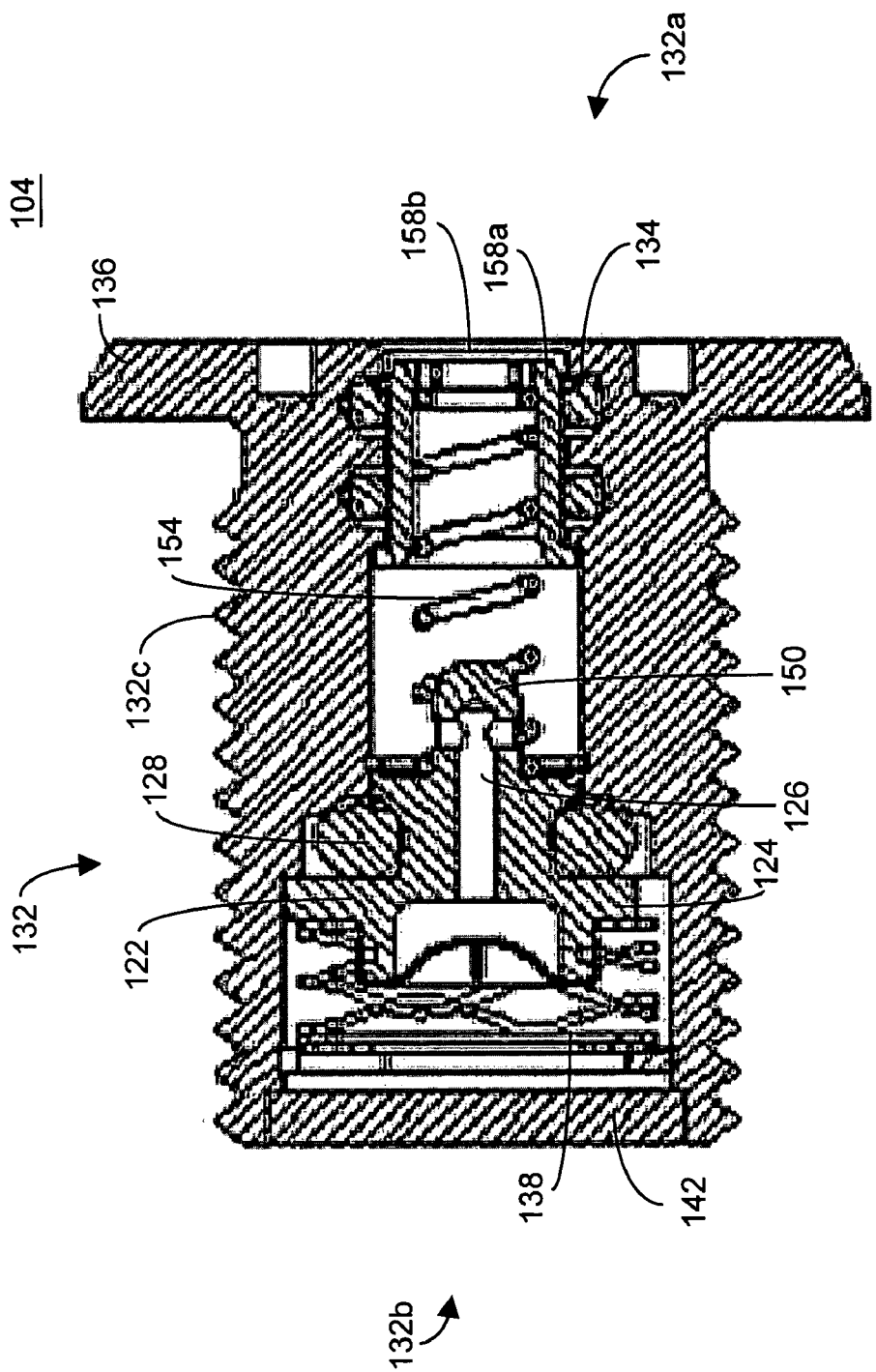
FIG. 7E illustrates a cross-section view of the exemplary cartridge valve assembly of FIG. 7D sectioned along lines A-A, wherein the cartridge valve assembly is in the closed state.
Figure 7F:
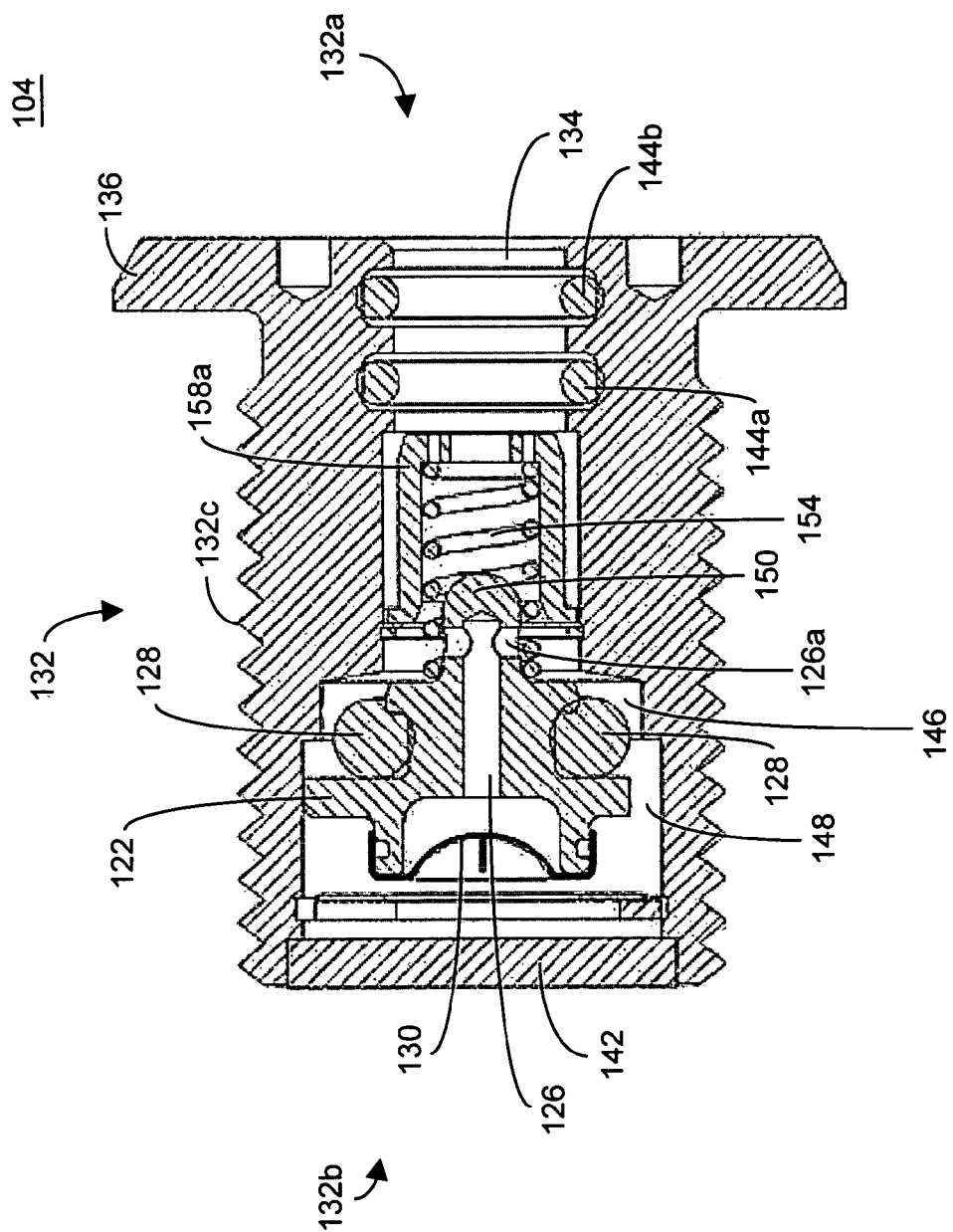
FIG. 7F illustrates a cross-section view of the exemplary cartridge valve assembly of FIG. 7D sectioned along lines A-A, wherein the cartridge valve assembly is in the open state.

With reference to FIGS. 7E and 7F, because spring 138 is stronger than spring 154, the closed state or position will be the natural position or non-enabled state taken by cartridge valve assembly 104. In this regard, in operation, spring 138 will push or force poppet assembly 122 so that sealing ring 128 lodges against the shoulder of valve assembly housing 132 thereby effectively preventing any flow of fluid through housing cavity 134. With reference to FIG. 7F, cartridge valve assembly 104 is placed in an open state when front surface 158*b* of cap 158*a* of cartridge valve assembly 104 is engaged by a pin or stub component (not illustrated) of either power system 200 or refill unit 300 (as discussed in detail below) via housing cavity 134 at distal end 132*a* of valve assembly housing 132. In response, spring 154 is compressed and forces or pushes cap 158*a* to bottom out on snap ring 156 of valve assembly 104. In addition, the pin or stub component (not illustrated) has a further extension or finger that extends from its tip and is of a diameter that will extend through an opening on front surface 158*b* of cap 158*a*. The force against cap 158*a* and tip 150 is sufficient to move poppet valve 122 to a position as illustrated in FIG. 7F. In this way, fluid (for example, gas) from cartridge valve assembly 104 flows through passage 148 and out void 146 into housing cavity 134 at distal end 132*a* of valve assembly housing 132.

In operation, when fuel cartridge 100 is connected to power unit 200 and/or refill unit 300, cartridge valve assembly 104 is automatically opened by connection at the interface of unit 200 and/or refill unit 300. In this regard, a male-type extension on the interface of power unit 200 and/or refill unit 300 engages a female-type receptacle of mechanical interface 102*b* of fuel cartridge 100 at a distal end 132*a* of cartridge valve assembly 104 to engage, activate and/or push poppet assembly 122 from a closed position or state (see, for example, FIGS. 6B and 7E) to an open position or state (see, for example, FIGS. 6C and 7F). When mechanical interface 102*b* is disconnected from the mechanical interface of power unit 200 and/or refill unit 300, cartridge valve assembly 104 automatically closes to thereby seal and/or retain the fluid/fuel in vessel 110 and maintain an appropriate pressure of the fuel in fuel cartridge 100.

In particular, a pin or stub component of power unit valve assembly 204 or refill unit valve assembly 304 (discussed below with respect to power unit 200 and refill unit 300, respectively) having two segments, one that is positioned against the top of cap 158*a* and a finger or extension that fits through the opening on front surface 158*b* of cap 158*a*, several advantages may be gained, including: (1) the valve is protected from dirt, etc. by the presence of cap 158*a*; (2) cap 158*a* is designed to be of such a distance that even if it is pushed down by foreign object such as a pen tip, the tip of the pen does not contact poppet tip 150; and (3) even if a sharp item such as a paper clip were inserted into valve 104 there would not be sufficient leverage on contacting the rounded poppet tip 150 to open it (thereby presenting safety feature against the improper discharge of fuel).

Figure 8B:
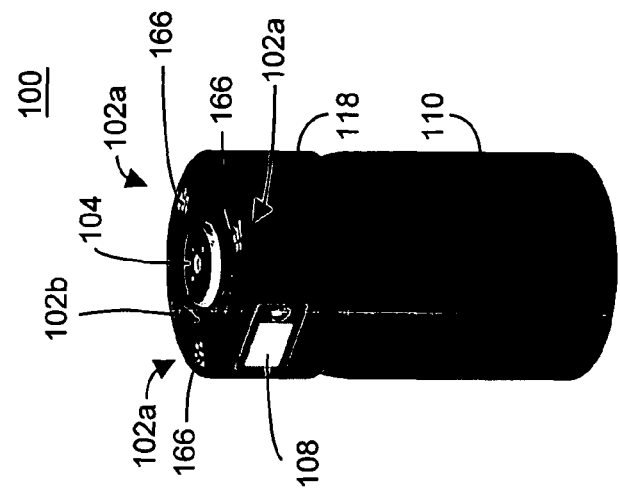
FIGS. 8A and 8B illustrate an exploded perspective and a perspective view, respectively, of the fuel cartridge according to one embodiment of an aspect of the present invention wherein the fuel cartridge includes cartridge collar assembly.
Figure 8A:
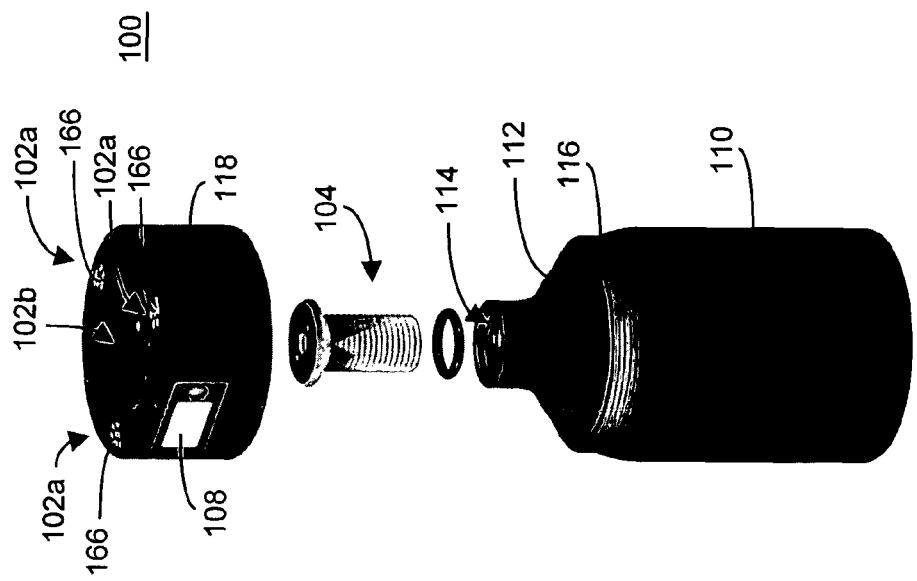

Cartridge Collar Assembly 118: The cartridge collar assembly 118 is a mechanism that secures or attaches cartridge interface 102, cartridge electronics 106 and cartridge display 108 to fuel vessel 110. With reference to FIGS. 8A and 8B, in one embodiment, cartridge collar assembly 118 is attached to necked-down area 112 of fuel vessel 110. The electrical interface 102*a*, mechanical interface 102*b* and display are fixed on, in and/or to cartridge collar assembly 118 to facilitate communication to other components of fuel cell power and management system 10. In addition, an opening in cartridge collar assembly 118 exposes cartridge valve assembly 104, when secured to fuel vessel 110, to allow fluid communication between cartridge valve assembly 104 and, for example, power unit 200 and/or refill unit 300.

It should be noted that there are many techniques and architectures to secure cartridge interface 102, cartridge electronics 106 and/or cartridge display 108 (or any other components) to fuel vessel 110. The cartridge collar assembly 118 illustrated and described herein is an exemplary technique/architecture that is a compact, lightweight and efficient design. It is intended that all techniques and architectures to secure cartridge interface 102, cartridge electronics 106 and/or cartridge display 108 (and/or any other components) to fuel vessel 110 of fuel cartridge 100, whether now known or later developed, fall within the scope of the present invention. Indeed, in those instances where one or more of such components need not be fixed to, for example, fuel vessel 110, in order to provide a unitary and/or integrated fuel cartridge 100, cartridge collar assembly 118 may not be necessary and/or advantageous.

With reference to FIGS. 8A, 8B, 9A and 9B, in one embodiment, cartridge interface 102, cartridge electronics 106 and cartridge display 108 are disposed on, in and/or to cartridge collar assembly 118. In this regard, cartridge display 108 may be a visual display of information (for example, an LCD or LED device) that provides or affords the user or operator the ability to view, for example, various parameters of fuel cartridge 100 and/or other units of fuel cell power and management system 10. A protective cover or membrane 108*a* may be disposed over cartridge display 108. In addition, contact switch 108*b* (for example, a contact button) may be employed to activate cartridge display 108 in those instances where display 108 is not continuously "on" (for example, when fuel cartridge 100 is in a "power saver" mode and/or when fuel cartridge 100 is idle).

In one embodiment, power source 160 (for example, a battery) may be employed to provide power to, for example, the circuitry of cartridge electronics 106 and cartridge display 108. The power source 160 may be disposable, non-renewable or renewable. A cover plate 162 protects the battery from damage, secures power source 160 to or in cartridge collar assembly 118 and, in the context of a battery, facilitates removal and replacement thereof. In addition, battery compression pad 162*a* may be employed to maintain power source 160 in the appropriate position as well as ensure or enhance sufficient electrical contact between power source 160 and other circuitry of fuel cartridge 100.

With reference to FIGS. 8A, 8B, 9A and 9B, electrical interface 102*a* includes circuit board 164 (illustrated in this exemplary embodiment as a ring printed circuit board) to provide electrical interconnection between the circuitry of fuel cartridge 100. The circuit board 164 may be fitted with a plurality of electrical contact points (illustrated as electrical contact pads 166) to facilitate electrical communication to devices external to fuel cartridge 100. In the exemplary embodiment, there are three equally spaced distances around circuit board 164. A circuit board cover 164*a*, having suitably located "cut-out" areas or openings 164*b* is fitted so that contacts 166 are exposed when circuit board cover 164*a* is disposed on circuit board 164.

Figure 11A:
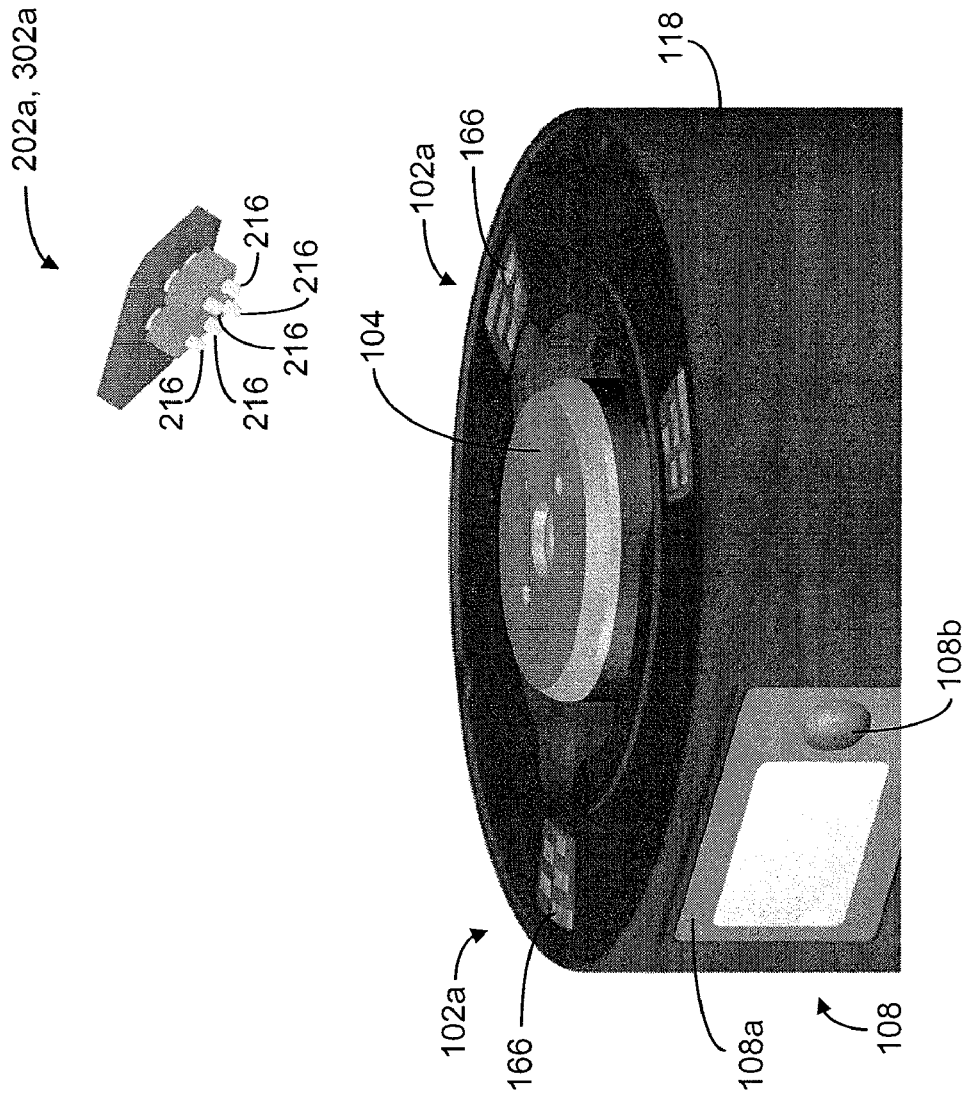
FIG. 11A is a perspective view of the electrical interface of the cartridge interface, according to one embodiment, in conjunction with the cartridge collar assembly and a portion of the electrical interface of the power unit or refill unit (if applicable), wherein contacts of the power unit or refill unit engage the contact pads of the electrical interface of the cartridge interface of the fuel cartridge.
Figure 11B:
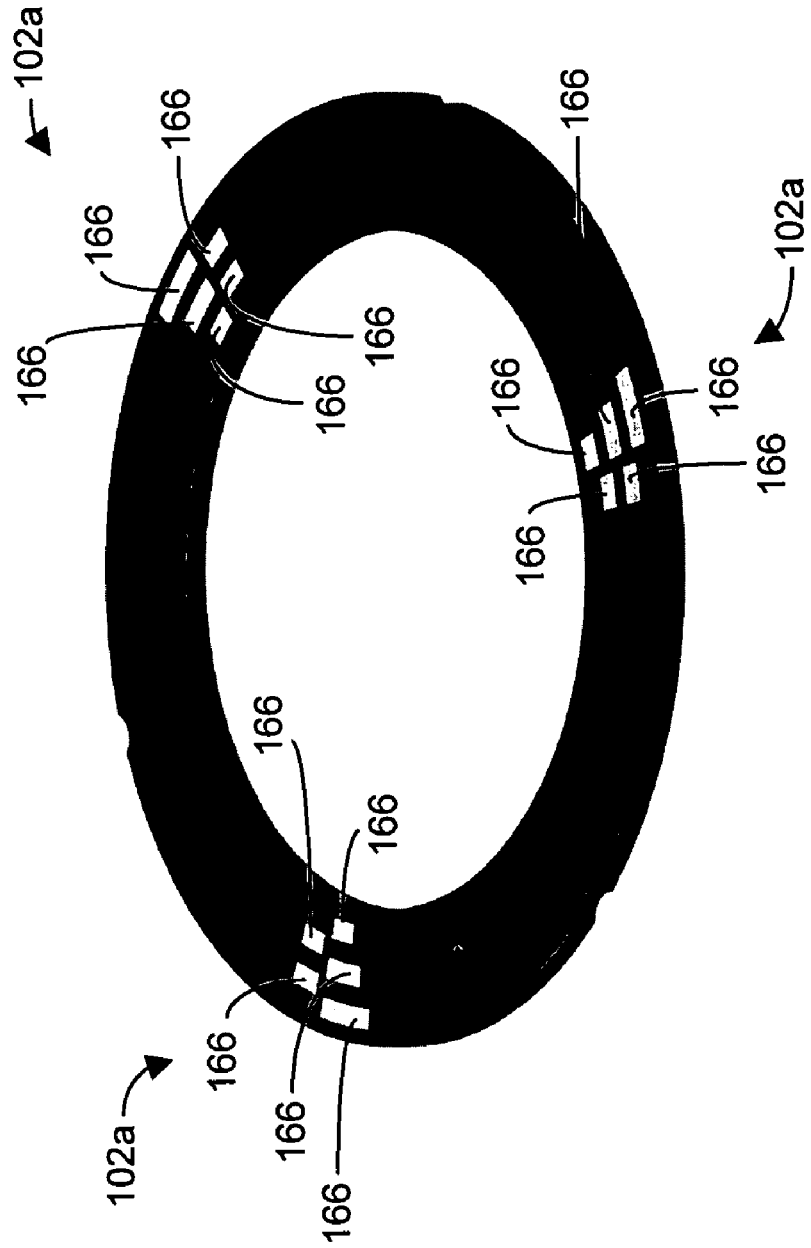
FIG. 11B is a perspective view of the electrical interface, according to one exemplary embodiment of an aspect of the present invention.

Moreover, electrical contact pads 166 (of electrical interface 102*a*) are disposed and located on circuit board 164 and externally exposed via openings in cartridge collar assembly 118. (See, for example, FIG. 11B). In this way, contact pins of electrical interface 202*a* and 302*a* of power unit 200 and refill unit 300, respectively, may engage electrical contacts 166 to provide suitable electrical communication and/or connection therebetween. (See, for example, FIGS. 11A, 16B and 18B).

In this embodiment, circuit board 164 includes three sets of contact pads 166 at three positions or locations on circuit board 164. (See, for example, FIG. 11B). These positions or locations are consistent with or conform to the mating operation of the mechanical interfaces of power unit 200 and refill unit 300. However, one skilled in the art, in view of this disclosure, will recognize that one set of contact pads 166 is sufficient to provide electrical communication between fuel cartridge 100 and power unit 200 (or refill unit 300).

In one embodiment, contact pads 166 are gold plated for easy contact. For safety considerations, a ground first contact arrangement may be advantageous; however, other arrangements are suitable.

Notably, a retention ring may be attached to an adapter guide using screws, detent springs and balls. The adapter guide and the retention ring may be press fit within cartridge collar assembly 118, and then "sandwiched" between fuel vessel 110 and cartridge collar assembly 118. In this way, various components (for example, circuit board 164 and circuit board cover 164a) may be securely housed and/or retained within cartridge collar assembly 118.

As mentioned above, fuel cartridge 100 also includes mechanical interface 102b to "mate" with the mechanical interface of power unit 200 or refill unit 300 (for example, when fuel cartridge 100 is a rechargeable-type) to facilitate a controlled, continuous and/or uninterrupted exchange of fuel from fuel cartridge 100 to power unit 200 (or to fuel cartridge 100 from refill unit 300, if applicable). In one embodiment, mechanical interface 102b is disposed in cartridge collar assembly 118 to provide a relatively compact design that facilitates attachment of fuel cartridge 100 (and, in particular, fuel vessel 110 and cartridge valve assembly 104) to, for example, power unit 200 or refill unit 300. (See, for example, FIGS. 12, 16B and 18B). An adapter guide 168, which is part of cartridge mechanical interface 102b, may be fitted into cartridge collar assembly 118 to aid in securing in fuel cartridge 100 to power unit 200 or refill unit 300.

Figure 12:
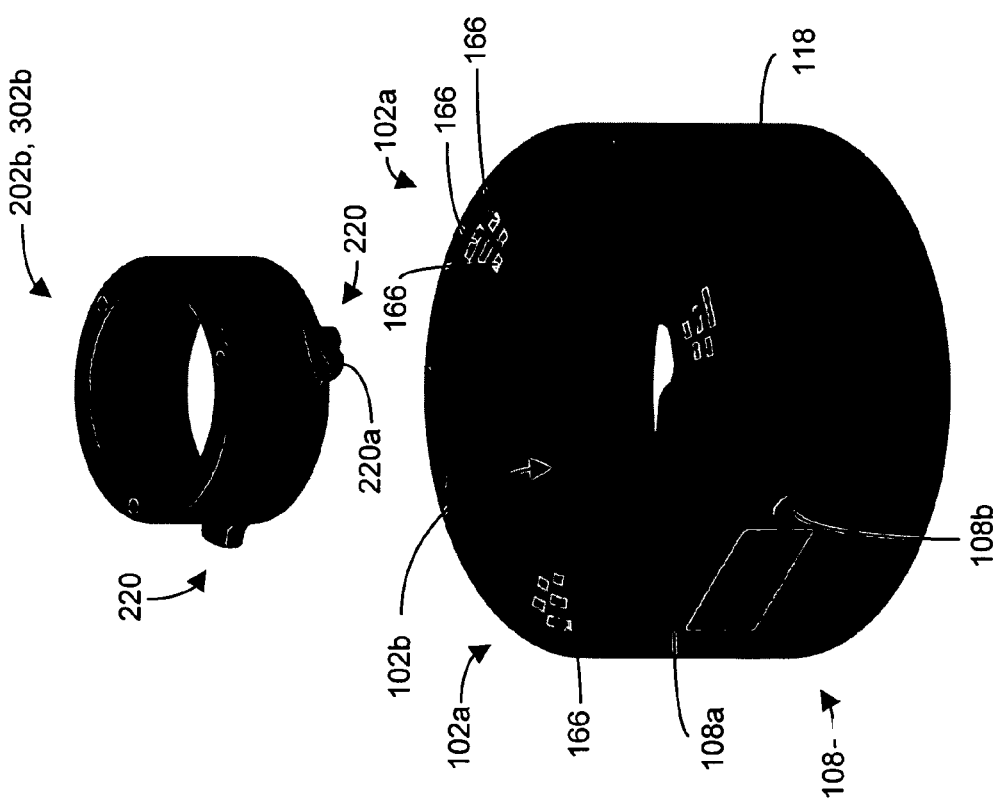
FIG. 12 is a perspective view of the mechanical interface of the cartridge interface, according to one embodiment, in conjunction with the cartridge collar assembly and a portion of the mechanical interface of the power unit or refill unit (if applicable)
Figure 13A:
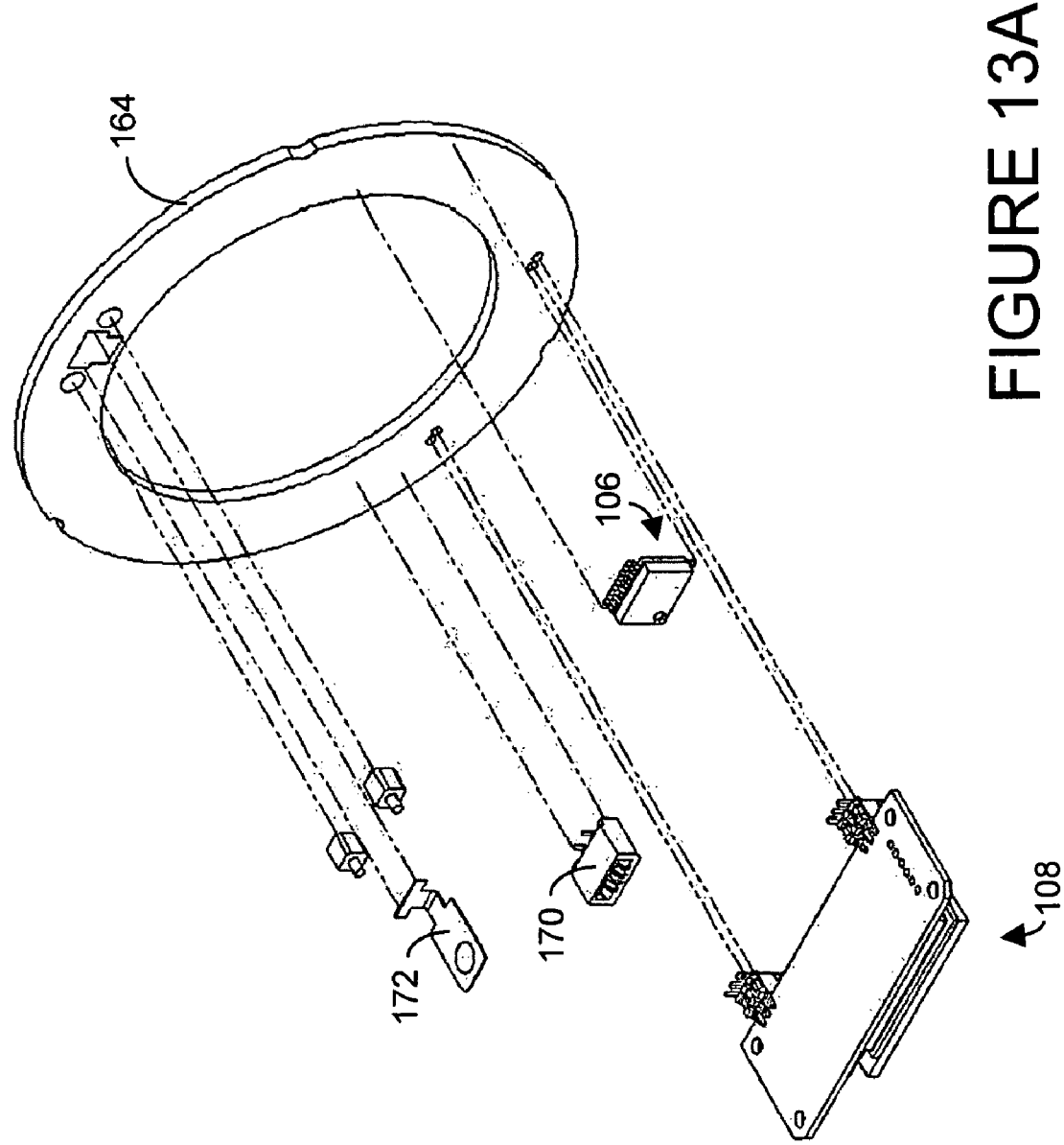
FIG. 13A illustrates a perspective exploded view of certain components of the cartridge electronics and cartridge display of the fuel cartridge, according to one exemplary embodiment of the present invention.
Figure 13C:
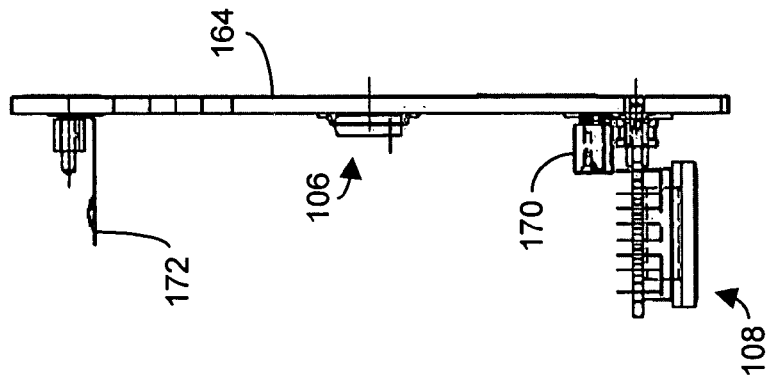
FIG. 13C illustrates a side view of the exemplary cartridge electronics and cartridge display of FIG. 13B.
Figure 13B:
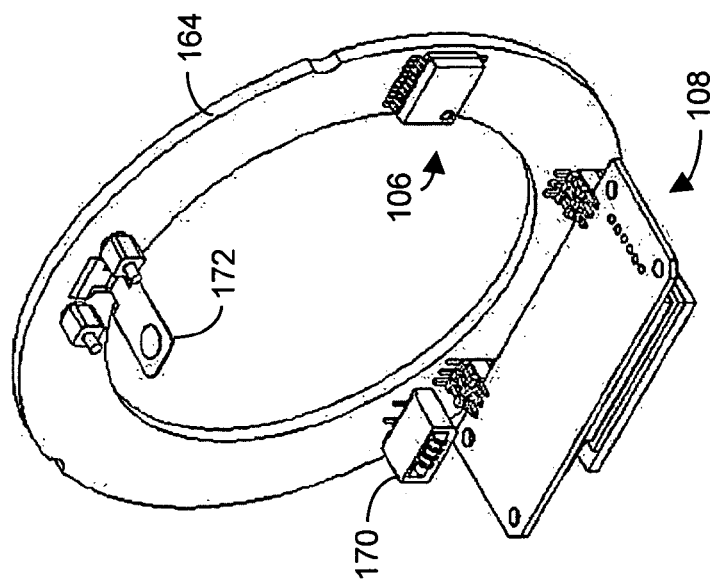
FIG. 13B illustrates a perspective assembled view of certain components of the exemplary cartridge electronics and cartridge display of FIG. 13A.

With reference to FIG. 12, cartridge mechanical interface 102b includes a female-type receptacle to engage a male-type mechanical interface 202b and mechanical interface 302b of power unit 200 and refill unit 300, respectively. Although discussed in detail below, the exemplary male-type mechanical interface includes an "ear" having a beveled edge that fits into the recess of the female-type receptacle mechanical interface 102b. The "ear", and in particular the beveled edge, is designed to meet with a shoulder of the female-type receptacle mechanical interface 102b. Thereafter, an approximate quarter turn secures fuel cartridge 100 into power unit 200 or refill unit 300. This interface design requires little twisting motion and force to secure fuel cartridge 100 into power unit 200 or refill unit 300 and is designed to be oriented at any one of three positions. As such, this design prevents push back of fuel cartridge 100 by mechanically engaging the female-type receptacle of mechanical interface 102b before opening cartridge valve assembly 104 of fuel cartridge 100.

Notably, mechanical interface 102b of fuel cartridge 100 includes several elements that facilitate a "smooth" interface of fuel cartridge 100 with power unit 200 and/or refill unit 300. In this regard, mechanical interface 102b, in this embodiment, is a "female-type receptacle" that cooperates with cartridge valve assembly 104 of fuel cartridge 100. The mechanical interface 102b is designed to receive a male extension of power unit 200 and/or refill unit 300, as illustrated in FIG. 12. The female-type receptacle of mechanical interface 102b provides a way to align, insert, captivate, and retain fuel cartridge 100 in power unit 200 and/or refill unit 300. Moreover, the design of mechanical interface 102b also facilitates the actuation of cartridge valve assembly 104 to permit or prevent the flow of fluid in or out of fuel cartridge 100.

As discussed in more detail below, associated with the female-type receptacle of mechanical interface 102b is a male-type extension of mechanical interface 202b of power unit 200 and/or mechanical interface 302b of refill unit 300. (See, for example, FIG. 12). The male-type extension mechanical interface 202b of power unit 200 and/or mechanical interface 302b of refill unit 300 is designed to engage female-type receptacle of mechanical interface 102b of fuel cartridge 100 to provide a means for the alignment, insertion, captivation, and retention of fuel cartridge 100 therein.

Electrical Interface 102a and Cartridge Electronics 106: With reference to FIGS. 11B, 13A-13C, in one exemplary embodiment, cartridge display 108 and cartridge electronics 106 are mounted on circuit board 164. The circuit board 164 includes electrical traces to interconnect the various components, including cartridge display 108, cartridge electronics 106 and electrical interface 102a.

The connector 170, shown as a 4-circuit connector, is located on the underside of circuit board 164. The connector 170 may be employed to, among other things, test various components and features of cartridge display 108 and cartridge electronics 106 are mounted on circuit board 164.

The power source contact 172 engages power source 160 (for example, a battery) to provide a suitable voltage and current to the circuitry and components interconnected by the electrical traces on circuit board 164.

Figure 14A:
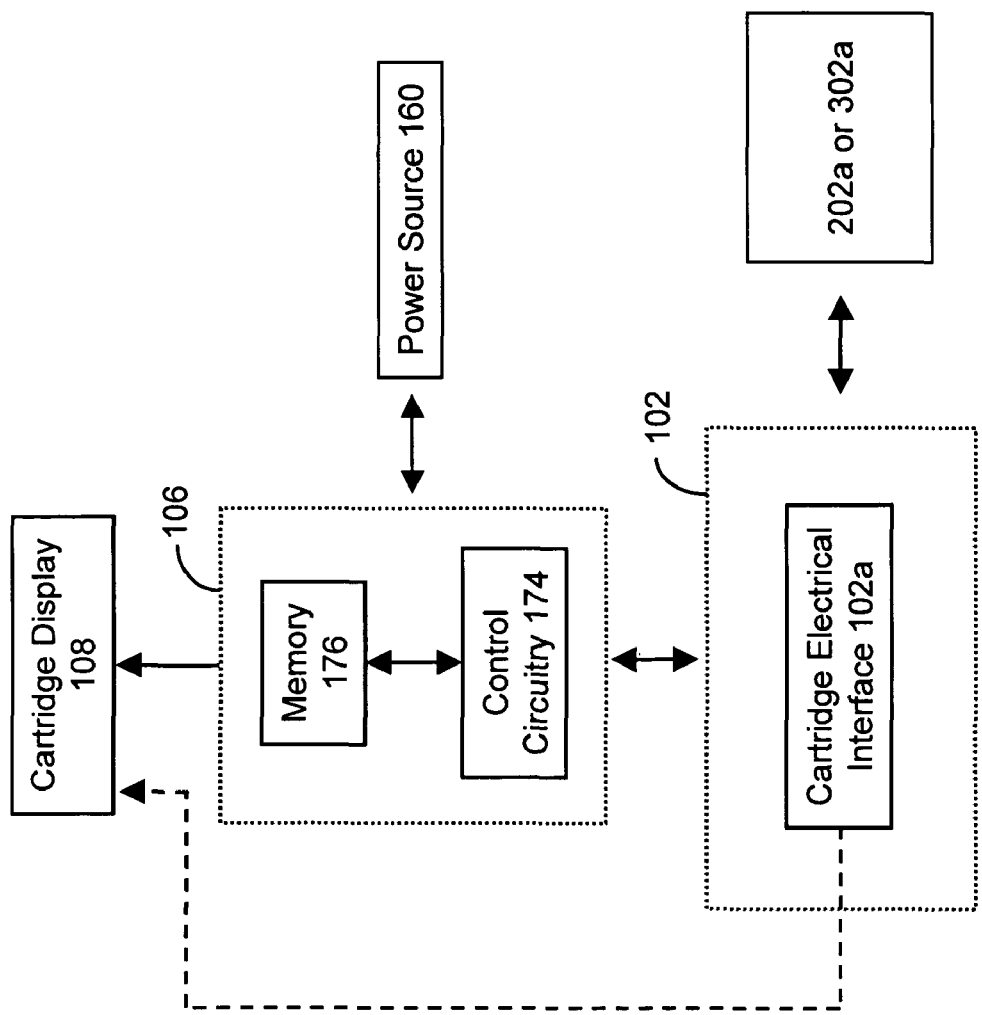
FIGS. 14A, 14B and 14C are schematic block diagrams of the cartridge electronics, in conjunction with the cartridge display, according to exemplary embodiments of one aspect of the present invention.

With reference to FIG. 14A, in one embodiment, cartridge electronics 106 includes control circuitry 174 to determine, monitor, manage and/or control one or more operating parameters of fuel cartridge 100, power unit 200 and/or fuel cell power and management system 10. The control circuitry 174 may be a combination of discrete components or may be an integrated circuit(s), for example, one or more suitably programmed (whether in situ or prior to deployment) microprocessors, microcontrollers, state machines and/or field programmable gate arrays ("FPGAs"). The control circuitry 174 receives electrical power from power source 160 (for example, a rechargeable or non-rechargeable battery).

In one embodiment, cartridge electronics 106 also includes memory 176, for example, SRAM, DRAM, ROM, PROM, EPROM and/or EEPROM. In this embodiment, data or information representative of one or more operating parameters and/or microcode may be stored in, for example, an SRAM, DRAM, ROM or EEPROM. The data or information representative of one or more operating parameters may include a current status and/or historical data. It should be noted that memory 176 may be comprised of discrete component(s) or may reside on or in an integrated circuit that performs other non-memory operations, for example, control circuitry 174.

In one embodiment, cartridge memory 176 may store or retain one or more attributes of the associated fuel cartridge 100. For example, cartridge memory 176 may store data that uniquely identifies the associated fuel cartridge 100 (for example, an associated serial number, date of manufacture and/or assembly, data pertaining to the supplier of one or more components of fuel cartridge 100, fuel capacity, number of refills (if applicable) and dates thereof, revision or series of electronics/software, and/or type of fuel) and/or more generally identifies the associated fuel cartridge 100 (for example, model number). Moreover, cartridge memory 176 may also include a filling algorithm for cartridge 100. In this way, when cartridge 100 is connected to refill unit 300 or power unit 200, cartridge memory 176 may have available the unique and general characteristics (for example, capacity and type of fuel) of cartridge 100 to be provided to power unit 200, refill unit 300 (if applicable) or a user/operator, which can confirm, verify or ensure proper operation and integration.

As mentioned above, control circuitry 174 may determine, monitor, manage and/or control one or more operating parameters, for example, the amount of fuel remaining and/or consumed, the rate of fuel consumption, the temperature and pressure of the fuel in fuel vessel 110a, temperature of the exterior of fuel vessel 110a, and the operating status of fuel cartridge 100 (for example, whether any faults or errors have been registered). For example, control circuitry 174 may calculate, determine and/or monitor the amount of fuel remaining and/or consumed, as well as the rate of fuel consumption, based on an amount of time fuel cartridge 100 has been connected to and providing fuel to power unit 200 and/or connected to and receiving fuel from refill unit 300 (where fuel cartridge 100 is a rechargeable type). This status may be periodically updated and/or stored in memory 176 for access by, for example, power unit 200 and/or refill unit 300.

Figure 14B:
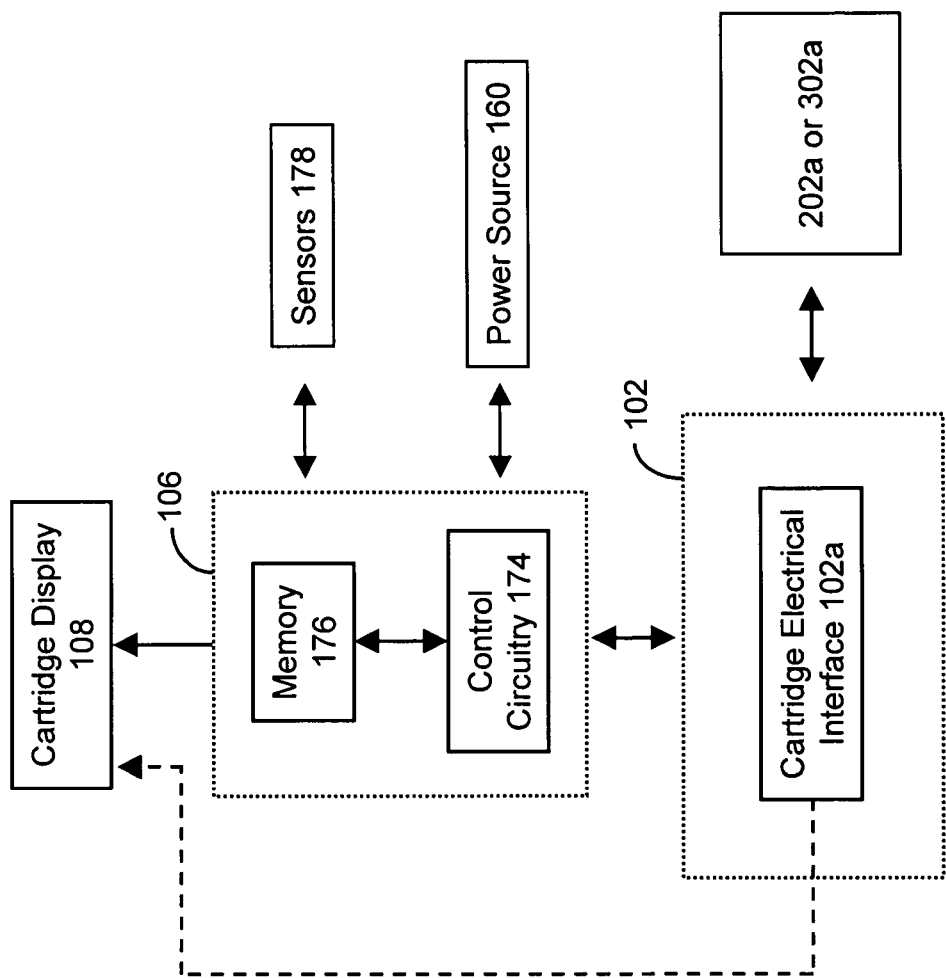

With reference to FIG. 14B, in addition to, or in lieu thereof, control circuitry 174 may receive, sample and/or acquire data from sensors 178 (for example, temperature, pressure and/or flow rate type sensors) disposed on, in or near cartridge vessel 110*a*, cartridge valve assembly 104, and/or cartridge interface 102. The control circuitry 174 may employ data from sensors 178 to calculate one or more operating parameters of fuel cartridge 100 using mathematical relationships and/or modeling. For example, control circuitry 174 may obtain data which is representative of the temperature and pressure of the fuel in fuel cartridge vessel 110*a* and, based thereon, calculate/estimate the amount of fuel consumed from and remaining in fuel cartridge vessel 110*a*. Indeed, control circuitry 174 may obtain data which is representative of the flow rate of fluid through cartridge valve assembly 104 and, using time data, calculate the amount of fuel remaining in fuel cartridge vessel 110*a* and amount of time until all fuel is spent from fuel cartridge 100.

The sensors 178 may be discrete elements, such as one or more micro electromechanical ("MEMS") devices, or sensors that are integrated into cartridge vessel 110*a*, cartridge valve assembly 104, and/or cartridge interface 102, or into components thereof (for example, one or more temperature elements integrated into and disposed within the walls of cartridge vessel 110*a* or in valve assembly housing 132). Notably, any type of sensor (for example, MEMS), whether now known or later developed, may be implemented herein.

In one embodiment, control circuitry 174 may receive instructions and/or data from circuitry external to fuel cartridge 100, for example, from a user or an operator via an external device (computer or PDA), and/or from power unit 200 or refill unit 300. In this regard, control circuitry 174 may be instructed to, for example, determine, measure, sample one or more operating parameters, and thereafter control and/or manage the operation of fuel cartridge 100 and/or power unit 200 (for example, adjust and/or modify the rate of fuel consumption and/or the temperature of the exterior of fuel vessel 110*a* (and indirectly the temperature of the fuel in fuel vessel 110*a*) by engaging a cooling unit disposed on power unit 200.

In one embodiment, control circuitry 174 provides and/or communicates the measured, sampled, sensed and/or determined operating parameter(s) to power unit 200, refill unit 300 and/or a user or an operator. For example, control circuitry 174 may determine the state of fill or amount of fuel remaining in fuel vessel 110*a* (using the techniques described above) and, thereafter, provide data which is representative of that operating parameter to power unit 200. In response, power unit 200 may adjust one or more of its operating parameters, for example, reduce the rate of power/fuel consumption.

Alternatively, an operator or a user (or external device) may receive data which is representative of the state of fill or amount of fuel remaining in fuel vessel 110*a* from fuel cartridge 100 and, in response thereto, modify or change the operating characteristics of power unit 200 (directly or remotely). In this way, one or more operating parameters (for example, reduce the fuel consumption and/or electrical power output/generation, or engage a cooling unit to influence the temperature of fuel vessel 110*a*) may be modified and/or changed.

The modification or change to the operating characteristics of power unit 200 may be preset, predetermined and/or pre-programmed. In this way, the response is present, predetermined and/or pre-programmed based on the conditions, operating characteristics and/or operating parameters of power unit 200 and/or fuel cartridge 100. Alternatively, or in addition thereto, instructions defining the modification or change to the operating characteristics may be transmitted or provided by the operator, user or external device (for example, the user determines the appropriate modification or change based on one or more considerations, factors, constraints and/or objectives).

Figure 14C:
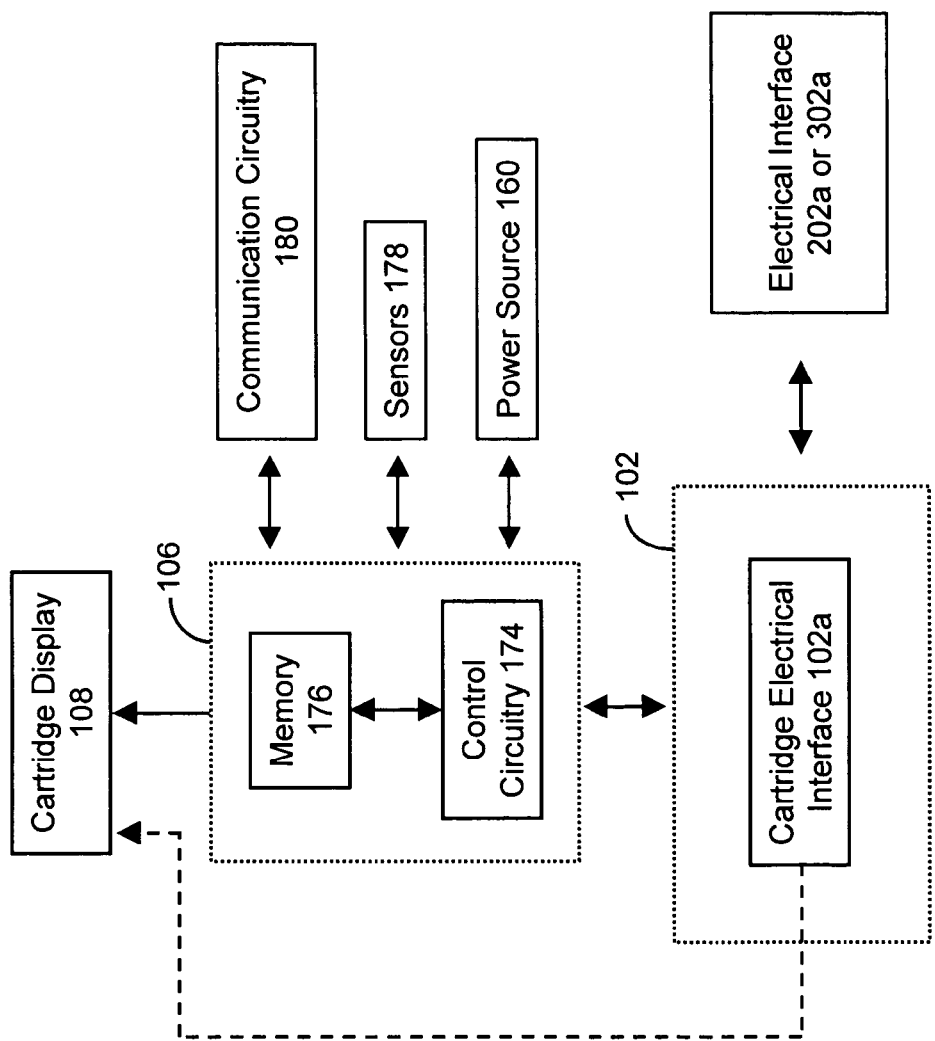

With reference to FIG. 14C, such instructions and/or data may be received or transmitted via communication circuitry 180. In this regard, communication circuitry 180 may employ well known wired (for example, a serial input/output port) and/or wireless techniques (for example, infrared, radio frequency, cellular phone, bluetooth techniques). Indeed, the instructions and/or data may be provided remotely via wireless techniques. Notably, any communication technique, whether now known or later developed, is intended to fall within the scope of the present invention.

In one embodiment, communication circuitry 180 may be employed to transmit data and/or commands to power unit 200, refill unit 300 and/or other external devices (for example, to a local or remote computer). The data may be representative of one or more operating parameters (that were measured, sampled, sensed by sensors 178 and/or determined by control circuitry 174) such as temperature, pressure, rate of fuel consumption by power unit 200, and/or amount of remaining fuel in fuel cartridge 100. The data may also be representative of the overall status of fuel cartridge 100. As mentioned above, communication circuitry 180 may employ wired or wireless techniques.

Figure 14D:
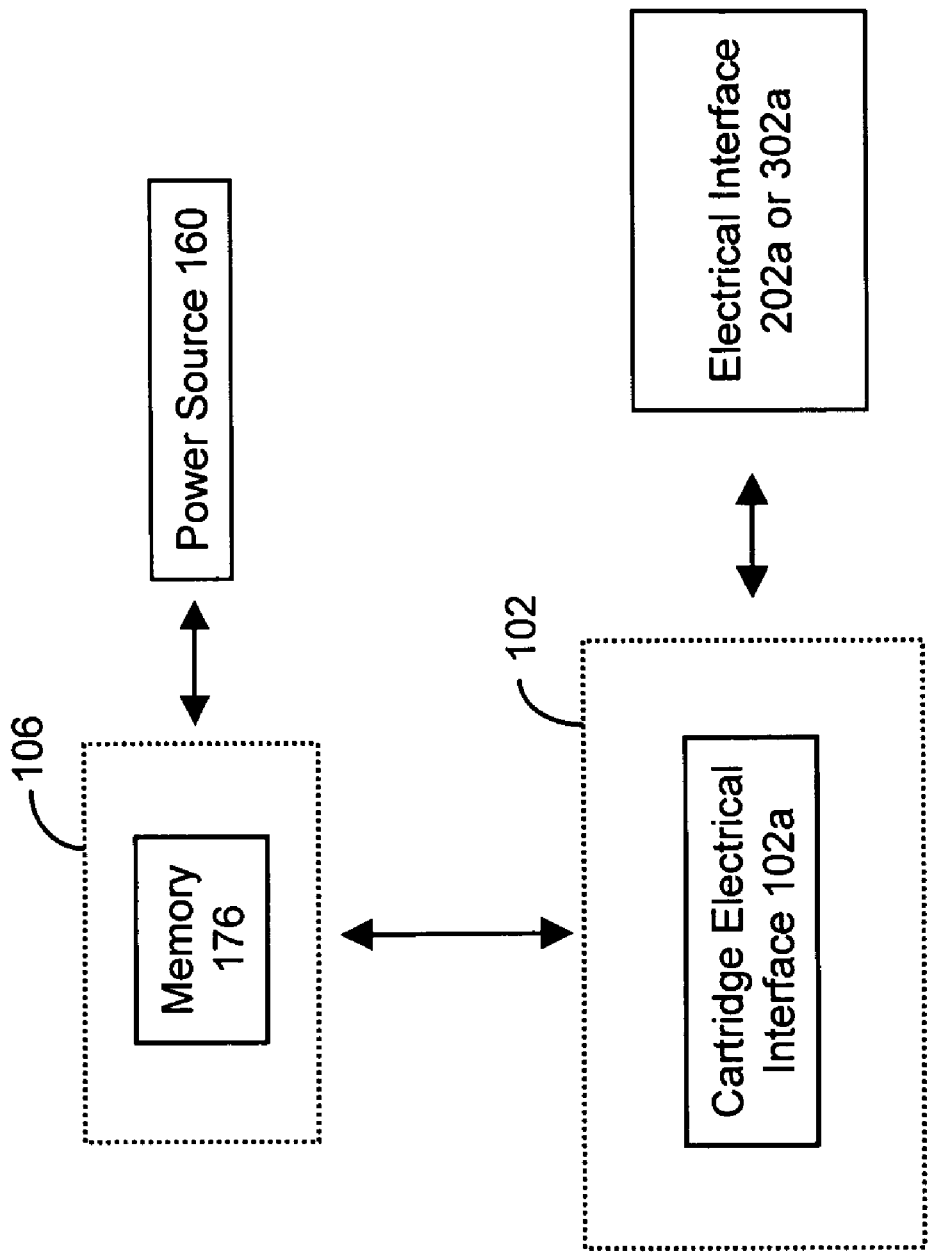
FIGS. 14D, 14E and 14F are schematic block diagrams of the cartridge electronics according to other exemplary embodiments of one aspect of the present invention.
Figure 14E:
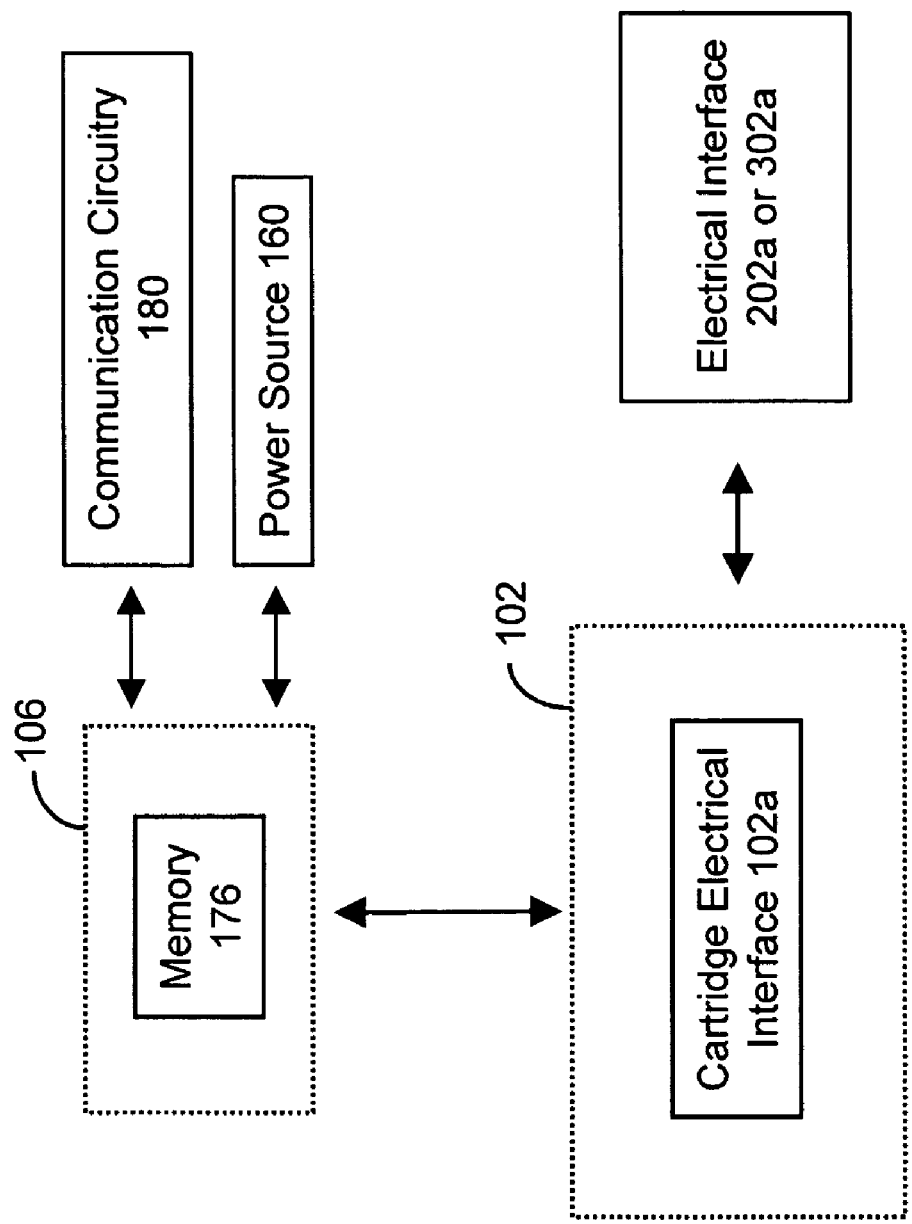
Figure 14F:
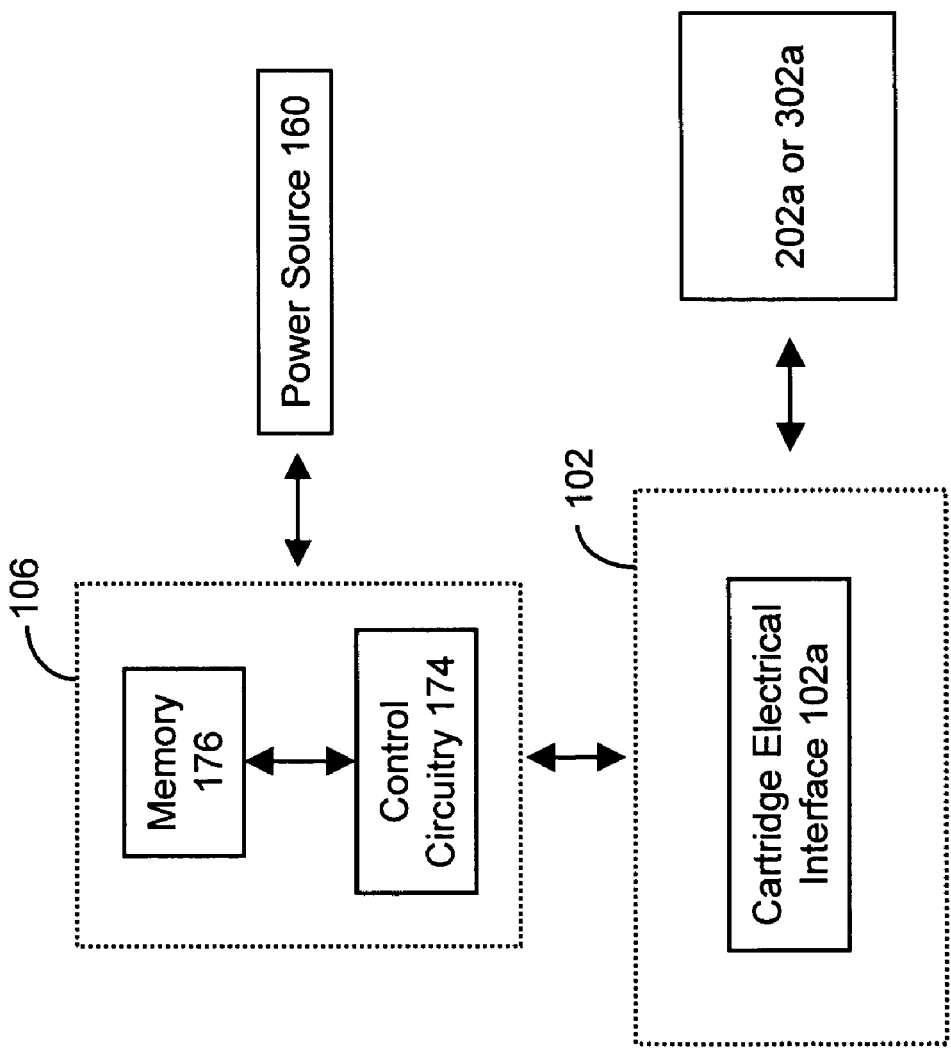

With reference to FIG. 14D, in another embodiment, cartridge electronics 106 includes memory 176 to store and/or retain data provided by power unit 200, refill unit 300 and/or circuitry external to system 10. In this embodiment, power unit 200 and/or refill unit 300 (where applicable) may, among other things, determine, monitor and/or control one or more operating parameters, for example, the amount of fuel remaining and/or consumed, the rate of fuel consumption and/or the temperature and pressure of the fuel in fuel vessel 110*a*. The power unit 200 and/or refill unit 300 (where applicable) may periodically or intermittently store data which is representative of the one or more operating parameters in memory 176. In this way, the status of the fuel cartridge (for example, the amount of fuel remaining) is retained within the fuel cartridge's memory (i.e., memory 176) so that it may be available for recall by power unit 200, refill unit 300 and/or circuitry external to system 10. Notably, it may be advantageous to include communication circuitry 180 in order to facilitate access to memory 176. (See, for example, FIG. 14E).

Notably, control circuitry 174 performs or executes routines or programs that implement particular tasks and/or operations described herein. The functionality of the routines or programs may be combined or distributed. Such programming is well known to those skilled in the art, particularly in view of this disclosure. All programming techniques, and implementations thereof, to determine, monitor, manage and/or control one or more operating parameters and/or characteristics of fuel cartridge 100, power unit 200 and/or refill unit 300, whether now known or later developed, are intended to fall within the scope of the present invention.

Figure 15:
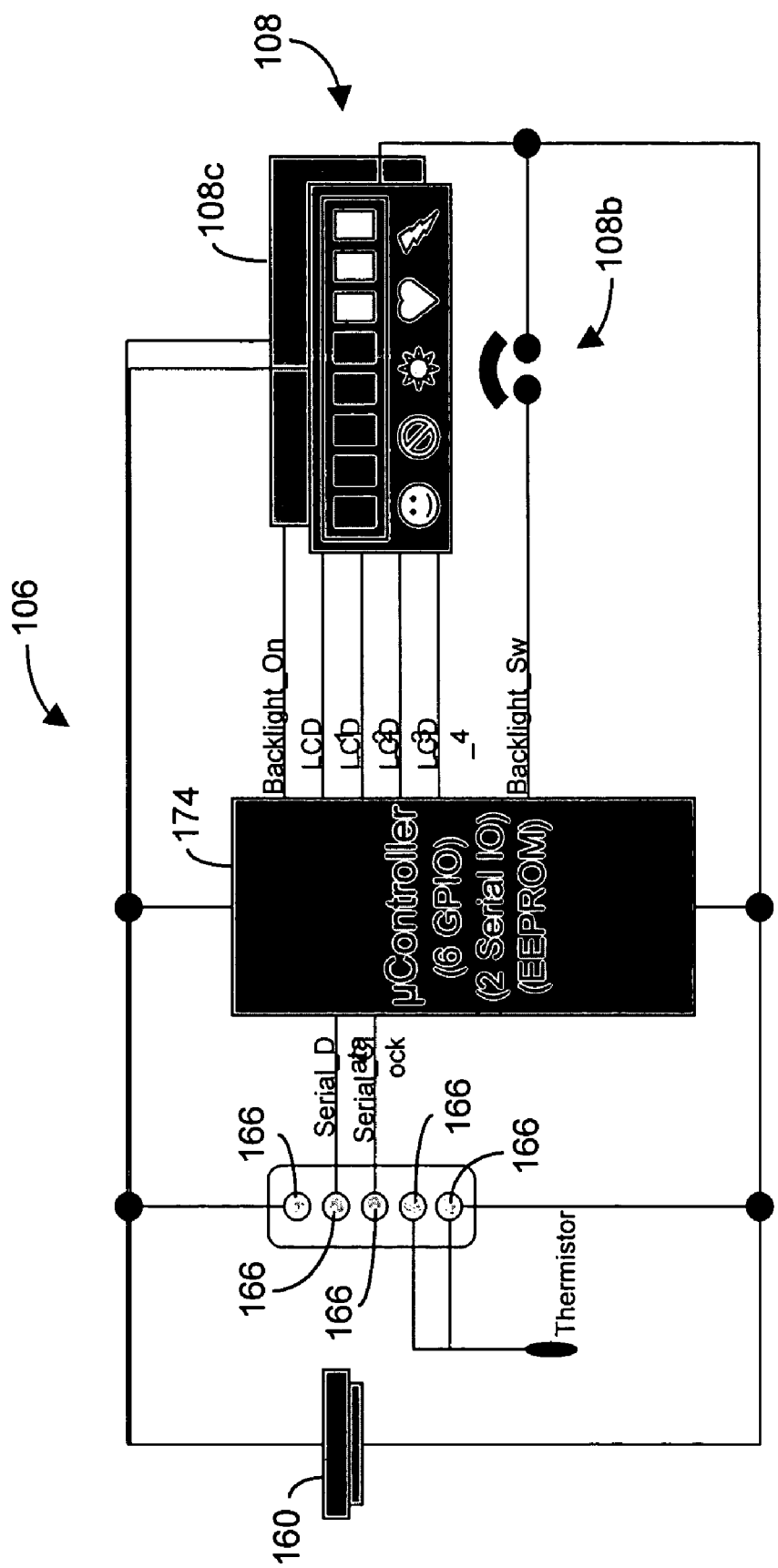
FIG. 15 illustrates a schematic representation of components of the cartridge electronics and cartridge display, according to another exemplary embodiment of an aspect of the present invention.

With reference to FIG. 15, in one embodiment, control circuitry 174 is a microcontroller integrated circuit having EEPROM resident therein. The power source 160, in this embodiment, is a battery that provides electrical power to the circuitry/devices of cartridge electronic 106 (for example, microcontroller) and cartridge display 108 (for example, an LCD or LED display). Where an LCD display is implemented, it may be advantageous to include a backlight 108c which provides suitable lighting when the ambient light may not be sufficient. The contact switch 108b enables backlight 108c. That is, when contact switch 108b is depressed, backlight 108c will illuminate the LCD display.

Exemplary Assembly of Fuel Cartridge 100: In those instances where fuel cartridge employs a hydride material, after fabrication of fuel vessel 110, an appropriate hydride material may be disposed therein. Such material is well known in the art. Thereafter, cartridge valve assembly 104 may be inserted and secured to vessel 110 via internal threads 114 and corresponding threading 132c on valve assembly housing 132. (See, for example, FIG. 8A). The cartridge collar assembly 118 may be secured to vessel 110 via collar-attaching mechanism 116 (for example, by screwing collar assembly 118 onto cartridge vessel 110).

Thereafter or before, cartridge electronics 106 may be configured to determine, monitor, manage and/or control one or more operating parameters of fuel cell power and management system 10 (for example, to characterize the state of fill of fuel cartridge 100). For example, cartridge electronics 106 may be configured to determine, monitor, manage and/or control one or more operating parameters in situ (i.e., in the field or when deployed).

Power Unit 200: In one aspect of the invention, fuel cell power and management system 10 includes power unit 200 to generate electricity using fuel stored in and provided from fuel cartridge 100. The power unit 200 includes an interface and valve assembly that connects to or mates with corresponding components of one or more fuel cartridge(s) 100. In this way, the fuel (for example, hydrogen or methanol) stored in fuel vessel 110 is supplied, under pressure, to power unit 200 which generates electricity therefrom.

Figures 16A, 16B:
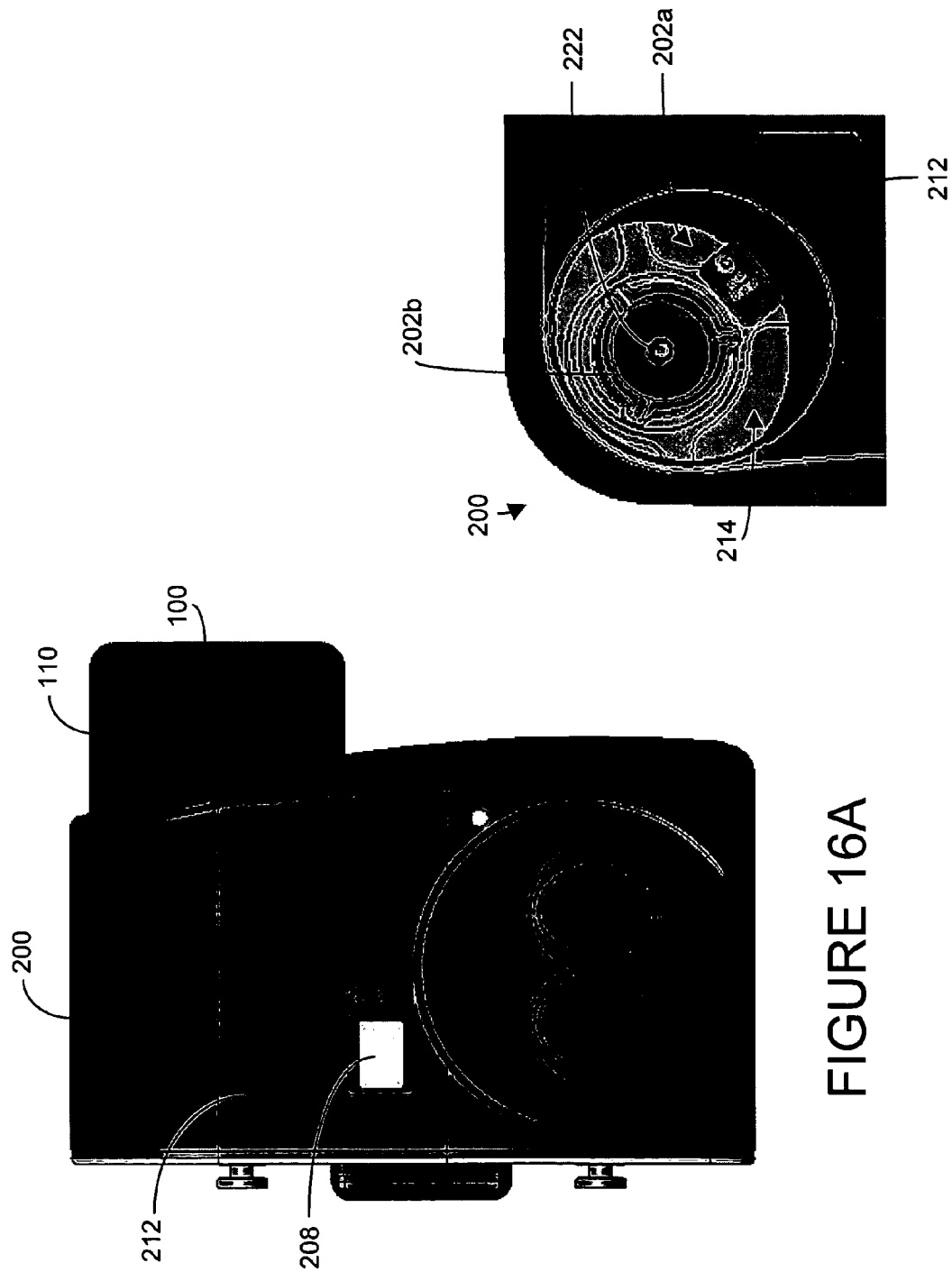
FIG. 16A illustrates a side, perspective view of a power unit having one port to receive a fuel cartridge, in conjunction with and coupled to the fuel cartridge, in accordance with one exemplary embodiment of the present invention.
FIG. 16B illustrates a front, perspective view of a port of the power unit of FIG. 16A, wherein the port includes an electrical and mechanical interface to receive, engage and secure a fuel cartridge.

With reference to FIGS. 1A and 16B, in one embodiment, power unit 200 includes power unit interface 202 and power unit valve assembly 204 which are configured to connect to or mate with fuel cartridge 100. The power unit 200 also includes power unit electronics 206 and power unit display 208. Briefly, power unit electronics 206 includes circuitry to determine, monitor, control and/or store one or more operating parameter(s) of, for example, fuel cartridge 100 and/or power unit 200. The power unit display 208, for example, an LCD or LED display, may be conveniently located on housing 212 to facilitate observation by and/or exchange information with a user, for example, the status of the one or more operating parameter(s), from cartridge electronics 106 and/or power unit electronics 206 to a user or an operator. In this way, a user or an operator may, for example, view data which is representative of the status of the one or more operating parameter(s) of fuel cartridge 100 and/or power unit 200 (for example, the amount of fuel remaining and/or consumed, the rate of fuel consumption, the temperature and pressure of the fuel in fuel vessel 110a, and the operating status of fuel cartridge 100, for example, any faults or errors therein).

Notably, power unit 200 may include (in addition to or in lieu of display 208) an audible indicator (not illustrated) to audibly provide information which is representative of status of the one or more operating parameter(s), to the user or operator.

The power unit 200 also includes fuel cell 210. The fuel cell 210 employs that fuel (for example, hydrogen, hydride or methanol) to generate electricity. The fuel cell 210 includes a fuel cell stack. The fuel cell stack described and illustrated in U.S. patent application Ser. No. 10/328,709, filed Dec. 24, 2002 (now U.S. Patent No. 7,241,523) (which are incorporated herein by reference in their entirety), may be implemented in fuel cell 210 of power unit 200. Moreover, the fuel cell stacks and fuel cell stack technology described and illu7strated in U.S. Patent Nos. 5, k683,828; 5,858,567; 5,863,671; and 6,051,331; and U.S. Patent Application Publication No. U.S. 2002/0022170A1 (all of which are incorporated herein by reference in their entirety) may also be implemented in fuel cell 210 (with or without modification). There are many designs, architectures and modes of operation of fuel cell stacks and fuel cell stack technology. Indeed, all fuel cell stacks, whether now known or later developed, are intended to fall with in the scope of the present invention.

Notably, a particularly preferred fuel cell power system is the one that is described in U.S. patent application Ser. No. 10/328,709, filed Dec. 24, 2002 (now U.S. Patent No. 7,241, 523), which, as mentioned above, is incorporated herein by reference in its entirety. Briefly, this application describes, among other things, a forced air fuel cell system in which an air moving device configured to direct atmospheric air towards the cathode end of the plurality of fuel cells is positioned and thus convectively cools the fuel cell as it supplies atmospheric air to the cathode end which aids in the generation of electricity.

With reference to FIGS. 16A and 16B, in one embodiment, power unit 200 includes a housing having cartridge port 214 to receive fuel cartridge 100. The power unit 200 of this embodiment secures or is connected (electrically and/or mechanically) to an external device (not illustrated) that receives electrical power from (and generated by) power unit 200.

The electrical interface 202a and mechanical interface 202b of power unit interface 202 are disposed in cartridge port 214. The electrical interface 202a is designed to connect with electrical interface 102a of fuel cartridge 100. In particular, in one embodiment, electrically conductive contact pins 216 of electrical interface 202a, which is disposed on housing 212, engage contacts 166 of electrical interface 102a. (See, for example, FIG. 11A). In this way, control circuitry 174 and/or memory 176 of cartridge electronics 106 may communicate (for example, provide data which is representative of one or more operating parameter(s) and/or determine, monitor, manage and/or control one or more operating parameter(s)) with, for example, power unit electronics 206 (control circuitry (if any) and/or memory (if any)) and/or power unit display 208.

Notably, in this illustrative embodiment, power unit 200 includes only one cartridge port 214 to receive one fuel cartridge 100. As mentioned above, however, power unit 200 may include a plurality of cartridge ports 214 to accommodate and receive more than one fuel cartridge 100.

The contact pins 216 are preferably a miniature pogo pin style with a significant cycle life, for example, more than 100,000 cycles. In one embodiment, electrical interface 202a includes five pins to provide a plurality of electrical signals, including power and ground, a thermistor sensor output signal, and data via a serial interface. The cartridge electronics 106 and power unit electronics 206 are designed to be "on" when a fuel cartridge 100 is in power unit 200.

Notably, a triplicate contact pad configuration of fuel cartridge 100 is provided to support multi-orientation insertion and ease of operation in conjunction with electrically conductive contact pins 216. As such, contact pins 216 may engage any one of the three contact pads on electrical interface 102*a* of fuel cartridge 100.

The mechanical interface 202*b* is designed to hold, retain and engage at least one fuel cartridge 100. In this way, power unit valve assembly 204 may connect to provide fluid communication from fuel cartridge 100 to fuel cell 210 (and in particular the fuel cell stack of fuel cell 210). With continued reference to FIG. 16B, mechanical interface 202*b* includes a male-type interface to engage the female-type receptacle of cartridge mechanical interface 102*b* of fuel cartridge 100. The exemplary male-type mechanical interface includes an "ear" or tab 220 having a beveled edge 220*a* that fits into the recess of the female-type receptacle mechanical interface 102*b*. (See, for example, FIG. 12). The beveled edge 220*a* of tab 220 meets with a shoulder of the female-type receptacle mechanical interface 102*b*. Thereafter, an approximate quarter turn secures fuel cartridge 100 into power unit 200. Notably, this design prevents push back of fuel cartridge 100 by mechanically engaging the female-type receptacle of mechanical interface 102*b* before opening cartridge valve assembly 104 of fuel cartridge 100.

With continued reference to FIG. 16B, while mechanical interface 202*b* engages mechanical interface 102*b* of fuel cartridge 100, (see, for example, FIG. 12), actuating pin 222 engages (for example, pushes) distal end 122*a* of poppet assembly 122 by protruding into cartridge valve assembly 104 on a front surface of flange 136 (see, for example, FIGS. 7E and 7F). As mentioned above, this action or operation places cartridge valve assembly 104 in an open state. Once fuel cartridge 100 is securely in place in power unit 200, fuel is then allowed to flow from cartridge 100 to power unit 200 to allow fuel cell 210 to operate.

Notably, power unit 200 includes a conduit that extends from power unit valve assembly 204 to fuel cell 210. The power unit valve assembly 204 includes a valve, having a regulator that is connected to the conduit to regulate pressure and/or control the flow of fuel to the fuel cell stack of fuel cell 210. The regulator selects and regulates fuel pressure including parameters for feeding fuel contained in fuel cartridge 100 to the fuel cell stack. Accordingly, while fuel may be capable of flowing, under pressure, after fuel cartridge 100 is securely in place in power unit 200, the regulator in power unit valve assembly 204 regulates the pressure of fuel feed to the fuel cell 210.

Figure 17A:
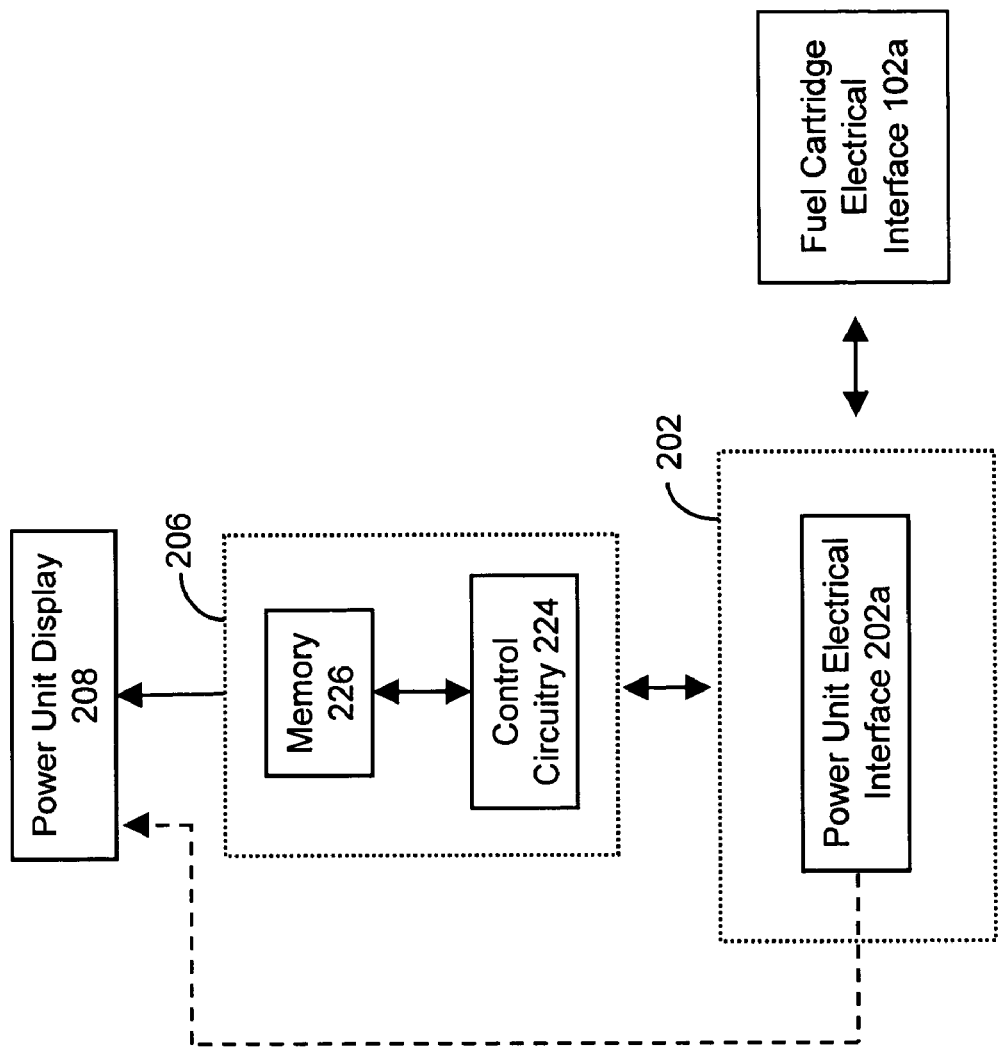
FIGS. 17A, 17B, 17C, 17D and 17E are schematic block diagrams of the power unit electronics, in conjunction with the power unit display and the electrical interface of the power cartridge (among other things), according to exemplary embodiments of aspects of the present invention.

With reference to FIG. 17A, in one embodiment, power unit electronics 206 includes control circuitry 224 to determine, monitor, manage and/or control one or more operating parameters of fuel cartridge 100, power unit 200 and/or fuel cell power and management system 10. The control circuitry 224 may be implemented and/or configured like control circuitry 174 of fuel cartridge 100. Accordingly, the discussion pertaining to the features, implementation, embodiments, operation and configuration of control circuitry 174 is fully applicable to control circuitry 224; that is, control circuitry 224 may be implemented or configured in the same or similar manner, and/or perform the same or similar operations as control circuitry 174. For the sake of brevity, those discussions will not be repeated but will be summarized below in connection with control circuitry 224.

The control circuitry 224 determines, monitors, manages and/or controls one or more operating parameters, for example, the amount of fuel remaining and/or consumed, the rate of fuel consumption, the temperature and pressure of the fuel in fuel vessel 110*a*, temperature of the exterior of fuel vessel 110*a*, and the operating status of fuel cartridge 100 (for example, whether any faults or errors have been registered) and/or the operating status of power unit 200. In one embodiment, control circuitry 224 may calculate, determine and/or monitor the amount of fuel remaining in fuel cartridge 110, as well as the rate of fuel consumption, using information pertaining to the amount of time fuel cartridge 100 is connected to and providing fuel to power unit 200.

In addition to, or in lieu thereof, control circuitry 224 may receive, sample and/or acquire data from sensors 178 and/or sensors 230 (for example, temperature, pressure and/or flow rate type sensors) disposed on, in or near cartridge vessel 110*a*, cartridge valve assembly 104 and/or power unit valve assembly 204. (See, for example, FIG. 17B). The control circuitry 224 may employ data from sensors 178 and/or sensors 230 to calculate one or more operating parameters using mathematical relationships and/or modeling. For example, control circuitry 224 may obtain data which is representative of the temperature and pressure of the fuel in fuel cartridge vessel 110*a* and, based thereon, calculate/estimate the amount of fuel consumed from and/or remaining in fuel cartridge vessel 110*a*. Indeed, control circuitry 224 may obtain data which is representative of the flow rate of fluid through fuel cartridge valve assembly 104 and, using time data, calculate the amount of fuel remaining in fuel cartridge vessel 110*a* and amount of time until all fuel is spent from fuel cartridge 100.

Notably, control circuitry 224 may be a combination of discrete components or may be an integrated circuit(s), for example, one or more suitably programmed (whether in situ or prior to deployment) microprocessors, microcontrollers, state machines and/or FPGAs.

In one embodiment, power unit electronics 206 also includes memory 226, for example, SRAM, DRAM, ROM, PROM, EPROM and/or EEPROM. In this way, data or information which is representative of one or more operating parameters and/or microcode (used by control electronics 224) may be stored in, for example, an SRAM, DRAM, ROM or EEPROM. The data or information representative of one or more operating parameters may include a current status and/or historical data. It should be noted that memory 226 may be comprised of discrete component(s) or may reside on or in an integrated circuit that performs other non-memory operations, for example, control circuitry 224.

Figure 17B:
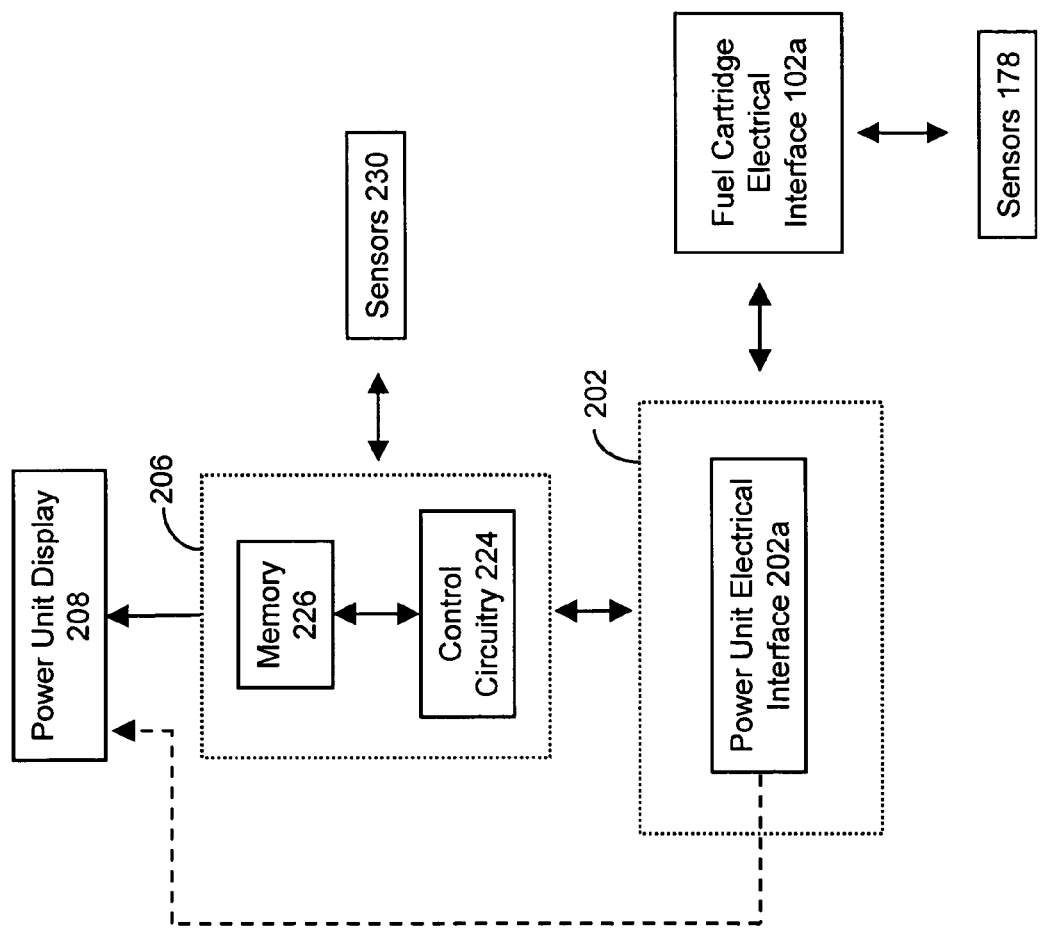

With reference to FIG. 17B, sensors 230 may be discrete elements, such as one or more micro electromechanical ("MEMS") devices, or sensors that are disposed near cartridge vessel 110*a*, and/or disposed in power unit valve assembly 204, and/or cartridge interface 202, or into components thereof (for example, one or more temperature elements integrated into and disposed in the housing of valve assembly 204).

In one embodiment, control circuitry 224 may receive instructions and/or data from, for example, a user or an operator. In this regard, control circuitry 224 may be instructed to, for example, determine one or more operating parameters, and thereafter control and/or manage the operation of fuel cartridge 100 and/or power unit 200 (for example, adjust and/or modify the rate of fuel consumption and/or the temperature of the exterior of fuel vessel 110*a* (and indirectly the temperature of the fuel in fuel vessel 110*a*) by engaging a cooling unit disposed on power unit 200). In this way, the efficiency and/or control of system 10 is enhanced.

In one embodiment, control circuitry 224 provides and/or communicates the measured, sampled, sensed and/or determined operating parameter(s) to a user or an operator. For example, control circuitry 174 may acquire data from sensors 178 and/or sensors 230 and thereafter determine the state of fill or amount of fuel remaining in fuel vessel 110a. The control circuitry 224 may provide data which is representative of that operating parameter to the user or operator. In response, the user or operator may adjust one or more of the operating parameters of power unit 200, for example, reduce the amount of power/fuel consumption and/or reduce or adjust the output power of fuel cell 210.

Alternatively, an operator or a user (or external device) may receive data which is representative of the state of fill or amount of fuel remaining in fuel vessel 110a from control circuitry 224 (as calculated therein) and, in response thereto, instruct power unit 200 to modify or change its operating characteristics (directly or remotely), for example, reduce the fuel consumption and/or electrical power output/generation, or engage a cooling or a heating unit to influence the temperature of fuel vessel 110a (for example, in those instances where the temperature of the fuel during operation may not be suitable and/or optimum). The modification or change to the operating parameters of power unit 200 may be preset, predetermined and/or pre-programmed. The modification or change may also be in accordance with instructions transmitted or provided to control circuitry 224 (for example, the user determines the appropriate modification or change based on one or more considerations, factors, constraints and/or objectives).

Figure 17C:
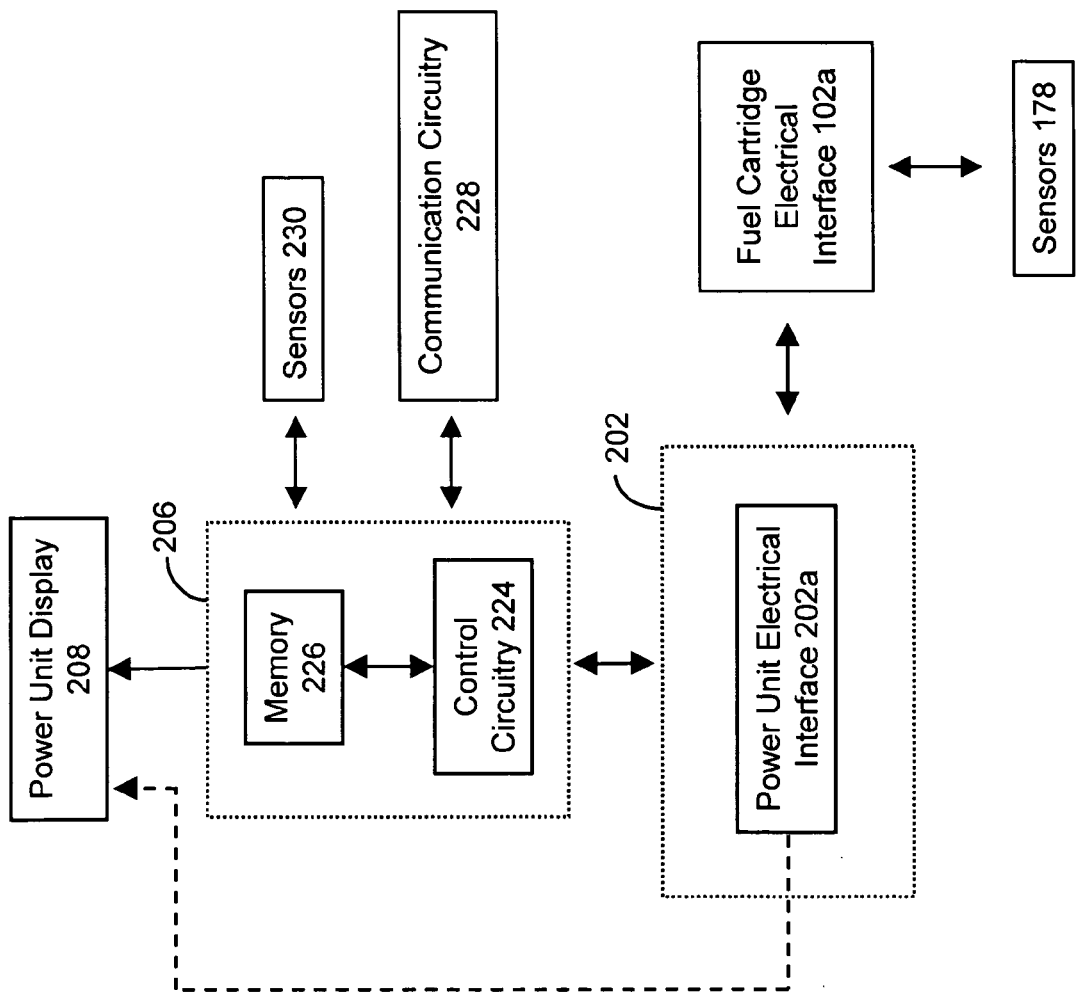

With reference to FIG. 17C, such instructions and/or data may be received or transmitted via communication circuitry 228. In this regard, communication circuitry 228 may employ well known wired (for example, a serial input/output port) and/or wireless techniques (for example, infrared techniques). Indeed, the instructions and/or data may be provided remotely via wireless techniques.

In one embodiment, communication circuitry 228 may be employed to transmit data and/or commands to power unit 200, refill unit 300 and/or other external devices (for example, to a local or remote computer). The data may be one or more operating parameters (that were measured, sampled, sensed by sensors 178 and/or determined by control circuitry 224) such as temperature, pressure, rate of fuel consumption by power unit 200, and/or amount of remaining fuel in fuel cartridge 100. The data may also be representative of the overall status of power unit 200 and/or fuel cartridge 100.

Figure 17D:
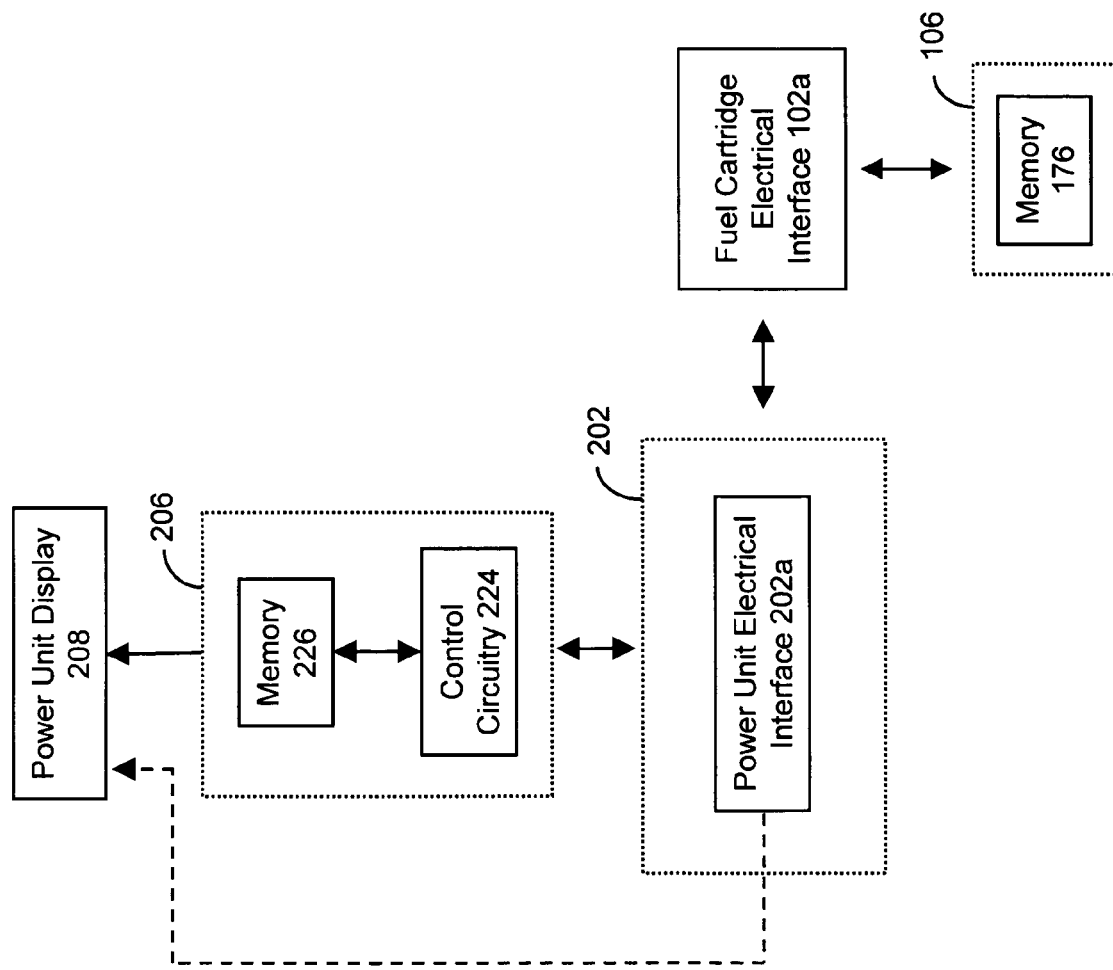
Figure 17E:
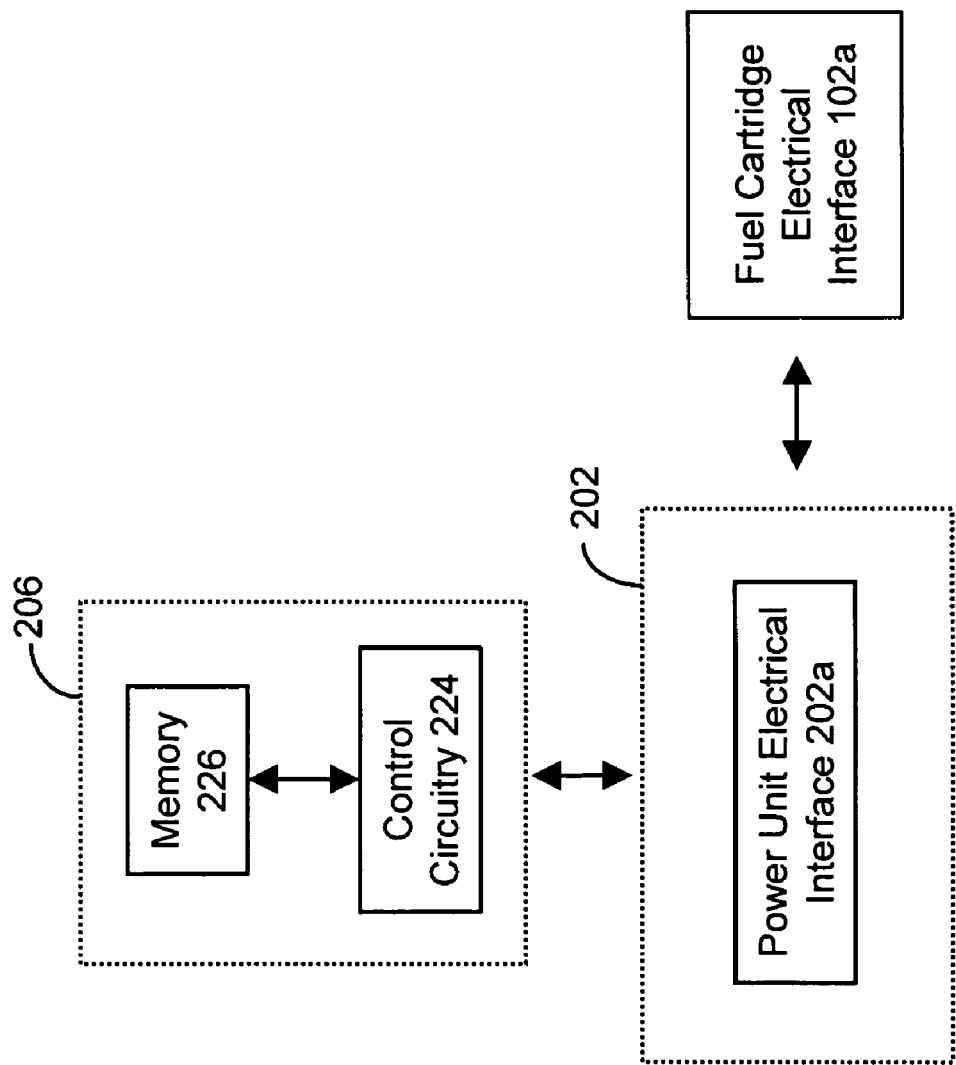

Notably, it may be advantageous, from a cost and weight perspective, to implement control circuitry in either fuel cartridge 100 or power unit 200—but not both. For example, with reference to FIG. 17D, in one embodiment, power unit 200 includes power unit electronic 206 as described above, (see, for example, FIGS. 17A, 17B and/or 17C), and fuel cartridge 100 includes memory 176 (see, for example, FIGS. 14D and 14E) to store and/or retain data provided by power unit electronics 206. In this embodiment, control circuitry 224 may, among other things, monitor one or more operating parameters, for example, the amount of fuel remaining and/or consumed, the rate of fuel consumption, the temperature and pressure of the fuel in fuel vessel 110a, temperature of the exterior of fuel vessel 110a, and/or the operating status of fuel cartridge 100 (for example, whether any faults or errors have been registered). The control circuitry 224 may periodically or intermittently store data which is representative of the one or more operating parameters in memory 176. In this way, the status of the fuel cartridge (for example, the amount of fuel remaining) is retained within the fuel cartridge's memory (i.e., memory 176) so that it may be available for recall by power unit 200 (for example, another power unit 200 that has no "history" of the status of a given fuel cartridge 100) and/or refill unit 300.

The control circuitry 224 may also determine, monitor, manage and/or control other characteristics or operations of power unit 200, for example, thermal management, fuel leak detection, fuel purge, over-current protection and/or voltage regulation. In this regard, control circuitry 224 may receive information representative of the temperature of one or more elements of power unit 200 (for example, fuel cell 210) and in response thereto adjust and/or manage the operation of power unit 200 (for example, adjust the rate of fuel consumption and/or generation of electricity).

The sensors 230 may include fuel leak sensors to provide data of the status of the integrity of the fuel path (i.e., whether a leak is present) to control circuitry 224. In response thereto, control circuitry 224 may alert the user/operator of the leak (or possible leak) and/or may safely terminate operation of power unit 200.

Alternatively, control unit 224 may, based on data from sensors 230, determine the existence of a (or potential) fuel leak. The control circuitry 224 may employ various techniques, which are well known to those skilled in the art, to assess whether there is a fuel leak. Again, control circuitry 224 may alert the user/operator of the leak (or possible leak) and/or may immediately and safely terminate operation of power unit 200.

The control circuitry 224 may also monitor the status of over-current protection and/or voltage regulation to assess the status of the power generation by fuel cell 210. In one embodiment, control circuitry 224 may receive information representative of the current consumption and/or voltage levels from sensors 230 that provide information pertaining to the generation of electricity and/or consumption thereof. In response, control circuitry 224 may appropriately manage and/or control the operation of power unit 200.

Notably, control circuitry 224 may perform or execute routines or programs that implement particular tasks and/or operations described herein. The functionality of the routines or programs may be combined or distributed. Such programming is well known to those skilled in the art, particularly in view of this disclosure. All programming techniques, and implementations thereof, to determine, monitor, manage and/or control one or more operating parameters and/or characteristics of fuel cartridge 100 and/or power unit 200, whether now known or later developed, are intended to fall within the scope of the present invention.

Figure 1B:
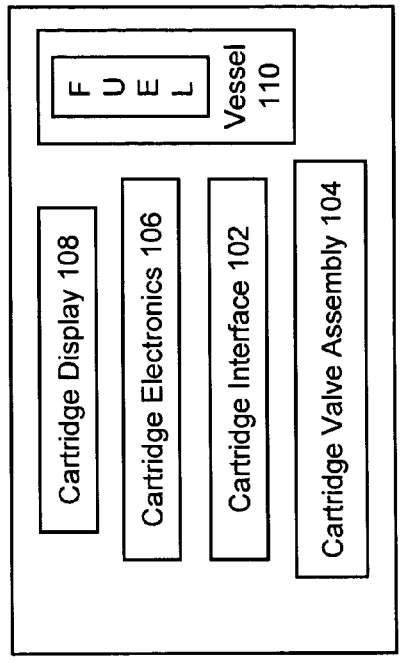
FIG. 1B is a block diagram representation of a portable fuel cell power and management system, including a fuel cartridge (rechargeable-type), power unit and refill unit, according to a second aspect of the present invention.
Figure 1B:
Figure 1B:
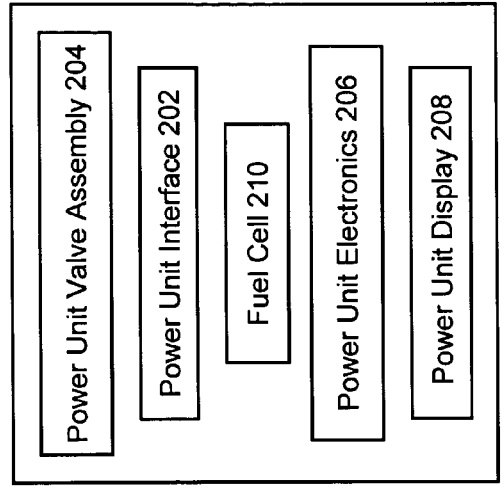
Figure 1B:
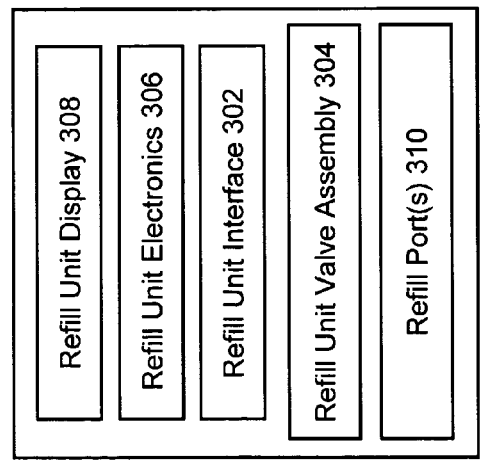
Figure 1B:
Figure 2:
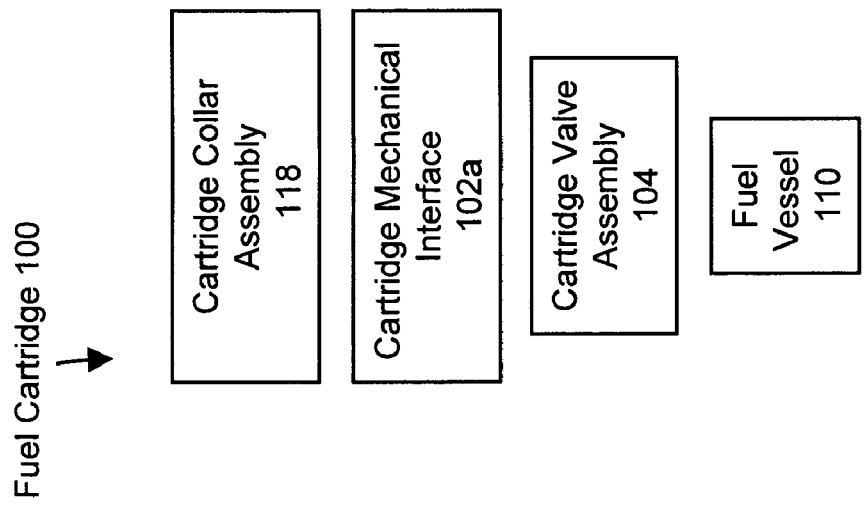
FIG. 2 is a block diagram representation of selected mechanical elements of a fuel cartridge according to one aspect of one embodiment of the present invention.

Refill Unit: With reference to FIG. 1B, in one embodiment, fuel cell power and management system 10 include, in addition to fuel cartridge 100 and power unit 200, refill unit 300. In this regard, in those instances where fuel cartridge is a refillable type, fuel cartridge may be filled with fuel (for example, hydrogen, methanol or other hydrogen containing compound) after some or all of the fuel is depleted from fuel cartridge 100 (for example, consumed by power unit 200) using refill unit 300.

In one embodiment, refill unit 300 includes refill unit interface 302, refill unit valve assembly 304, refill unit electronics 306 and refill unit display 308 (for example, a 24 character by two line LCD device). Briefly, with reference to FIG. 1B, in one embodiment, refill unit interface 302 and refill unit valve assembly 304 are configured to connect to or mate with associated or corresponding components of fuel cartridge 100. (See, for example, FIGS. 11A and 12). The configuration, architecture and design of refill unit interface 302 and refill unit valve assembly 304 may be the same as power unit interface 202 and power unit valve assembly 204, respectively. For the sake of brevity that discussion will not be repeated.

Figure 18A:
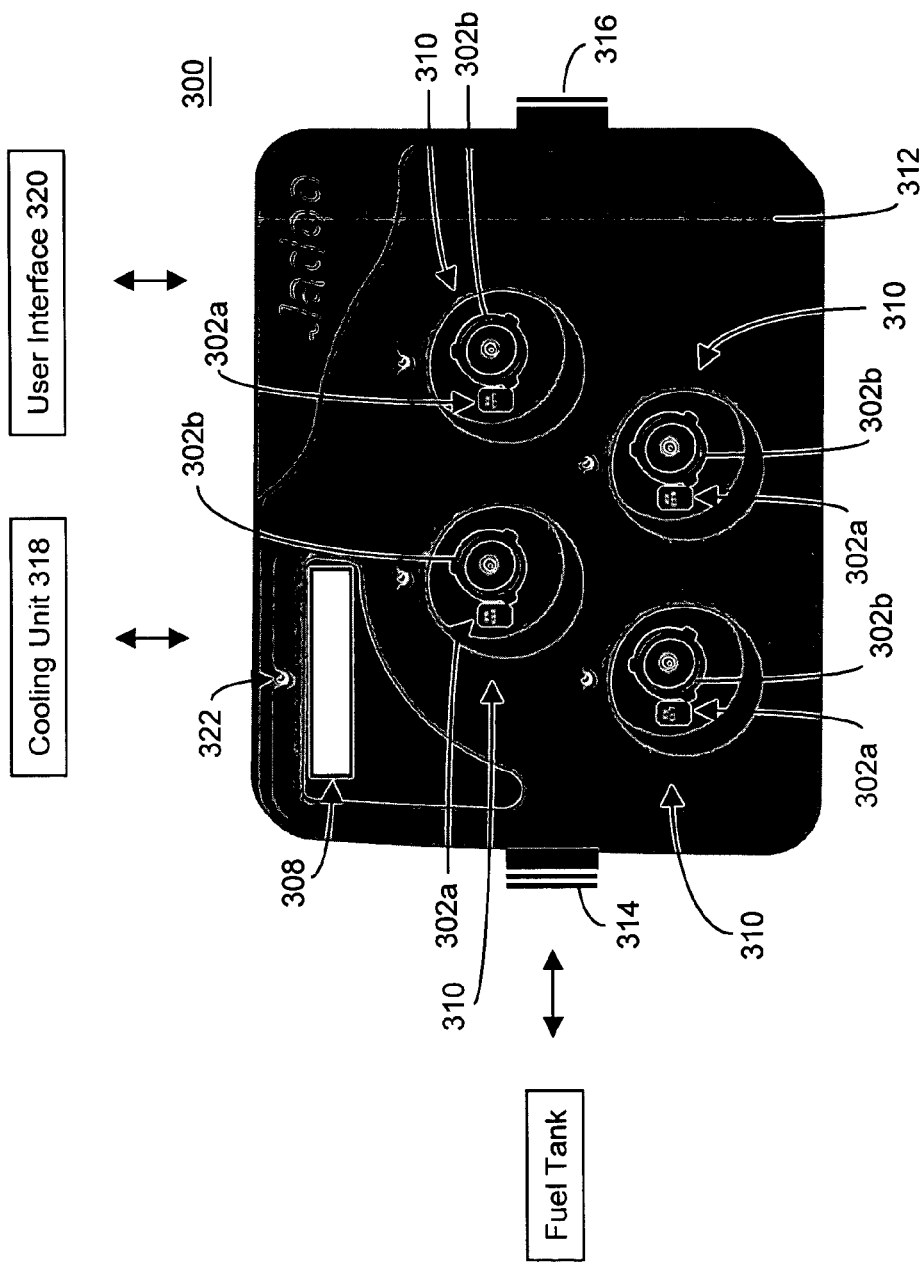
FIG. 18A illustrates a perspective view of a refill unit, having four refill ports, in accordance with an exemplary embodiment of an aspect of the present invention.
Figure 18B:
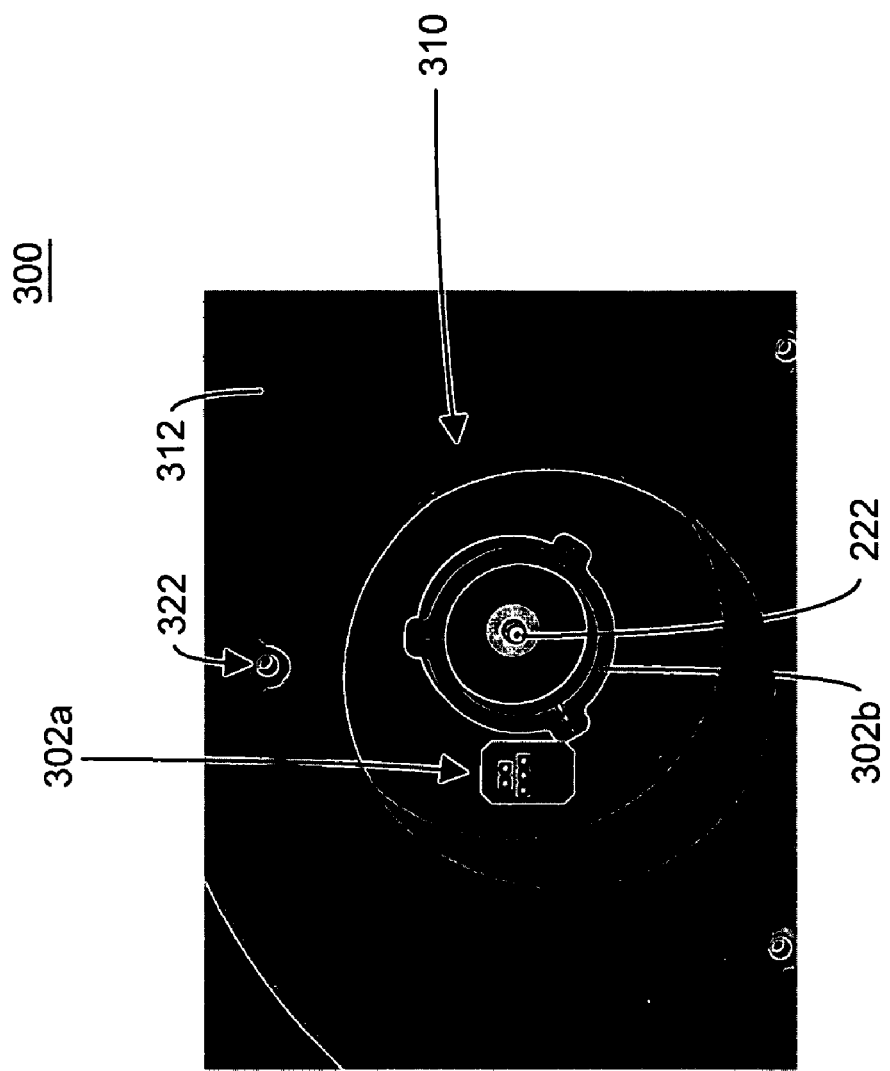
FIG. 18B illustrates a front, perspective view of a refill port of the refill unit of FIG. 18A.

The refill unit 300 may be a stand alone table top or wall mounted device, which may be installed, for example, at a facility or in a vehicle and thereby provide refilling capabilities for one or more fuel cartridges 100. With reference to FIGS. 18A and 18B, in one embodiment, refill unit 300 includes one or more refill ports 310 (four refill ports are illustrated) to accommodate one or more fuel cartridges 100. As mentioned above, refill unit 300, in operation, replenishes one or more depleted fuel cartridges 100 and returns fuel cartridges 100 to a more filled state or a completely refilled state for use in power unit 200.

In those instances where refill unit 300 includes more than one refill port 310, each refill port 310 may function and/or may be operated independently of the other ports. In this way, fuel cartridges 100 having different fuel fill and/or capacity conditions may be returned to a more filled or completely refilled state independently. Moreover, fuel cartridges 100 may be randomly installed in refill ports 310.

The refill port 310 includes an independent solenoid valve for providing fluid or fuel shutoff when not in use and a switch to sense whether a fuel cartridge 100 is inserted. The solenoid/switch combination permits random access to any refill port 310, semi-automatic initiation and termination of the refilling operation and provides positive fluid supply shutoff. It may be advantageous to maintain refill unit 300 in a position whereby fuel cartridges 100 are in a mostly horizontal orientation with respect to the center axis of fuel vessel 110a. In this way, it may prevent the introduction of foreign matter into the area of valve assembly 304 and refill port 310 and reduce and/or minimize possible malfunction or damage to the components in and near refill port 310 as a result of such foreign matter.

In one embodiment, refill unit 300 includes main fuel/fluid input port 314 to connect to a primary compressed fuel source (for example, a "K" bottle size tank). The main fuel/fluid input port 314 may be located on an outer surface of housing 312 to facilitate connection to the primary compressed fuel source. The main fuel/fluid input port 314 may provide local pressure regulation, for example, 250 PSI, and include a fluid shutoff to isolate the input of the primary compressed fuel source from refill unit 300 and/or fuel cartridge 100. Moreover, main fuel/fluid input port 314 may also provide passive overpressure protection to prevent inadvertent overpressure exposure to refill unit 300 and/or fuel cartridge 100 which may be disposed therein.

Notably, refill unit 300 may also include an auxiliary fuel/fluid output port 316 to facilitate expansion and operation of one or more additional refill units 300 without site modification (for example, modification of plumbing on the large fuel tank supporting refill unit 300 to accommodate additional refill units 300). The auxiliary fuel/fluid output port 316 may be located and/or mounted on an outer surface of housing 312 for connection to one or more additional refill units 300 (not illustrated). In this way, a series of fluid connection may be daisy chained from one refill unit to another and connected to one large fuel tank supply (for example, a "K" bottle size tank).

The refill unit 300 may include one or more input pressure regulators to accept low pressure regulated gas from a high pressured tank, a normally closed main shut off solenoid valve with over pressure protection, and a gas distribution manifold to provide fluid to each of the plurality of refill ports 310. A plurality of solenoid valves may be employed to provide shutoff capabilities to each refill port 310 when in use.

Notably, in one embodiment, the plurality of electrical pins may be used to sense the presence of a fuel cartridge 100 in a given refill port 310.

In one embodiment, it may be advantageous to include a ventilation or cooling unit 318 (for example, active or passive type unit) to remove heat from fuel cartridge 100 which is produced or generated during the refill operation. In this regard, controlling the temperature of one or more fuel cartridges 100 during the refill process may increase the efficiency of refill and thereby reduce the refill time. For example, cooling unit 318 may employ one or more cooling circulation fans that are appropriately located to remove heat from one or more fuel cartridges 100 while connected to refill unit 300 and being re-filled.

Notably, refill unit 300 may include a heating unit (not illustrated) to accommodate those instances where the temperature during the refill operation may not be suitable and/or optimum. In this regard, the heating unit may apply heat to the fuel cartridge 100 to, for example, increase the efficiency of the refill operation and thereby reduce the refill time.

The refill unit 300 may be electrically powered using a number of techniques including an unregulated external AC wall/desk transformer connected to the DC Power Input Port located on an outer surface of housing 312, a battery, and/or a fuel cell that employs the same fuel used to replenish one or more fuel cartridges 100. In one embodiment, a maximum preferred voltage output required from a transformer will be 12 Volts Direct Current (VDC). Notably, all techniques for powering refill unit 300 are intended to fall within the scope of the present invention.

In one embodiment, refill unit electronics 306 includes user interface 320 to facilitate monitoring, managing and controlling the refill operation. In this regard, user interface 320 may include a plurality of button switches, and a plurality of bi-color LEDs 322, having multiple color capabilities (for example, orange/green color capabilities for indicating refilling (orange) or filled (green)), for each refill port 310. The bi-color LEDs 322 may be disposed in a region associated with a corresponding refill port 310 to reflect the state of the refill operation. (See, for example, FIG. 18B).

Moreover, it may be advantageous for user interface 320 to include a bi-color LED 322 (for example, red/green color) to reflect or indicate the power state of refill unit 300. In this regard, power "on" may be indicated by green and power on alarm may be indicated by red.

The user interface 320 also permits the user or operator to select, program and/or set various functions to be accomplished by refill unit 300. For example, the user or operator may initiate fuel cartridge refill cycles, enable and/or set alarm limits, clear alarms, enable/disable the audible alarm, and monitor fuel sensor activity using interface 320.

The refill unit electronics 306 may be enabled to monitor the internal environment of refill unit 300 and/or one or more fuel cartridges 100 disposed in refill ports 310. For example, refill unit electronics 306 may measure the internal temperature of refill unit 300 (using internal ambient temperature sensor) or measure, detect or receive data which is representative of the temperature of one or more fuel cartridges 100 disposed in refill ports 310. In response to the temperature exceeding a predetermined value or limit, refill unit electronics 306 may enable cooling unit 318. In addition, refill unit electronics includes one or more gas detection sensors (for example, hydrogen detection sensors). Under these circumstances, in the event of a leak, refill unit electronics 306 may sense a concentration of fuel that exceeds a predetermined limit. In the event an alarm is triggered, an appropriate alarm message may be displayed on refill unit display 308. In addition to or in lieu thereof, an audible alarm may sound.

Notably, one or more input/output (I/O) port may be located on an outside surface of housing 310 of refill unit 300. The I/O port(s) may be employed by the user or operator to enable certain functions, operations, programming and/or testing of refill unit 300.

Notably, where fuel cartridge 100 include hydride-type fuel, it may be advantageous to operate fuel cell power and management system 10 between temperatures of about 30° F. to 125° F. (0° C.-+52° C.) and relative humidity of 10% to 95%. Although the various components of fuel cell power and management system 10 may be exposed to storage and/or operating environments in excess of these ranges, appropriate supplementary protection measures may be employed under those conditions.

Figure 19A:
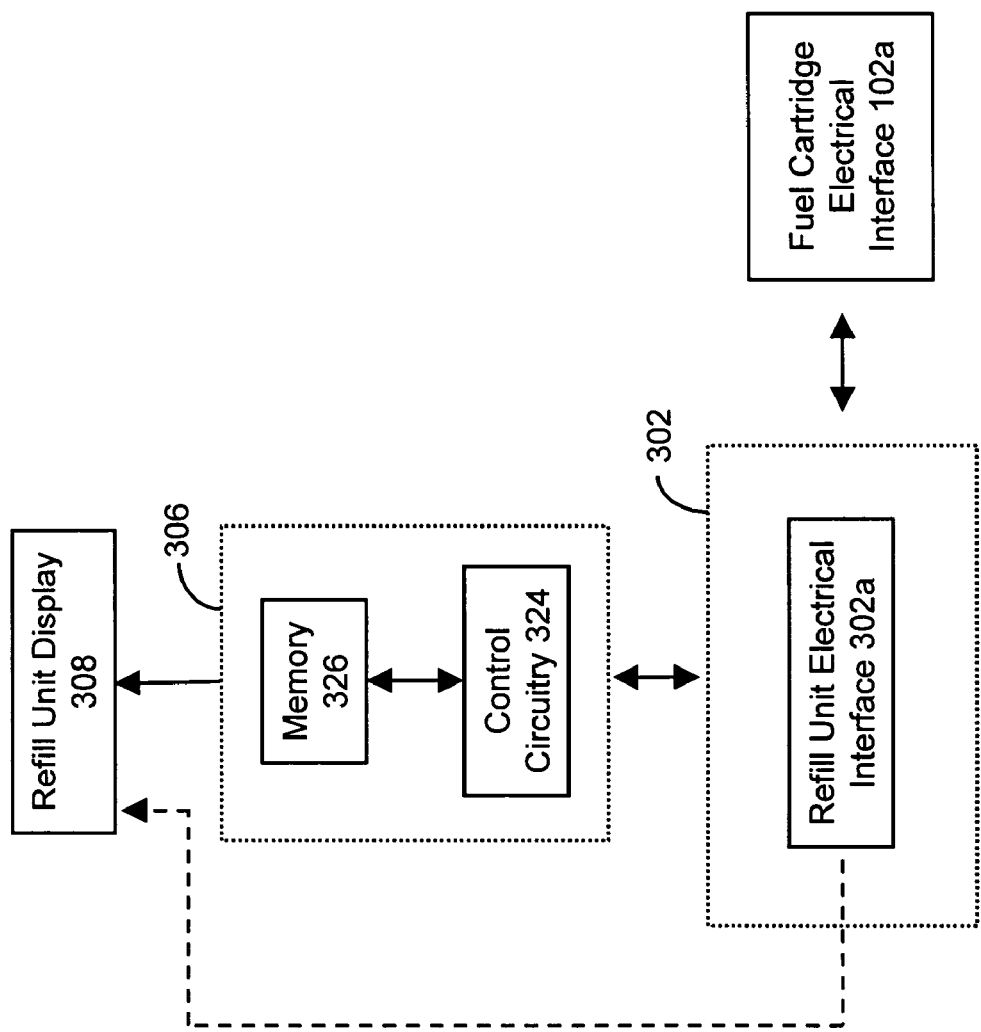
FIGS. 19A, 19B, 19C, 19D, and 19E are schematic block diagrams of the refill unit electronics, in conjunction with the electrical interface of the power cartridge (among other things), according to exemplary embodiments of aspects of the present invention.

With reference to FIG. 19A, in one embodiment, refill unit electronics 306 includes control circuitry 324 to determine, monitor, manage and/or control one or more operating parameters of fuel cartridge 100, refill unit 300 and/or fuel cell power and management system 10. The control circuitry 324 may be implemented and/or configured like control circuitry 174 of fuel cartridge 100 or like control circuitry 224 of power unit 200. Accordingly, the discussion pertaining to the features, implementation, embodiments, operation and configuration of the control circuitry of fuel cartridge electronics 106 and/or power unit electronics 206 is fully applicable to control circuitry 324; that is, control circuitry 324 may be implemented or configured in the same or similar manner, and/or perform the same or similar operations as control circuitry 174 and/or control circuitry 224. For the sake of brevity, those discussions will not be repeated but will be summarized in connection with control circuitry 324.

The control circuitry 324 of refill unit electronics 306 may determine, monitor, manage and/or control one or more operating parameters, for example, the amount of fuel remaining in fuel vessel 110a, the temperature and pressure of the fuel in fuel vessel 110a, temperature of the exterior of fuel vessel 110a, and/or the operating status of fuel cartridge 100 (for example, whether any faults or errors have been registered). In one embodiment, control circuitry 324 may calculate, determine and/or monitor the amount of fuel in fuel cartridge 110, based on data in memory 176, the flow rate of fuel in valve assembly 104 and/or 304, and/or an amount of time fuel cartridge 100 has been connected to refill unit 300.

Figure 19B:
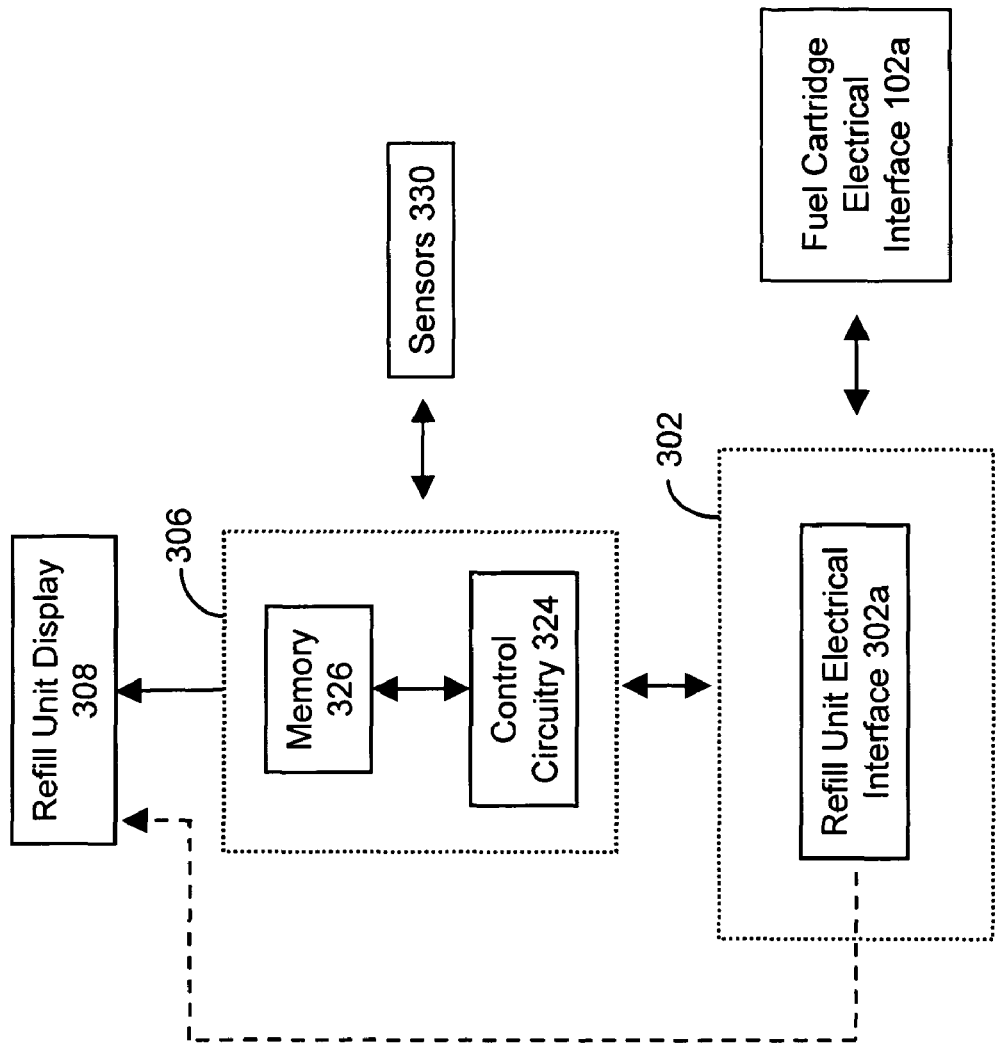
Figure 19C:
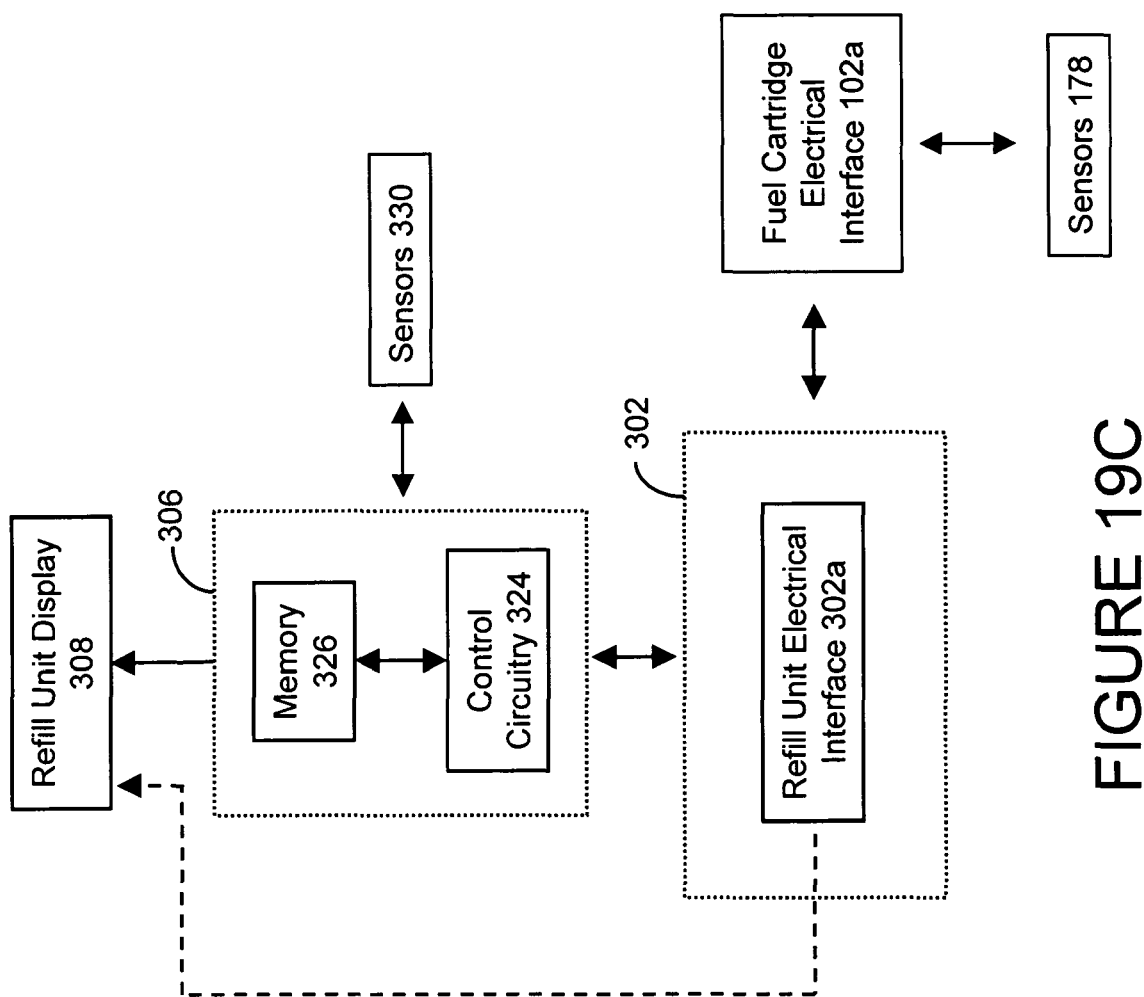

With reference to FIGS. 19B and 19C, in addition to, or in lieu thereof, control circuitry 324 may receive, sample and/or acquire data from sensors 178 and/or sensors 330 (for example, temperature, pressure and/or flow rate type sensors) disposed on, in or near cartridge vessel 110a, refill unit valve assembly 304, and/or refill unit interface 302. The control circuitry 324 may employ data from sensors 178 and/or sensors 330 to calculate one or more operating parameters using mathematical relationships and/or modeling. For example, control circuitry 324 may obtain data which is representative of the temperature and pressure of the fuel in fuel cartridge vessel 110a and, based thereon, calculate/estimate the amount of fuel in fuel cartridge vessel 110a. This information may be employed to determine a time required to refill fuel cartridge vessel 110a.

Moreover, in response to data which is representative of the temperature of the fuel in fuel cartridge vessel 110a (for example, from sensors 178 or sensors 330), control circuitry 324 may engage cooling unit 318 of refill unit 300. The cooling unit 318 (for example, a fan, heat sink, thermoelectric device or refrigeration unit) may be employed to remove heat from fuel cartridge vessel 110a during the refilling process. In this way, the efficiency of the refill process may be enhanced and the time required therefore, reduced.

In one embodiment, refill unit electronics 306 also includes memory 326, for example, SRAM, DRAM, ROM, PROM, EPROM and/or EEPROM. The memory 326 may store data or information representative of one or more operating parameters and/or microcode (used by control electronics 324) may be stored in, for example, an SRAM, DRAM, ROM or EEPROM. It should be noted that memory 326 may be comprised of discrete component(s) or may reside on or in an integrated circuit that performs other non-memory operations, for example, control circuitry 324.

With reference to FIGS. 19B and 19C, sensors 330 may be discrete elements, such as one or more micro electromechanical ("MEMS") devices, or sensors that are integrated into refill unit valve assembly 304, and/or refill unit interface 302, or into components thereof (for example, one or more temperature elements integrated into and disposed within the walls of valve assembly 304).

In one embodiment, control circuitry 324 may receive instructions and/or data from, for example, a user or an operator. In this regard, control circuitry 324 may be instructed to, for example, measure, sample and/or sense one or more operating parameters, and thereafter control and/or manage the operation of fuel cartridge 100 and/or refill unit 300 (for example, adjust and/or modify the rate of refill of fuel and/or the temperature of the exterior of fuel vessel 110a (and indirectly the temperature of the fuel in fuel vessel 110a) by engaging cooling unit 318).

In one embodiment, control circuitry 324 provides and/or communicates the measured, sampled, sensed and/or determined operating parameter(s) to a user or an operator. For example, control circuitry 324 may instruct sensors 178 or sensors 330 to measure, sample, sense and/or determine the state of fill or amount of fuel remaining in fuel vessel 110a. Thereafter, control circuitry 324 may provide data which is representative of the operating parameter to the user and/or provide data which is representative of the anticipated refill time. In response, the user or operator may instruct refill unit 300 to modify or change one or more of its operating characteristics (directly or remotely), for example, increase/decrease the flow rate of fuel into vessel 110 and/or engage cooling unit 318 to influence the temperature of the fuel in fuel vessel 110a.

Notably, the modification or change to the operating parameters of refill unit 300 may be preset, predetermined and/or pre-programmed. Alternatively, the modification or change may be in accordance with instructions transmitted or provided with the instructions (for example, the user determines the appropriate modification or change based on one or more considerations, factors, constraints and/or objectives).

Figure 19D:
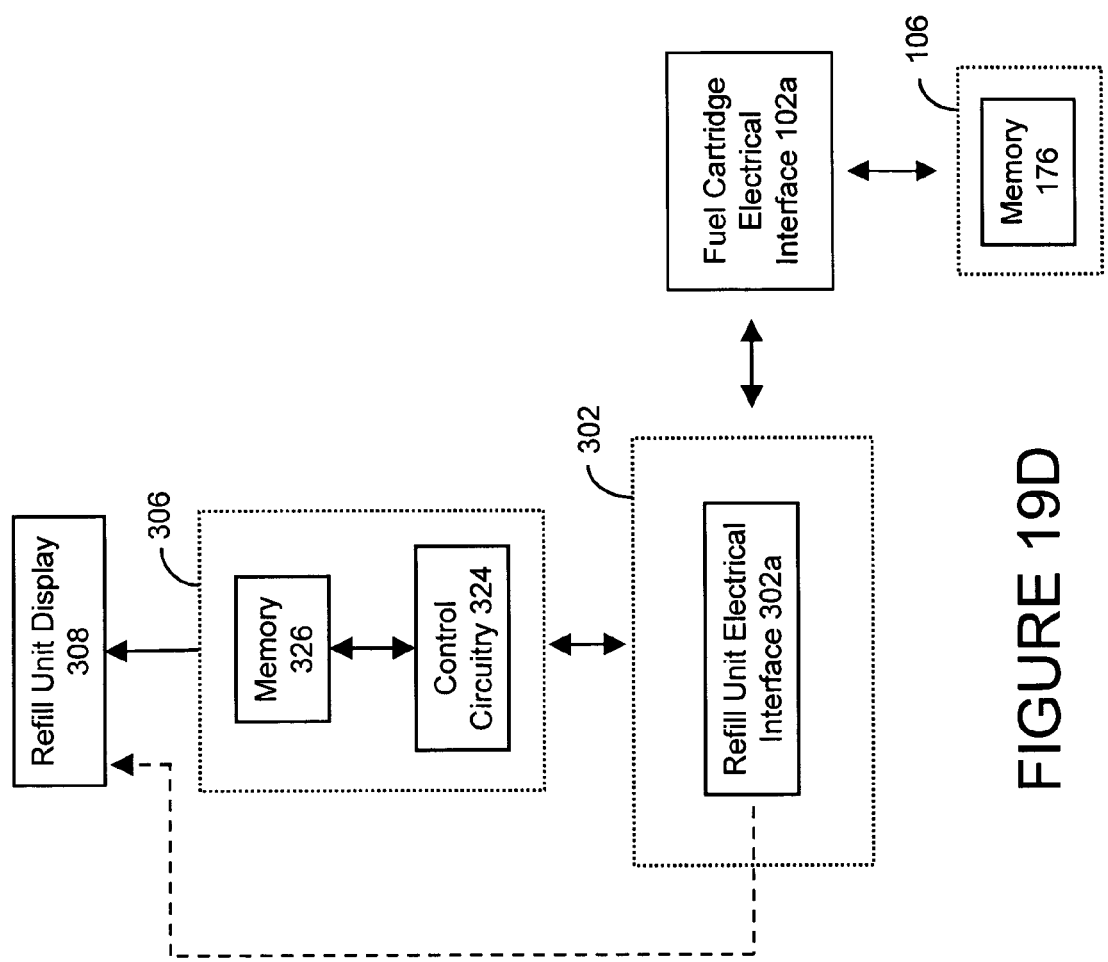
Figure 19E:
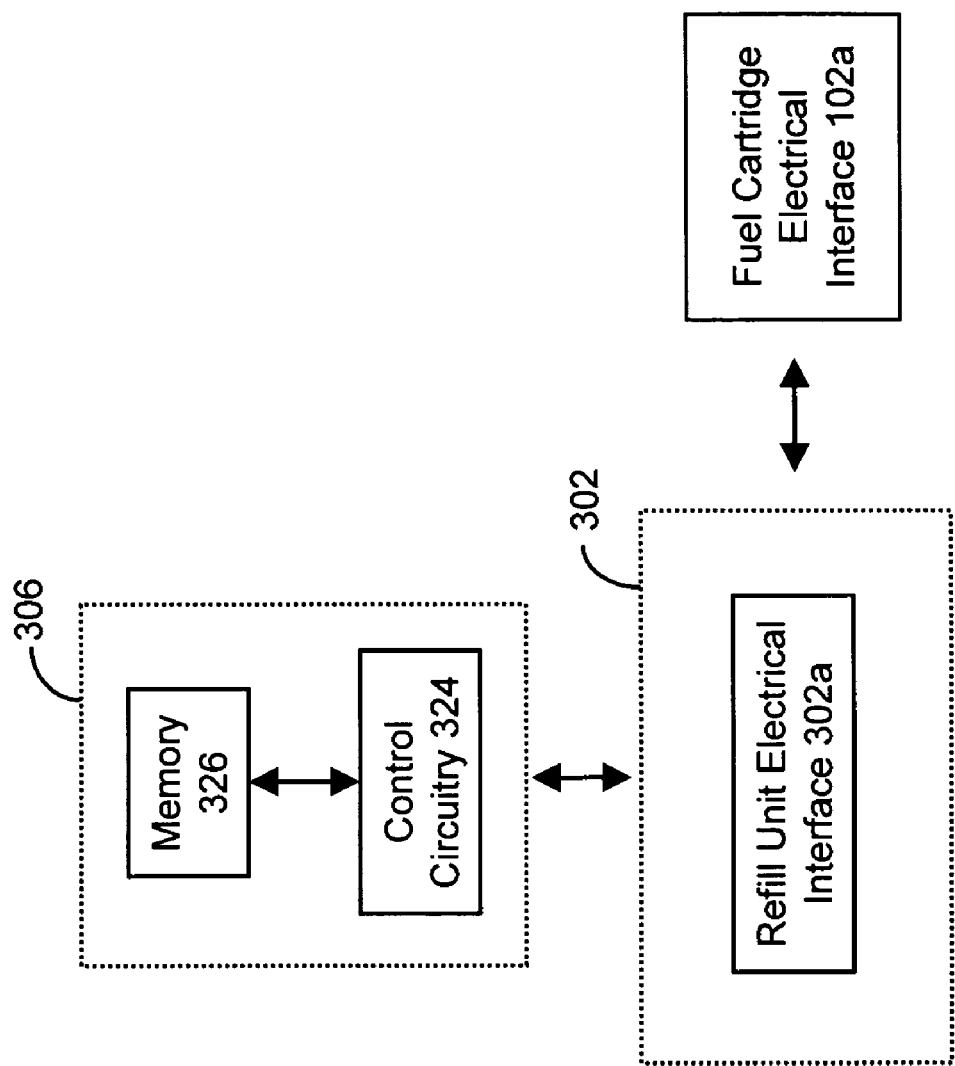

In one embodiment, memory 176 may store and/or retain data provided by power unit electronics 206 and refill unit electronics 306, for example, data which is representative of one or more operating parameters such as the state of fill of fuel cartridge 100. (See, for example, FIGS. 14D, 14E and 19D). In this regard, control circuitry 324 may, among other things, monitor one or more operating parameters, for example, the amount of fuel remaining in fuel vessel 110a. The control circuitry 324 may periodically or intermittently store data which is representative of the one or more operating parameters in memory 176. In this way, the status of the fuel cartridge (for example, the amount of fuel remaining) is retained within the fuel cartridge's memory (i.e., memory 176) so that it may be available for recall by power unit 200 and/or refill unit 300.

Notably, control circuitry 324 may perform or execute routines or programs that implement particular tasks and/or operations described herein. The functionality of the routines or programs may be combined or distributed. Such programming is well known to those skilled in the art, particularly in view of this disclosure. All programming techniques, and implementations thereof, to determine, monitor, manage and/or control one or more operating parameters and/or characteristics of fuel cartridge 100, power unit 200 and/or refill unit 300, whether now known or later developed, are intended to fall within the scope of the present invention.

Indeed, control circuitry 324 may also determine, monitor, manage and/or control other operations or characteristics of refill unit 300, for example, fuel leak detection and/or fuel purge. In this regard, sensors 330 may include fuel leak sensors to provide data of the status of the integrity of the fuel path (i.e., whether a leak is present) to control circuitry 324. In response thereto, control circuitry 324 may alert the user/operator of the leak (or possible leak) and/or may safely terminate operation of refill unit 300.

Alternatively, control unit 324 may, based on data from sensors 330, determine the existence of a (or potential) fuel leak. The control circuitry 324 may employ various techniques, which are well known to those skilled in the art, to assess whether there is a fuel leak. Again, control circuitry 324 may alert the user/operator of the leak (or possible leak) and/or may immediately and safely terminate operation of refill unit 300.

Notably, control circuitry 324 may perform or execute routines or programs that implement particular tasks and/or operations described herein. The functionality of the routines or programs may be combined or distributed. Such programming is well known to those skilled in the art, particularly in view of this disclosure. All programming techniques, and implementations thereof, to determine, monitor, manage and/or control one or more operating parameters and/or characteristics of fuel cartridge 100, power unit 200 and/or refill unit 300, whether now known or later developed, are intended to fall within the scope of the present invention.

There are many inventions described and illustrated herein. While certain embodiments, features, materials, configurations, attributes and advantages of the inventions have been described and illustrated, it should be understood that many other, as well as different and/or similar embodiments, features, materials, configurations, attributes, structures and advantages of the present inventions that are apparent from the description, illustration and claims (are possible by one skilled in the art after consideration and/or review of this disclosure). As such, the embodiments, features, materials, configurations, attributes, structures and advantages of the inventions described and illustrated herein are not exhaustive and it should be understood that such other, similar, as well as different, embodiments, features, materials, configurations, attributes, structures and advantages of the present inventions are within the scope of the present invention.

For example, it is therefore desirable to develop a hydrogen fuel cell electricity generation device capable of supplying electricity for a longer period of time than conventional batteries. It is also desirable to develop a standardized hydride storage cartridge that can readily be provided and secured to a fuel cell system to supply hydrogen for conversion to electricity and to be provided and secured to a hydrogen refill unit to be rapidly refilled with hydrogen. It is further desirable to provide a hydrogen cartridge that provides a relatively accurate readout of its state-of-fill so that a user knows how much energy is available from the hydrogen cartridge.

In addition, it will be recognized by one skilled in the art in view of this disclosure that a fuel cartridge 100 may be integrated into the integrated modular BSP/MEA/manifold plates and compliant contacts for fuel cells as described in International Publication No. WO02/19451A2, which is incorporated herein by reference. Moreover, the fault tolerant fuel cell network power system of U.S. patent application Ser. No. 10/382,549 filed Mar. 5, 2003(now U.S. Patent No. 6,989, 651) may also be modified in accordance with the teachings of this invention to include fuel cartridge 100 of this invention into the system described therein. For the sake of brevity, those discussions will not be repeated. Indeed, another fuel cell system in which a hydride cartridge and other accessories may be integrated into is described in U.S. patent application Ser. No. 10/402,726 filed Mar. 28, 2003. These U.S. Patent Applications are incorporated herein by reference in their entirety.

Figure 20:
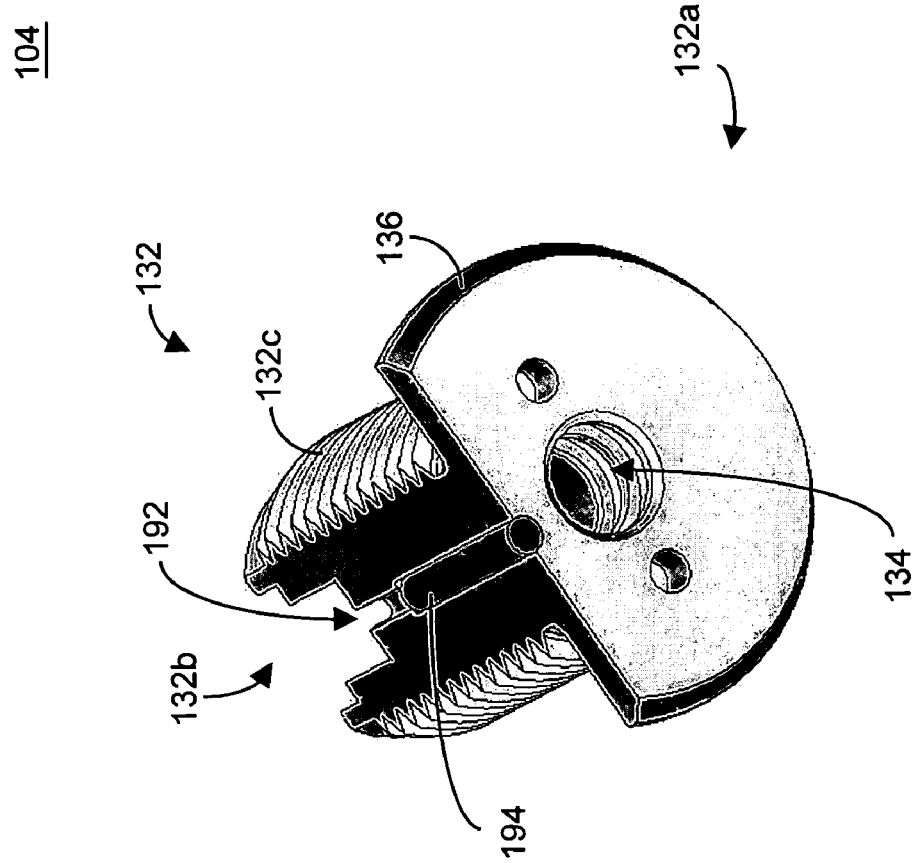
FIG. 20 illustrates a perspective partial cross-sectional view of a cartridge valve assembly, including temperature sensor-relief port assembly, according to one exemplary embodiment of the present invention.

Moreover, many modifications may be made to cartridge valve assembly. All such modifications are intended to fall within the scope of the present invention. For example, with reference to FIG. 20, in one embodiment, temperature sensor-relief port assembly 194 may be integrated and/or incorporated into valve assembly housing 132 of cartridge valve assembly 104. The temperature sensor-relief port assembly 194 is designed to provide passage 192 from fuel vessel cavity 110a (and thereby relieve unacceptable pressure that may develop in fuel vessel cavity 110a) by melting or evaporating plug 194 which is comprised of a temperature sensitive material. In one embodiment, plug 194 is comprised of a solder based material that melts well before the pressure within fuel vessel cavity 110a reach dangerous or unacceptable limits.

In addition, control circuitry 174 may also determine, monitor, manage and/or control other operations or characteristics of fuel cartridge 100, for example, fuel leak detection and/or fuel purge. In this regard, sensors 178 may include fuel leak sensors to provide data of the status of the integrity of the seal by cartridge valve assembly 104 and/or fuel vessel 110 to control circuitry 174. In response thereto, control circuitry 174 may alert the user/operator of the leak (or possible leak) and/or may safely terminate operation of fuel cartridge 100 and/or power unit 200 or refill unit 300 (if applicable).

Alternatively, control unit 174 may, based on data from sensors 178, 230 and/or 330 to determine the existence of a (or potential) fuel leak. The control circuitry 178 may employ various techniques, which are well known to those skilled in the art, to assess whether there is a fuel leak. Again, control circuitry 178 may alert the user/operator of the leak (or possible leak) and/or may immediately and safely terminate operation of fuel cartridge 100 and/or power unit 200 or refill unit 300 (if applicable).

The above embodiments of the present invention are merely exemplary embodiments. They are not intended to be exhaustive or to limit the inventions to the precise forms, techniques, materials and/or configurations disclosed. Many modifications, permutations and variations are possible in light of the above teaching. For example, fuel cartridge 100, power unit 200 and/or refill unit 300 may or may not include a one or more electrical or mechanical components such as, for example, a display unit. (See, FIGS. 14E, 17D and 19D). Thus, it is to be understood that other embodiments may be utilized and operational changes may be made without departing from the scope of the present inventions. As such, the foregoing description of the exemplary embodiments of the invention has been presented for the purposes of illustration and description. Many modifications and variations are possible in light of the above teaching. It is intended that the scope of the invention not be limited solely to this detailed description.

Notably, optional interconnections in the illustrations are represented in a dashed line format.

It should be further noted that the term "circuit" may mean, among other things, a single component or a multiplicity of components (whether in integrated circuit form or otherwise), which are active and/or passive, and which are coupled together to provide or perform a desired function. The term "circuitry" may mean, among other things, a circuit (whether integrated or otherwise), a group of such circuits, one or more processors, one or more state machines, one or more processors implementing software, or a combination of one or more circuits (whether integrated or otherwise), one or more state machines, one or more processors, and/or one or more processors implementing software. The term "data" may mean, among other things, a current or voltage signal(s) whether in an analog or a digital form.

What is claimed is:

1. A fuel storage unit for use in a fuel cell management system comprising a power unit and a refill unit, the fuel storage unit comprising:
   a removable fuel vessel operable to store the fuel;
   memory to store data which is representative of at least one operating parameter of the fuel storage unit;
   a fuel storage unit control system operable to determine, monitor, manage and/or control the parameter; and
   a fuel storage unit interface comprising:
     a fuel storage unit mechanical interface; and
     a fuel storage unit communications interface,
   wherein a mechanical interface of the power unit and the fuel storage unit mechanical interface are respectively operable to permit holding, retention and/or engagement between the power unit and the fuel storage unit, and a fluid interface therebetween permits fluid communication of the fuel between the fuel storage unit and the power unit,
   wherein a communications interface of the power unit and the communications interface of the fuel storage unit are respectively operable to provide communications between a control system of the power unit and the control system of the fuel storage unit;
   wherein a mechanical interface of the refill unit and the fuel storage unit mechanical interface are respectively operable to permit holding, retention and/or engagement between the refill unit and the fuel storage unit, and a fluid interface therebetween permits fluid communication of the fuel between the fuel storage unit and the refill unit, and
   wherein a communications interface of the refill unit and the communications interface of the fuel storage unit are respectively operable to provide communications between a control system of the refill unit and the control system of the fuel storage unit.

2. The fuel storage unit of claim 1 wherein the at least one operating parameter is representative of an amount of fuel that is in the removable fuel vessel.

3. The fuel storage unit of claim 2 wherein the control system monitors the parameter.

4. The fuel storage unit of claim 3 wherein the parameter is representative of an amount of hydrogen-based fuel that is in the fuel vessel using: (1) an amount of time the fuel storage unit provides fuel to an external unit, or (2) data which is representative of a pressure and/or temperature of the fuel in the fuel vessel.

5. The fuel storage unit of claim 1 wherein the at least one operating parameter is a rate of consumption of the fuel by an external unit.

6. The fuel storage unit of claim 5 wherein the control system monitors a parameter which is representative of a rate of consumption of the fuel by the external unit using one or more sensors that provides data which is representative of the rate of flow of the fuel, the pressure of the fuel in the vessel and/or the temperature of the fuel in the vessel.

7. The fuel storage unit of claim 1 wherein the memory stores data which is representative of one or more unique characteristics of fuel storage unit.

8. The fuel storage unit of claim 7 wherein the one or more unique characteristics include at least one of a serial number of the fuel storage unit, a date of manufacture of the fuel storage unit, a date of assembly of the fuel storage unit, a type of fuel contained in removable fuel vessel, a fuel capacity of the fuel storage unit, and a number of refill operations the fuel storage unit has undergone.

9. The fuel storage unit of claim 1 wherein the fuel storage unit further includes a display to visually display information which is representative of the at least one operating parameter.

10. The fuel storage unit of claim 1 wherein the control system includes a microprocessor or microcontroller and the memory is integrated into the microprocessor or microcontroller.

11. The fuel storage unit of claim 10 wherein the control system determines the at least one operating parameter of the fuel storage unit and stores data which is representative of the at least one operating parameter of the fuel storage unit in the memory.

12. The fuel storage unit of claim 1 wherein the memory and the control system are disposed on the same integrated circuit device.

13. The fuel storage unit of claim 1 further including an electrical interface, coupled to the memory device, to receive data from external circuitry, wherein the data is representative of the at least one operating parameter.

14. The fuel storage unit of claim 13 wherein the electrical interface receives the data which is representative of the at least one operating parameter and the memory, in response to a command, stores the data which is representative of the at least one operating parameter of the fuel storage unit.

15. The fuel storage unit of claim 14 wherein the at least one operating parameter is representative of an amount of fuel that is in the removable fuel vessel and the fuel comprises a hydrogen-based fuel.

16. The fuel storage unit of claim 14 wherein the at least one operating parameter is representative of an amount of fuel that has been consumed from the removable fuel vessel.

17. The fuel storage unit of claim 1 wherein the communications interface operationally connects to a communication system to provide data which is representative of the at least one operating parameter of the fuel storage unit to an external system.

18. The fuel storage unit of claim 17 wherein the communication system communicates wirelessly.

19. A hydrogen-based fuel cell cartridge for use in a hydrogen-based fuel cell management system, the hydrogen-based fuel cell cartridge comprising:
   a hydrogen-based fuel vessel adapted to store hydrogen-based fuel;
   a valve assembly, coupled to the fuel vessel, to provide exchange of hydrogen-based fuel with an external unit comprising any one of: a power unit or a refill unit;

the valve assembly comprising a bidirectional interface, including an electrical interface to receive data which is representative of at least one operating parameter of the hydrogen-based fuel cartridge from an external unit; and
memory to store the data which is representative of at least one operating parameter of the hydrogen-based fuel cartridge; and
control system coupled to the memory to determine, monitor and/or control the at least one operating parameter;
wherein the hydrogen-based fuel vessel is operable to be coupled at the bidirectional interface to any one of a power unit and a refill unit via an integrated fluid and communications coupling,
the power unit comprising a hydrogen-based fuel cell, adapted to receive the hydrogen-based fuel from the hydrogen-based fuel vessel and to generate electrical power therefrom; and
the refill unit operable to provide the hydrogen-based fuel to the hydrogen-based fuel cartridge for storage in the fuel vessel.

20. The hydrogen-based fuel cell cartridge of claim 19 wherein the interface further includes a mechanical interface adapted to connect to the external unit.

21. The hydrogen-based fuel cell cartridge of claim 19 wherein the at least one operating parameter is representative of the amount of hydrogen-based fuel that is in the fuel vessel.

22. The hydrogen-based fuel cell cartridge of claim 19 wherein the at least one operating parameter is representative of the rate of consumption of the hydrogen-based fuel by the external unit.

23. The hydrogen-based fuel cell cartridge of claim 19 wherein the memory stores data which is representative of one or more unique characteristics of hydrogen-based fuel cartridge wherein the one or more unique characteristics of hydrogen-based fuel cartridge includes at least one of a serial number of the fuel cartridge, date of manufacture of the fuel cartridge, date of assembly of the fuel cartridge, type of fuel contained in fuel vessel, fuel capacity of the fuel cartridge, and number of refill operations the fuel cartridge has undergone.

24. The hydrogen-based fuel cell cartridge of claim 19 wherein the hydrogen-based fuel cartridge further includes a display to visually display information which is representative of the at least one operating parameter.

25. The hydrogen-based fuel cell cartridge of claim 24 wherein the memory, in response to a command, stores the data which is representative of the at least one operating parameter of the hydrogen-based fuel cartridge.

26. The hydrogen-based fuel cell cartridge of claim 24 wherein the at least one operating parameter is representative of an amount of hydrogen-based fuel that is remaining in the fuel vessel or the amount of hydrogen-based fuel that has been consumed from the fuel vessel.

27. A hydrogen-based fuel cartridge for storing hydrogen-based fuel, comprising:
a fuel vessel adapted to store hydrogen-based fuel;
a cartridge interface comprising a mechanical interface;
a bidirectional cartridge valve assembly;
a memory to store data which is representative of a plurality of operating parameters of the hydrogen-based fuel cartridge; and
a control system adapted to determine, monitor, manage and/or control the plurality of operating parameters;
wherein the hydrogen-based fuel cartridge is operable to be coupled to any one of a power unit and a refill unit via an integrated fluid and communications coupling,
the power unit comprising:
a power unit interface comprising a mechanical interface to mechanically connect to the mechanical interface of the cartridge interface;
a power unit valve assembly to engage the cartridge valve assembly and to enable hydrogen-based fuel to flow between the hydrogen-based fuel cartridge and the power unit;
a hydrogen-based fuel cell being coupled to the power unit valve assembly to receive the hydrogen-based fuel from the fuel cartridge and to generate electrical power therefrom.

28. The system of claim 27, further comprising:
a hydrogen refill unit, the hydrogen refill unit comprising a fuel source unit disposed to store and supply the hydrogen-based fuel, the hydrogen refill unit disposed to be coupled to the bidirectional cartridge valve assembly of the hydrogen-based fuel cartridge.

* * * * *